US012565889B2

(12) United States Patent　　　　(10) Patent No.:　US 12,565,889 B2
Foster et al.　　　　　　　　　　　(45) Date of Patent:　　　Mar. 3, 2026

---

(54) FLUID END WITH CLAMPED RETENTION

(71) Applicant: Kerr Machine Co., Sulphur, OK (US)

(72) Inventors: Kelcy Jake Foster, Sulphur, OK (US);
　　　　　　　Micheal Cole Thomas, Azle, TX (US);
　　　　　　　Christopher Todd Barnett, Stratford,
　　　　　　　OK (US); Nicholas Son, Davis, OK
　　　　　　　(US); John Keith, Ardmore, OK (US)

(73) Assignee: Kerr Machine Co., Sulphur, OK (US)

( * ) Notice: Subject to any disclaimer, the term of this
　　　　　　patent is extended or adjusted under 35
　　　　　　U.S.C. 154(b) by 0 days.

(21) Appl. No.: 19/192,251

(22) Filed: Apr. 28, 2025

(65)　　　　　Prior Publication Data

US 2025/0257729 A1　　Aug. 14, 2025

Related U.S. Application Data

(63) Continuation of application No. 18/734,303, filed on
　　Jun. 5, 2024, now Pat. No. 12,297,827.

(60) Provisional application No. 63/508,577, filed on Jun.
　　16, 2023, provisional application No. 63/506,222,
　　filed on Jun. 5, 2023.

(51) Int. Cl.
　　*F04B 53/16*　　　　(2006.01)
　　*F04B 53/22*　　　　(2006.01)
　　*F16J 15/26*　　　　(2006.01)
(52) U.S. Cl.
　　CPC ............ *F04B 53/164* (2013.01); *F04B 53/22*
　　　　　　　　(2013.01); *F16J 15/26* (2013.01)
(58) Field of Classification Search
　　CPC ........ F04B 53/164; F04B 53/22; F04B 53/16;
　　　　　　　　　　　　　　　　　F16J 15/26
　　See application file for complete search history.

(56)　　　　　References Cited

U.S. PATENT DOCUMENTS

| | | | |
|---|---|---|---|
| 1,317,294 A | 9/1919 | Hildebrand |
| 2,071,825 A | 2/1937 | Finlayson |
| 2,713,522 A | 7/1955 | Petch |
| 2,856,857 A | 10/1958 | Saalfrank |
| 3,053,500 A | 9/1962 | Atkinson |

(Continued)

FOREIGN PATENT DOCUMENTS

| | | |
|---|---|---|
| CN | 113483169 A | 10/2021 |
| WO | 2014144113 A2 | 9/2014 |

OTHER PUBLICATIONS

CN113483169A translation (Year: 2024).

*Primary Examiner* — Abiy Teka
(74) *Attorney, Agent, or Firm* — Tomlinson McKinstry,
P.C.

(57)　　　　　　ABSTRACT

A fluid end section having a clamping system. The clamping
system has a primary clamp formed of a number of sections,
which, disposed in end-to-end arrangement, form an annular
ring. The primary clamp has an angled surface at each of two
rims, which interact with complementary surfaces on flanges
that form two separate components of the fluid end section.
Each of the two separate components have a bore, which
when aligned by placement of the clamp, are in alignment
with one another. The clamp has an externally-disposed
compression ring, which may either be essentially the width
of the primary clamp, or may have one or more flexible rods
which interact with grooves on the primary clamp. In either
case, the compression ring holds the primary clamp in place,
therefore joining the components of the fluid end.

16 Claims, 78 Drawing Sheets

(56) References Cited

U.S. PATENT DOCUMENTS

| 3,146,724 A | 9/1964 | Cornelsen |
| 3,244,424 A | 4/1966 | Cope |
| 3,373,695 A | 3/1968 | Yohpe |
| 3,427,988 A | 2/1969 | Redman et al. |
| 3,652,098 A | 3/1972 | Kawazu et al. |
| 3,655,207 A | 4/1972 | Schettler |
| 3,679,332 A | 7/1972 | Yohpe |
| 3,776,558 A | 12/1973 | Muarer |
| 3,801,234 A | 4/1974 | Love |
| 4,289,317 A | 9/1981 | Kuc |
| 4,363,463 A | 12/1982 | Moon, Jr. |
| 4,432,386 A | 2/1984 | Pacht |
| 4,467,703 A | 8/1984 | Redwine et al. |
| 4,768,933 A | 9/1988 | Stachowiak |
| 4,773,833 A | 9/1988 | Wilkinson et al. |
| 4,778,347 A | 10/1988 | Mize |
| 4,861,241 A | 8/1989 | Gamboa et al. |
| 4,878,815 A | 11/1989 | Stachowiak |
| 4,948,349 A | 8/1990 | Koiwa |
| 5,059,101 A | 10/1991 | Valavaara |
| 5,127,807 A | 7/1992 | Eslinger |
| 5,331,736 A | 7/1994 | Suggs |
| 5,362,215 A | 11/1994 | King |
| 5,626,345 A | 5/1997 | Wallace |
| 5,709,514 A | 1/1998 | Suggs et al. |
| 5,799,953 A | 9/1998 | Henderson |
| 5,848,738 A | 12/1998 | Sunby |
| 6,167,959 B1 | 1/2001 | Bassinger et al. |
| 6,234,490 B1 | 5/2001 | Champlin |
| 6,382,940 B1 | 5/2002 | Blume |
| 6,544,012 B1 | 4/2003 | Blume |
| 7,186,097 B1 | 3/2007 | Blume |
| 7,290,560 B2 | 11/2007 | Orr et al. |
| 7,296,591 B2 | 11/2007 | Moe et al. |
| 7,354,046 B2 | 4/2008 | Ramsay |
| 7,506,574 B2 | 3/2009 | Jensen et al. |
| 7,789,133 B2 | 9/2010 | McGuire |
| 7,828,053 B2 | 11/2010 | McGuire et al. |
| 7,963,502 B2 | 6/2011 | Lovell et al. |
| 8,047,820 B2 | 11/2011 | Merrick, III |
| 8,100,407 B2 | 1/2012 | Stanton et al. |
| 8,528,585 B2 | 9/2013 | McGuire |
| 10,082,137 B2 | 9/2018 | Graham et al. |
| 10,519,950 B2 | 12/2019 | Foster |
| 10,760,567 B2 | 9/2020 | Salih et al. |
| 11,391,374 B1 | 7/2022 | Ellisor et al. |
| 11,920,583 B2 | 3/2024 | Foster et al. |
| 12,297,827 B2 * | 5/2025 | Foster .................. F04B 53/164 |
| 2006/0002806 A1 | 1/2006 | Baxter et al. |
| 2006/0045782 A1 | 3/2006 | Kretzinger et al. |
| 2010/0038070 A1 | 2/2010 | Blanco et al. |
| 2011/0206547 A1 | 8/2011 | Kim et al. |
| 2011/0236238 A1 | 9/2011 | Cordes et al. |
| 2012/0141308 A1 * | 6/2012 | Saini .................. F04B 53/1025 |
| | | 977/773 |
| 2013/0319220 A1 | 12/2013 | Luharuka et al. |
| 2014/0348677 A1 | 11/2014 | Moeller et al. |
| 2015/0132157 A1 | 5/2015 | Whaley et al. |
| 2016/0223104 A1 | 8/2016 | Webb |
| 2017/0089473 A1 | 3/2017 | Nowell et al. |
| 2017/0218951 A1 | 8/2017 | Graham et al. |
| 2018/0058477 A1 | 3/2018 | Foster |
| 2019/0178243 A1 | 6/2019 | Nowell et al. |
| 2019/0242373 A1 | 8/2019 | Wernig et al. |
| 2019/0247957 A1 | 8/2019 | Stribling |
| 2020/0232455 A1 | 7/2020 | Blume |
| 2020/0347706 A1 * | 11/2020 | Nowell .............. F04B 39/0005 |
| 2020/0362678 A1 | 11/2020 | Lesko |
| 2022/0099073 A1 * | 3/2022 | Thomas .............. E21B 43/2607 |

* cited by examiner

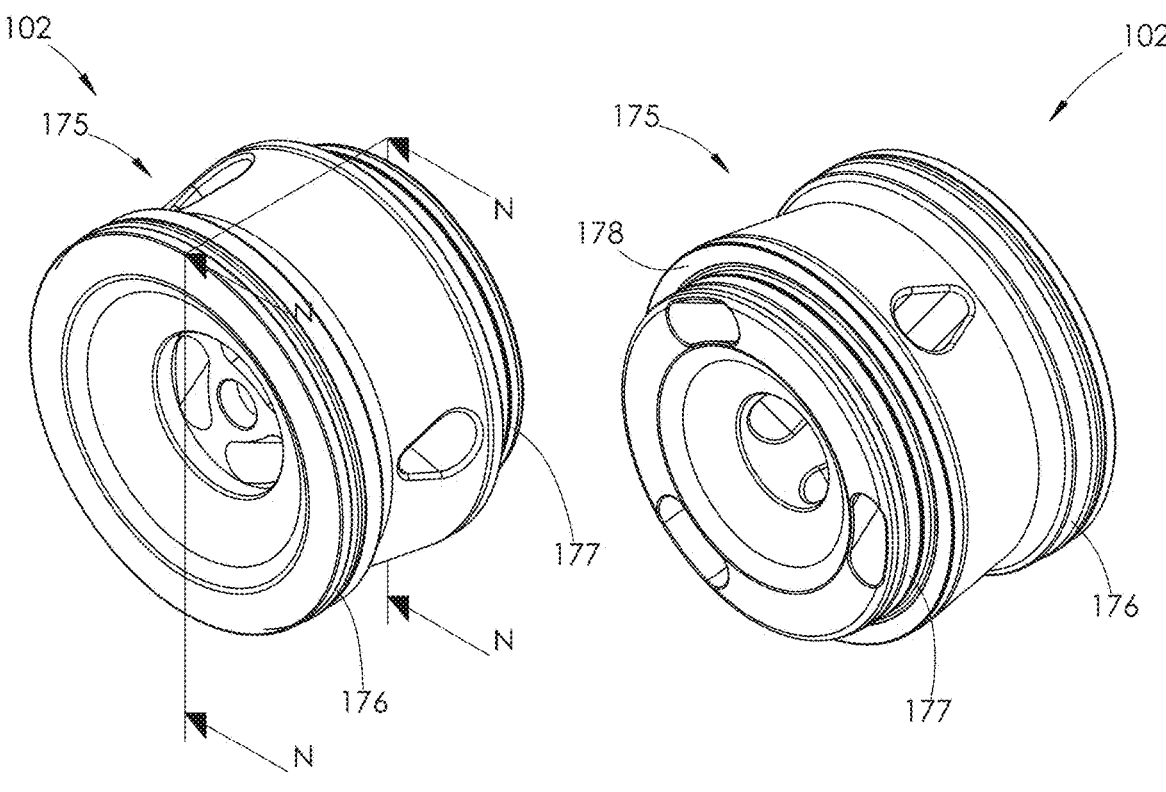
FIG. 30                    FIG. 31
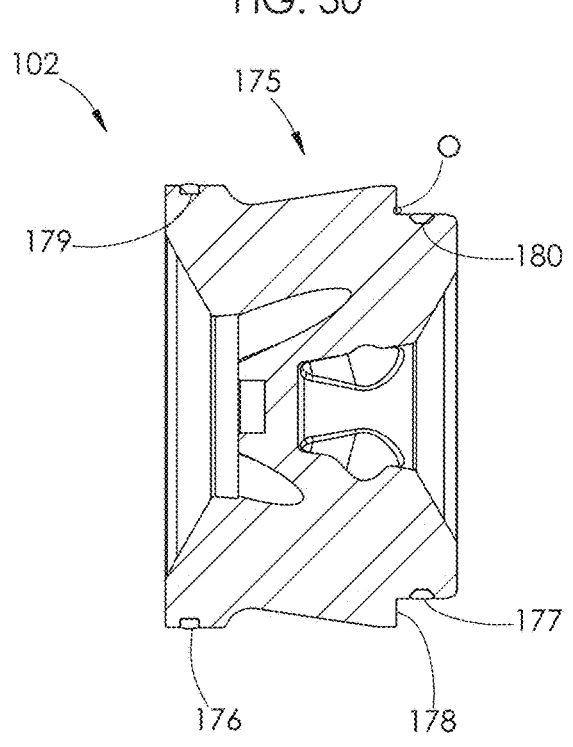
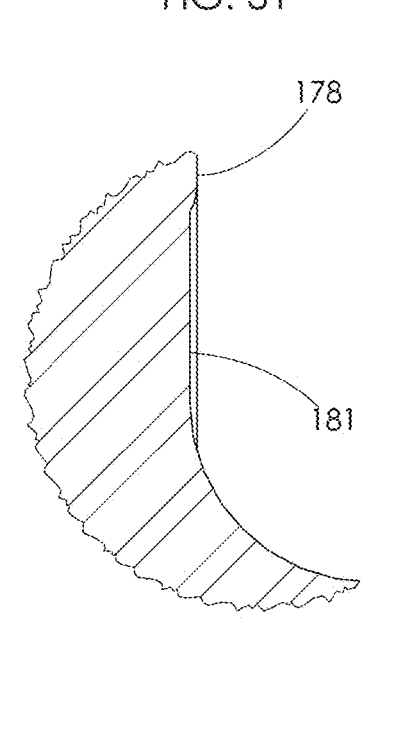
FIG. 32                    FIG. 33

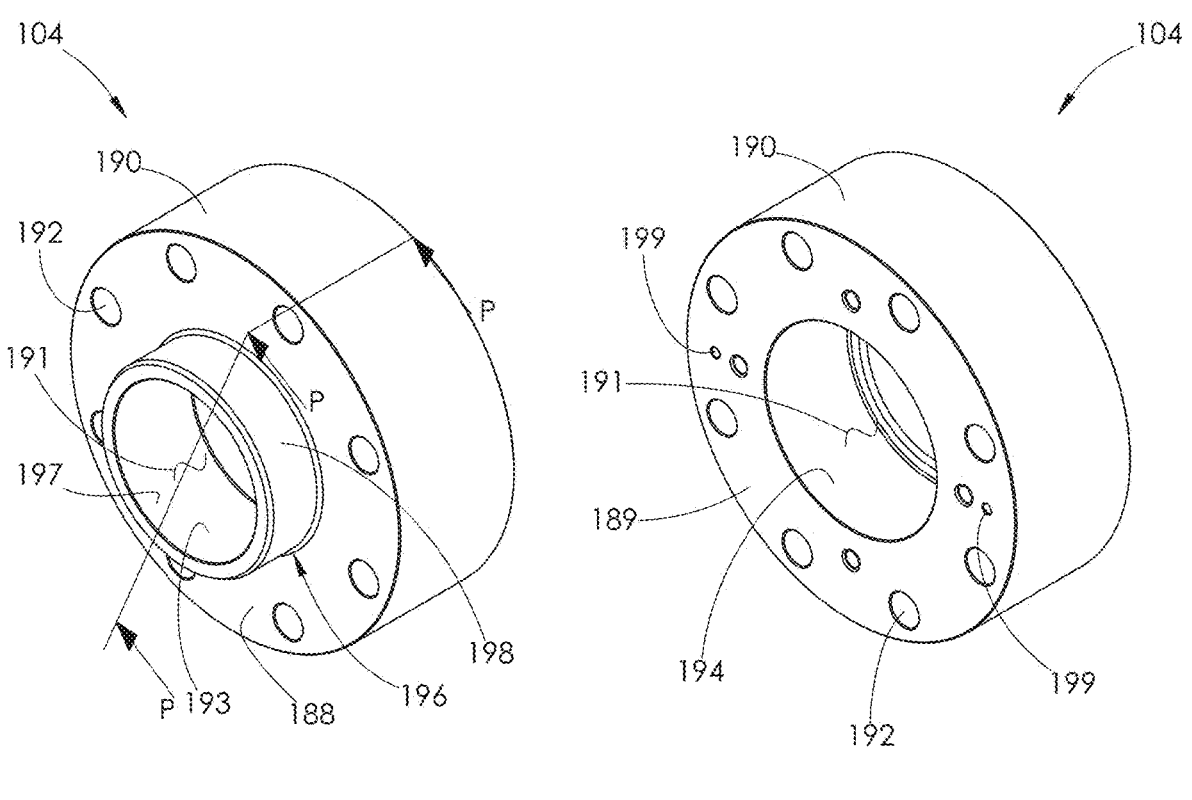
FIG. 36                          FIG. 37
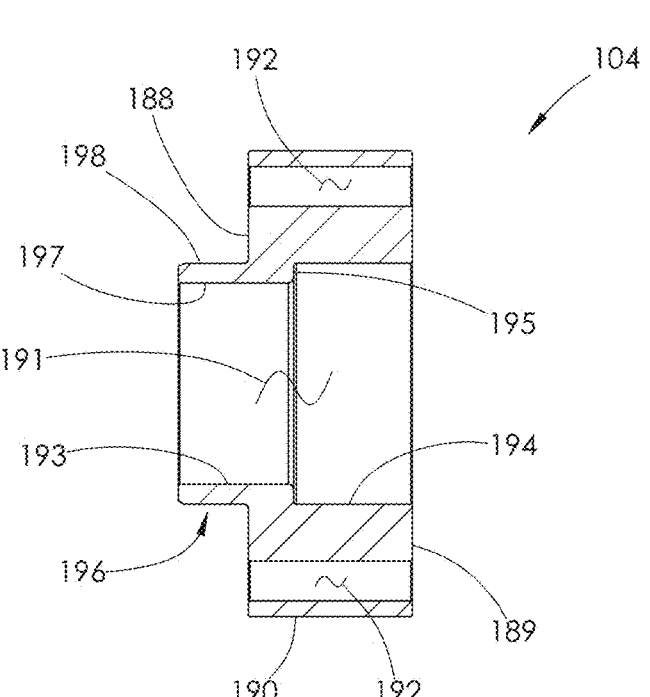
FIG. 38

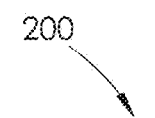
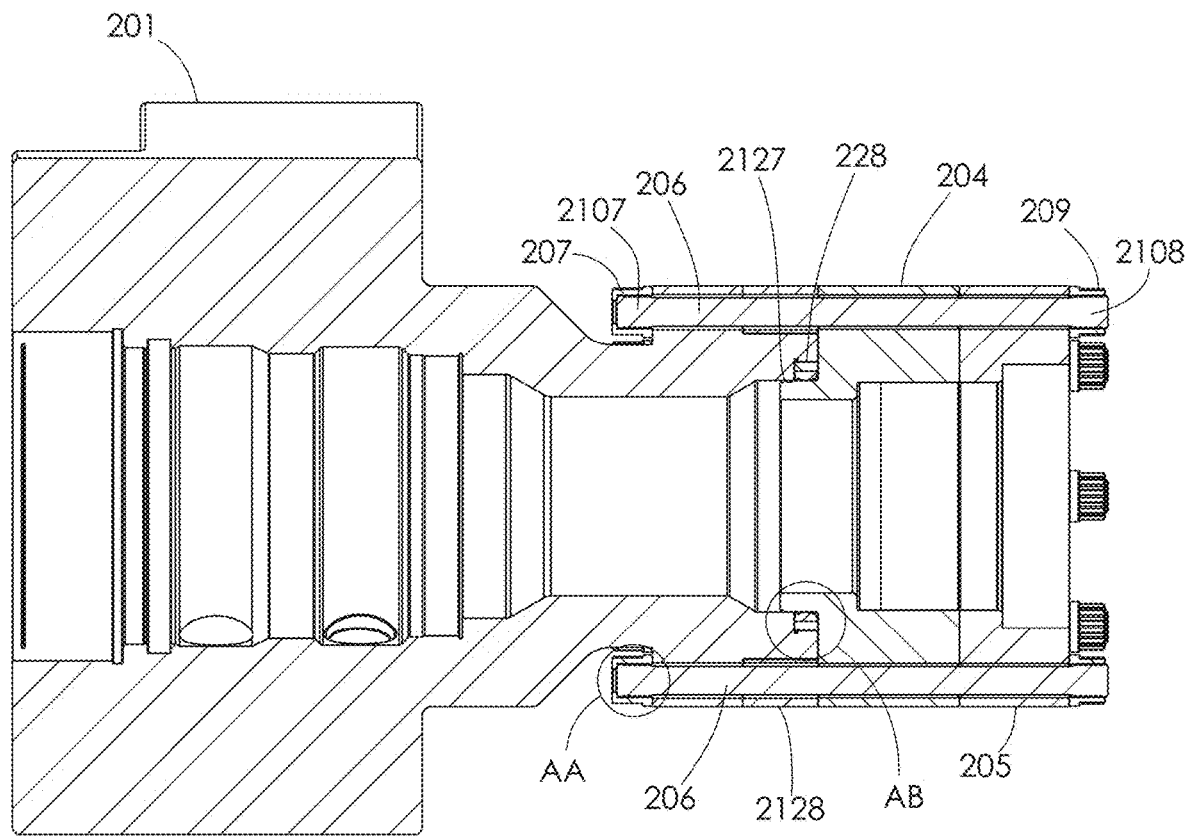
FIG. 56

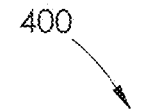
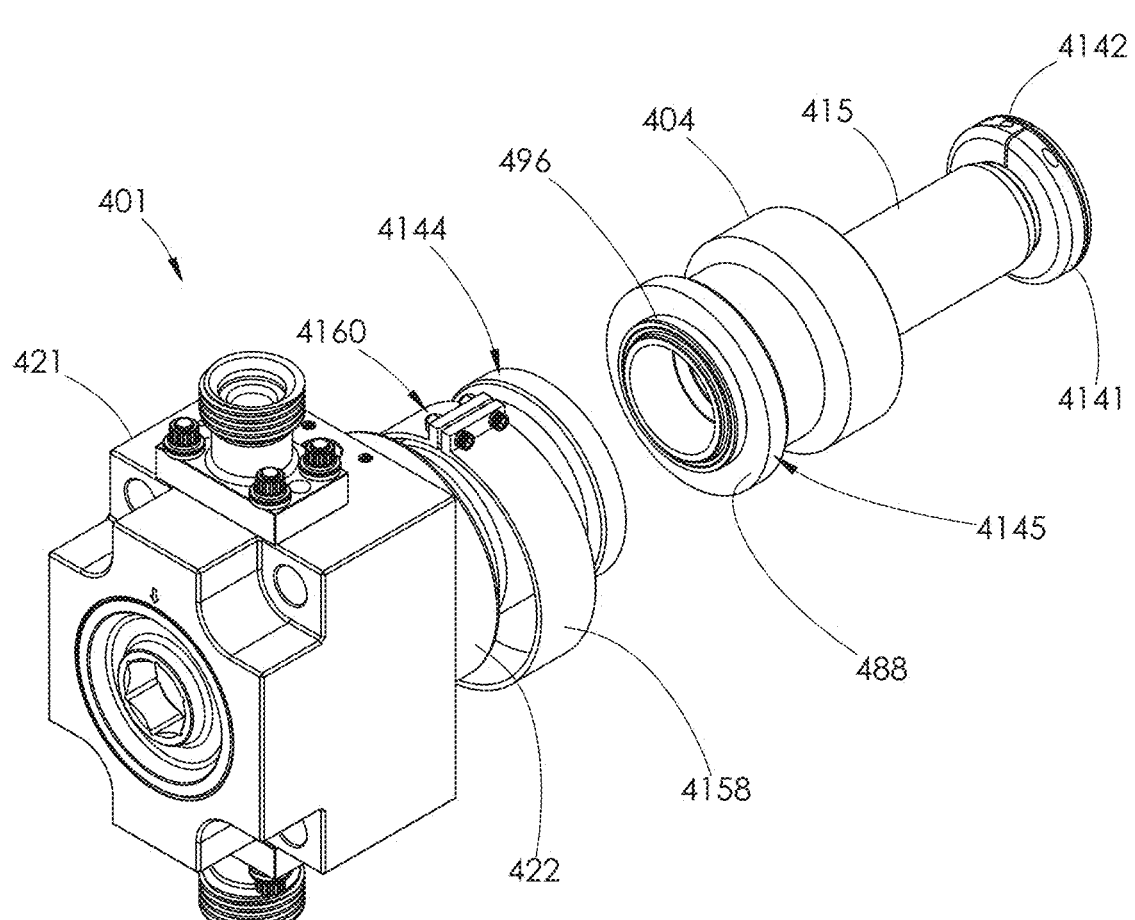
FIG. 85

4159

4168

4170

4159

4168

4172

4169

4173

4171

4170

4159

AM

4168

AM

4159

4168

4173

4172

4171

4169

4173

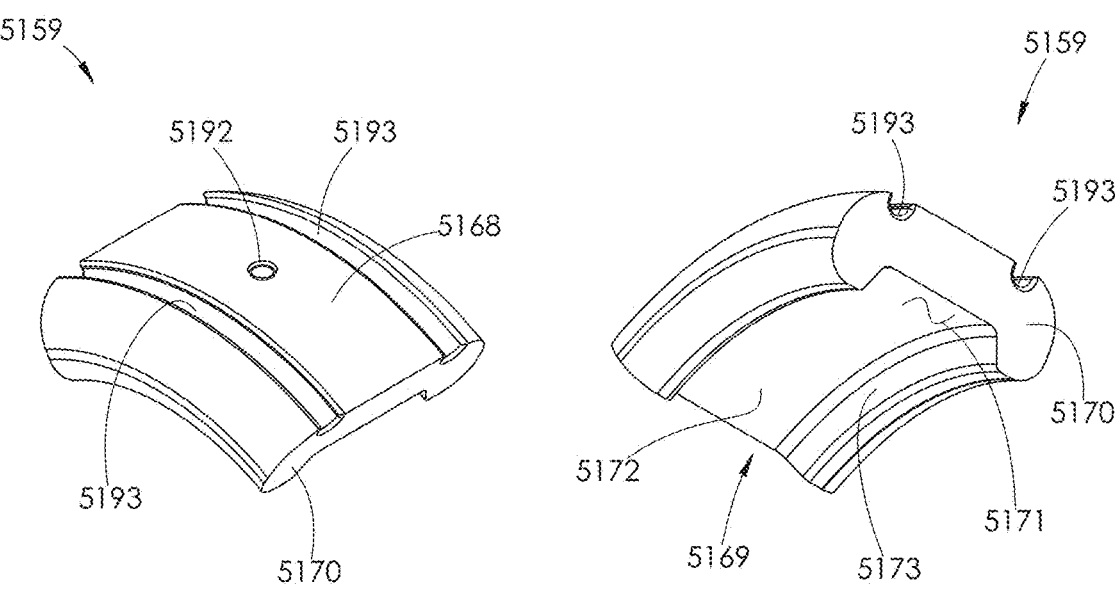
FIG. 114                              FIG. 115
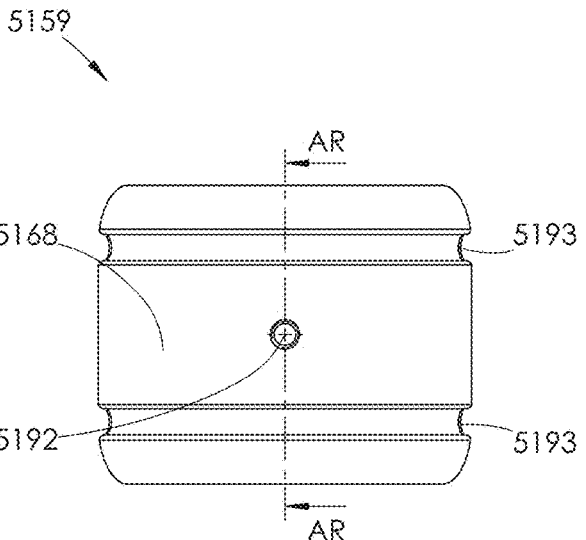          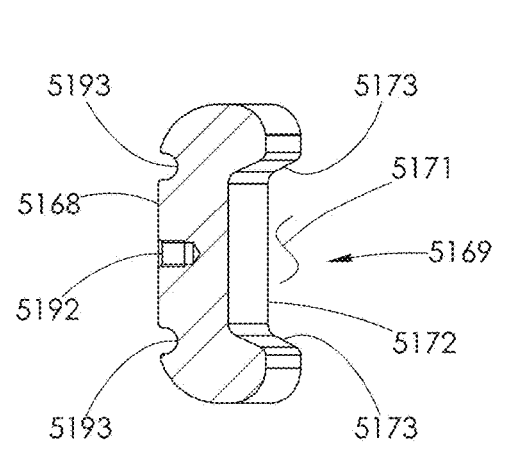
FIG. 116                              FIG. 117

FLUID END WITH CLAMPED RETENTION

SUMMARY

The present invention is directed to a fluid end section. The fluid end section comprises a housing having a first longitudinal bore formed therethrough, a stuffing box having a second longitudinal bore formed therethrough, and a clamp surrounding at least a portion of the housing and at least a portion of the stuffing box. The first longitudinal bore and the second longitudinal bore are aligned and the housing abuts the stuffing box.

BRIEF DESCRIPTION OF THE DRAWINGS

FIG. 30 is a right front perspective view of the fluid routing plug.

FIG. 31 is a left rear perspective view of the fluid routing plug shown in FIG. 30.

FIG. 32 is a cross-sectional view of the fluid routing plug shown in FIG. 30, taken along line N-N.

FIG. 33 is an enlarged view of area O in FIG. 32.

FIG. 36 is a right front perspective view of the stuffing box.

FIG. 37 is a left rear perspective view of the stuffing box shown in FIG. 36.

FIG. 38 is a cross-sectional view of the stuffing box shown in FIG. 36 taken along line P-P.

FIG. 56 is a cross-sectional view of the fluid end section shown in FIG. 55, taken along line Z-Z.

FIG. 85 is a partially exploded right front perspective view of the fluid end section shown in FIG. 80. The clamp sections are removed for clarity.

FIG. 114 is a top right front perspective view of another embodiment of a clamp section.

FIG. 115 is a bottom right front perspective view of the clamp section shown in FIG. 114.

FIG. 116 is a top plan view of the clamp section shown in FIG. 114.

FIG. 117 is a cross-sectional view of the clamp section shown in FIG. 116, taken along line AR-AR.

FIG. 119 is a bottom front right perspective view of the ring clamp shown in FIG. 118.

FIG. 120 is a top plan view of the ring clamp shown in FIG. 118.

FIG. 121 is a cross-sectional view of the ring clamp shown in FIG. 120, taken along line AS-AS.

FIG. 122 is a right front perspective view of a high-pressure pump.

FIG. 123 is an enlarged view of area AT of FIG. 122.

FIG. 124 is a right rear perspective view of the high-pressure pump shown in FIG. 122.

FIG. 125 is an enlarged view of area AU of FIG. 124.

FIG. 126 is a right front perspective view of another embodiment of a fluid end section.

FIG. 127 is a left rear perspective view of the fluid end section shown in FIG. 126.

FIG. 128 is a cross-sectional view of the fluid end section shown in FIG. 127, taken along line AV-AV.

FIG. 129 is a cross-sectional view of the fluid end section shown in FIG. 127, taken along line AW-AW.

FIG. 130 is a cross-sectional view of the fluid end section shown in FIG. 127, taken along line AX-AX.

Figure 128:
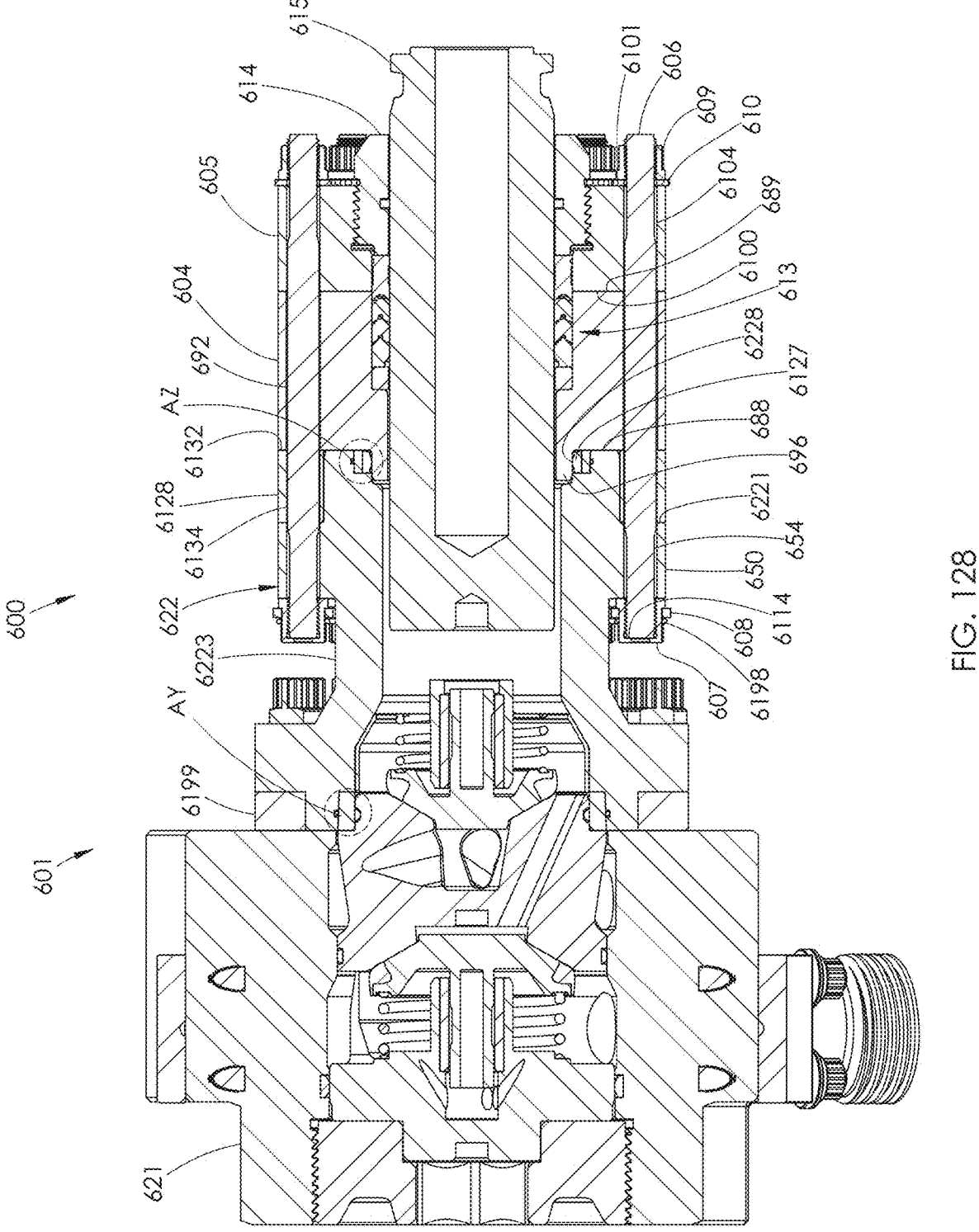
Figure 131:
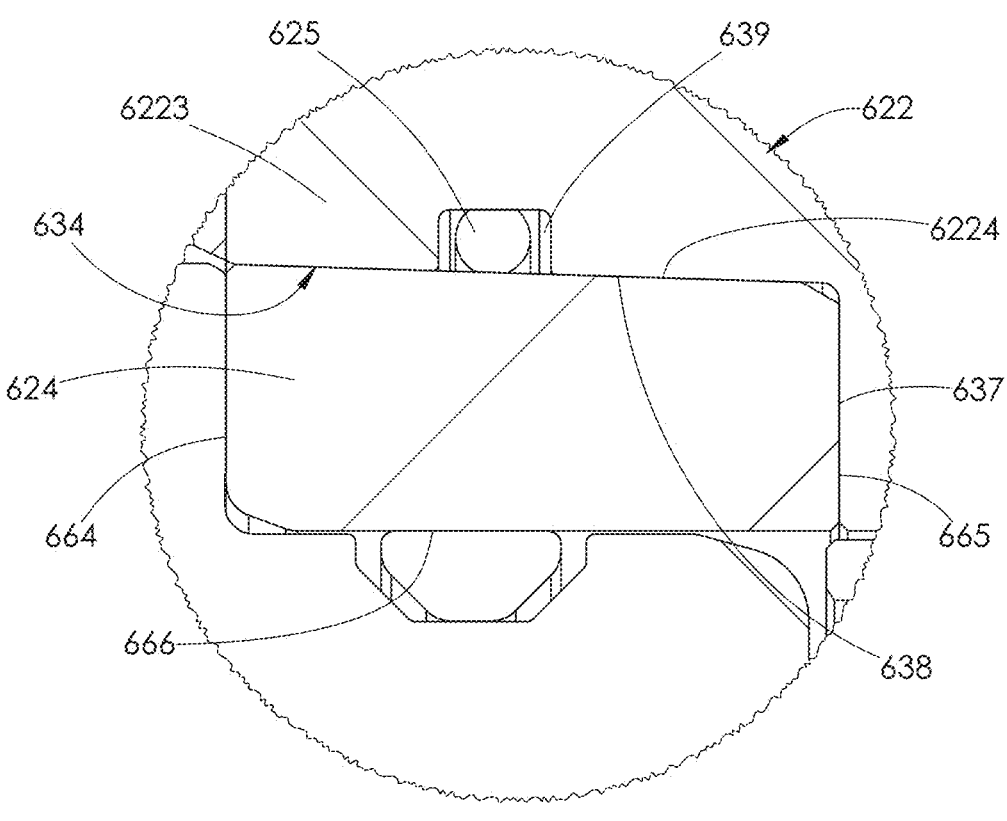

FIG. 131 is an enlarged view of area AY of FIG. 128.

Figure 132:
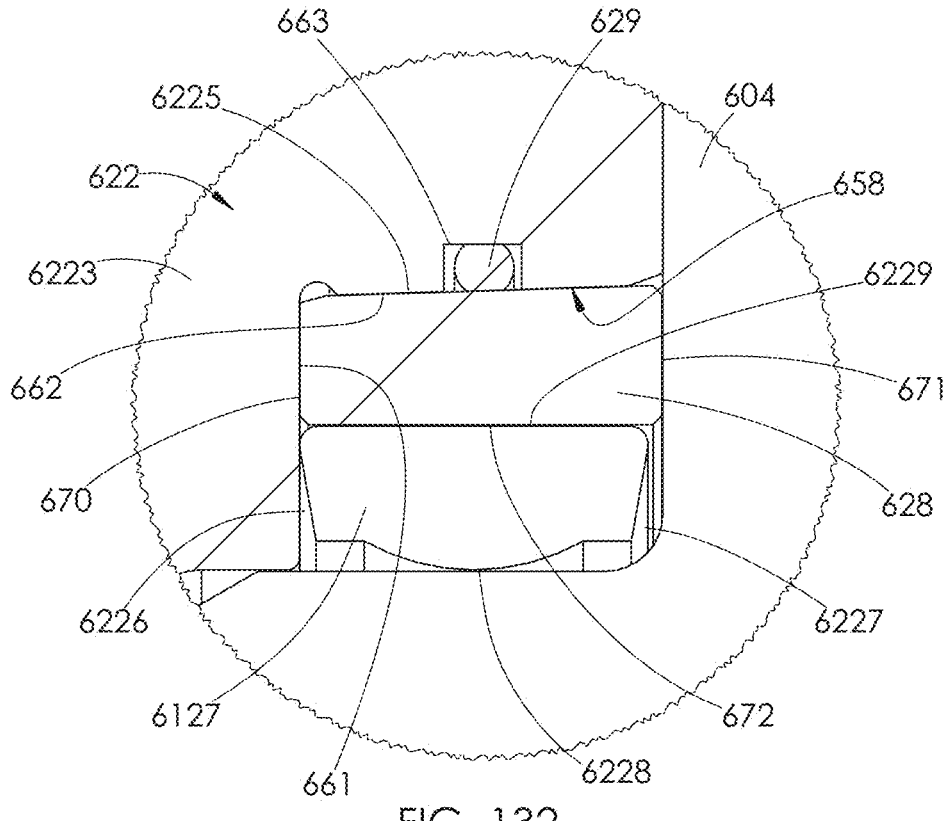

FIG. 132 is an enlarged view of area AZ of FIG. 128.

Figure 126:
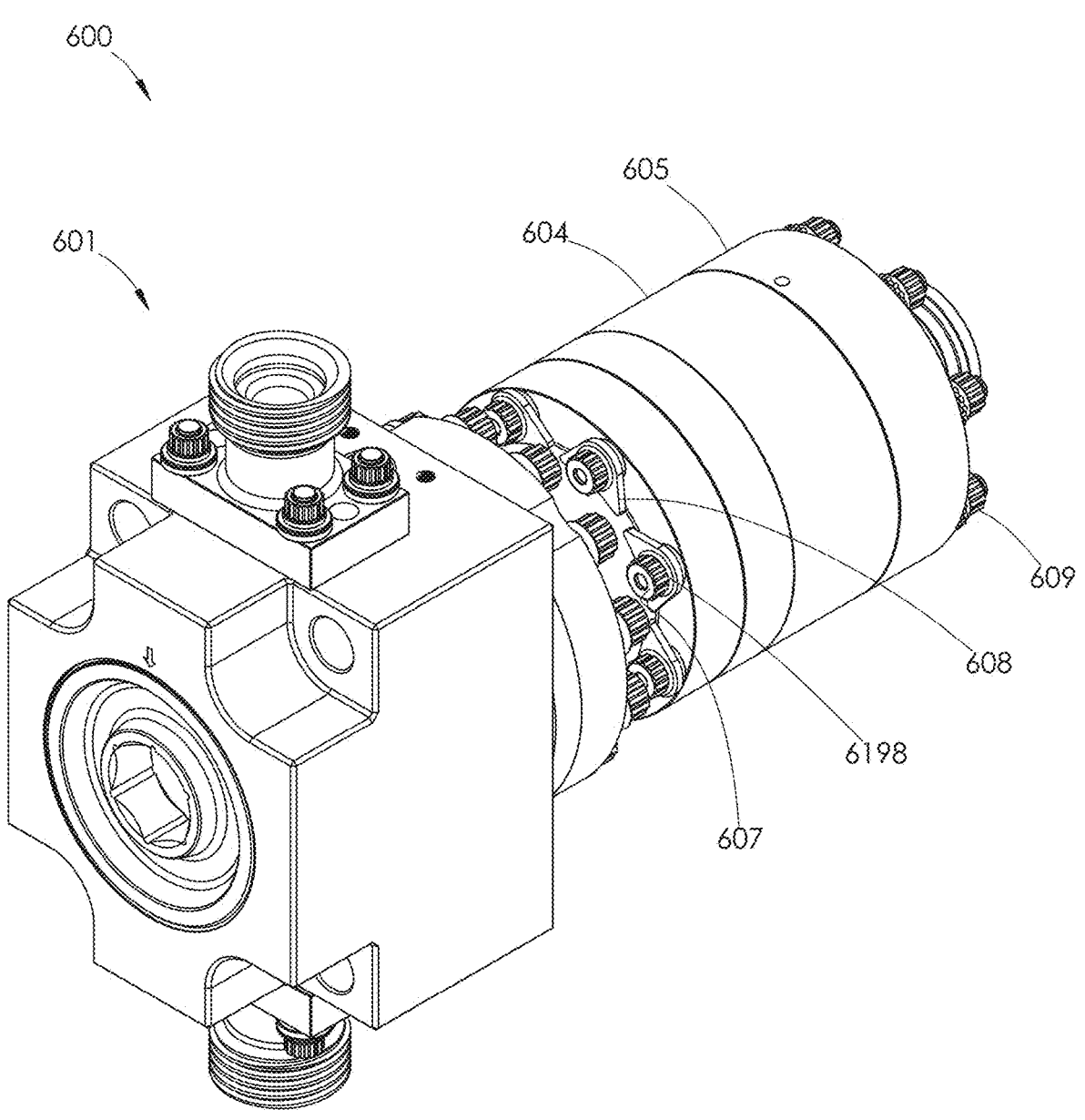
Figure 127:
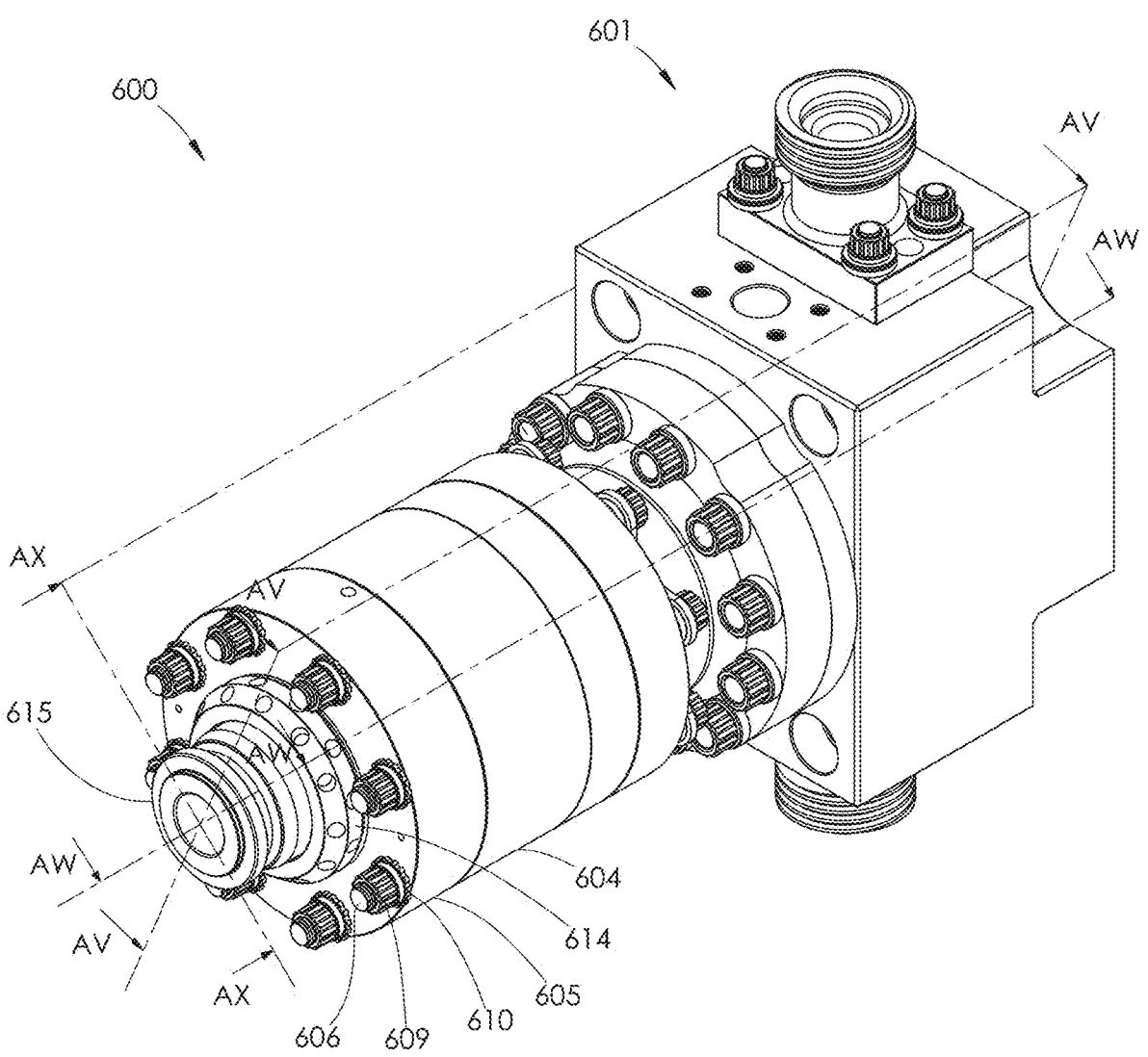
Figure 133:
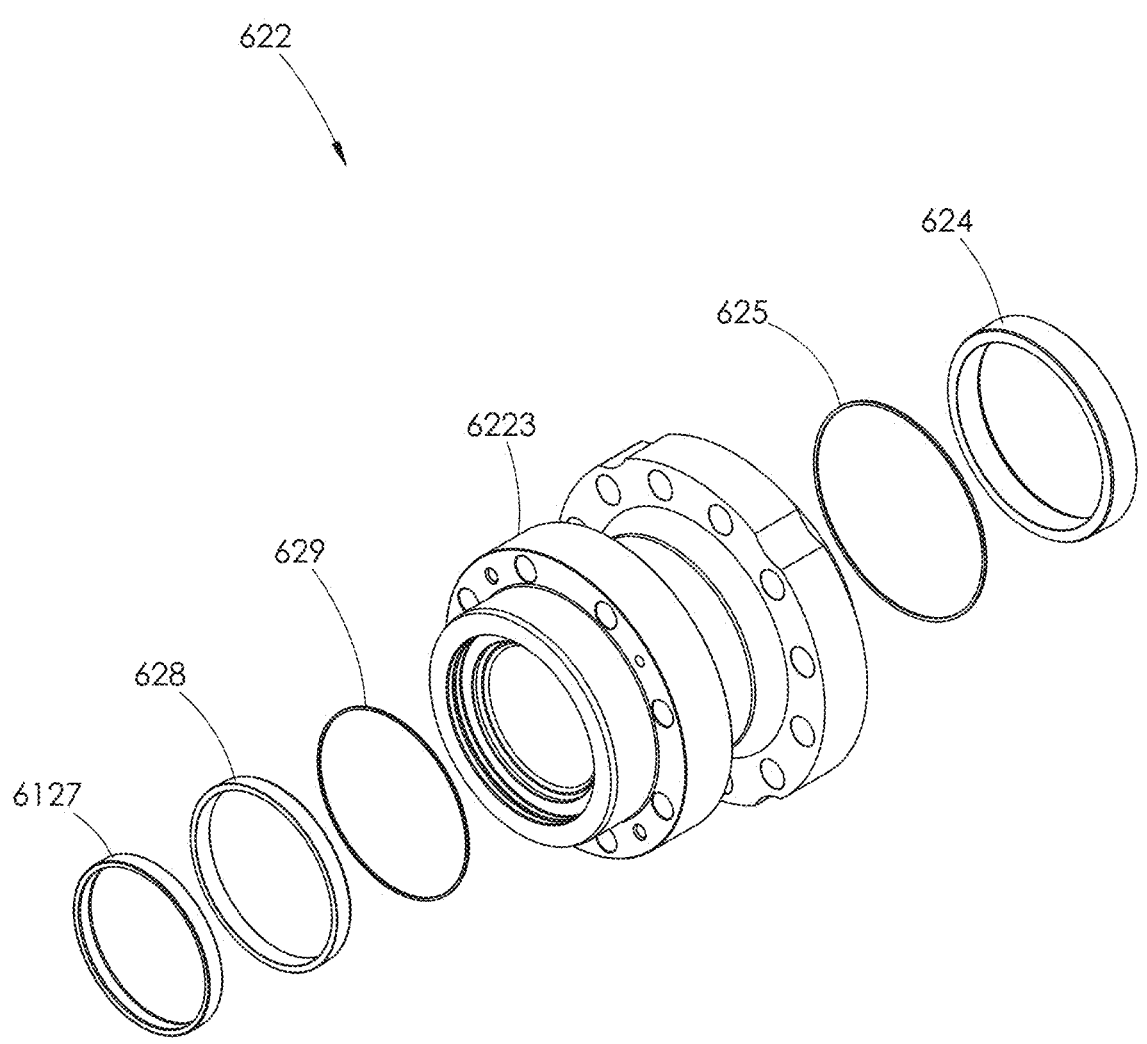

FIG. 133 is an exploded left rear perspective view of section two of the fluid end section shown in FIG. 126.

Figure 134:
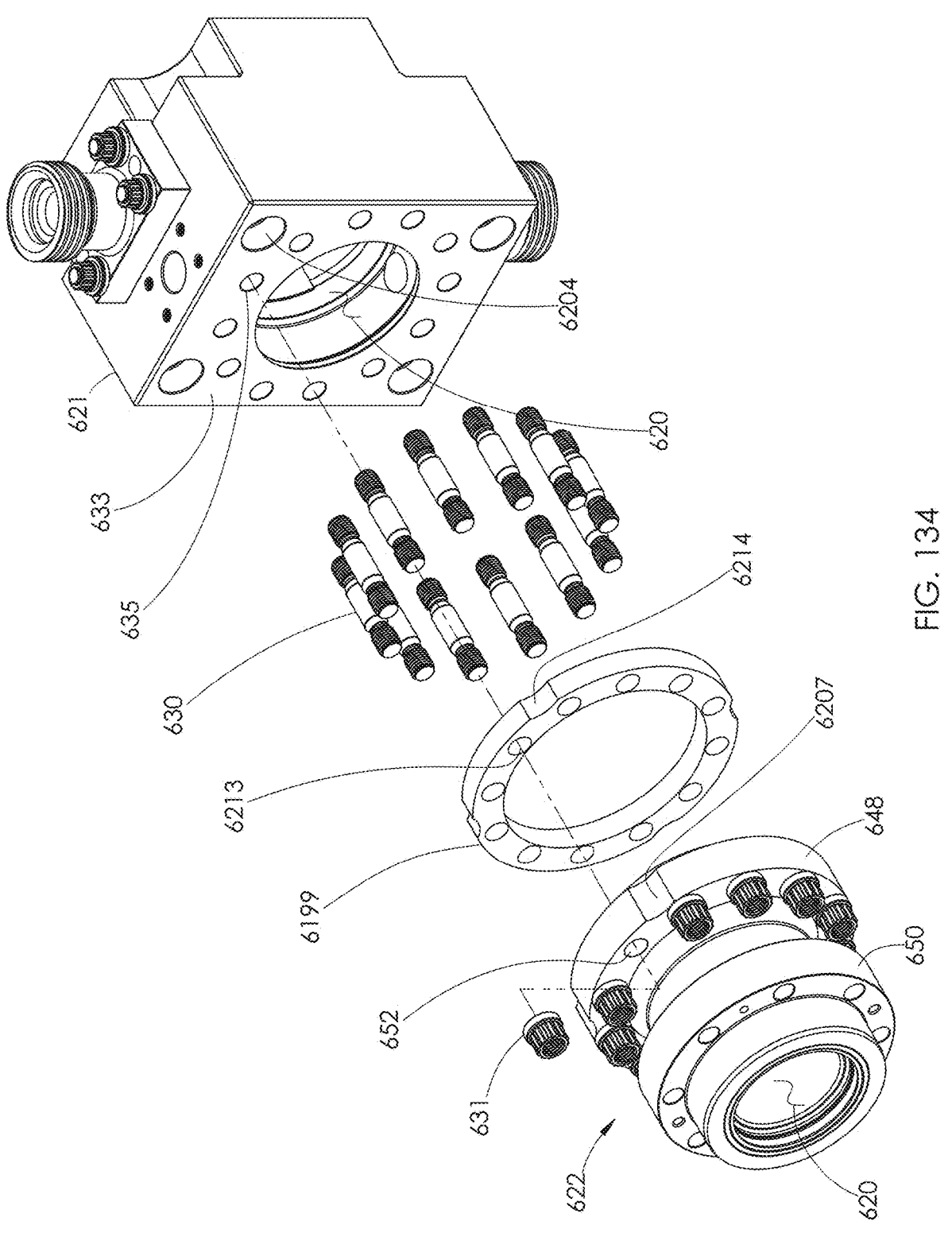

FIG. 134 is an exploded left rear perspective view of some components of the fluid end section shown in FIG. 126.

Figure 135:
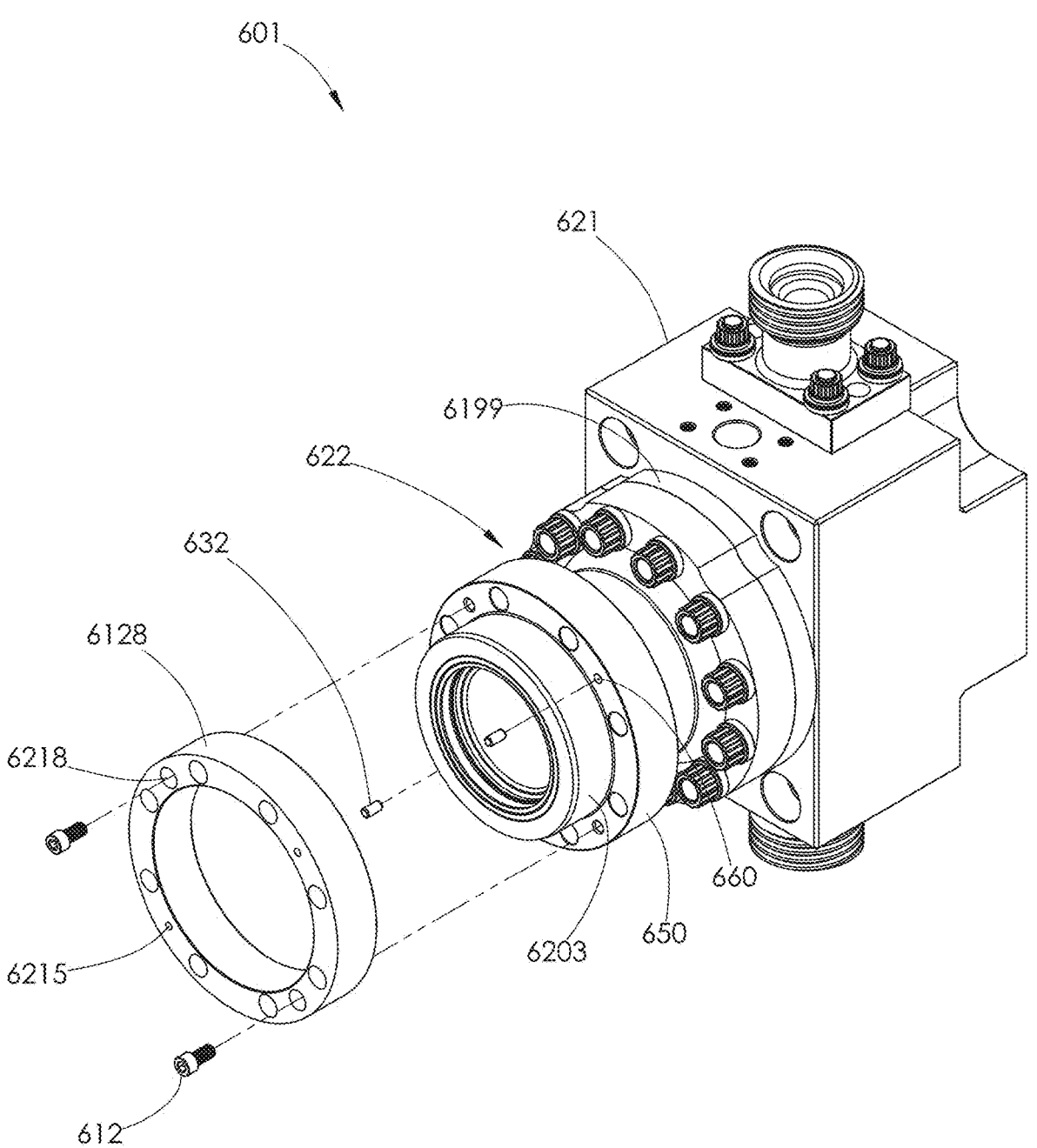

FIG. 135 is a partially exploded left rear perspective view of the fluid end section shown in FIG. 126.

Figure 136:
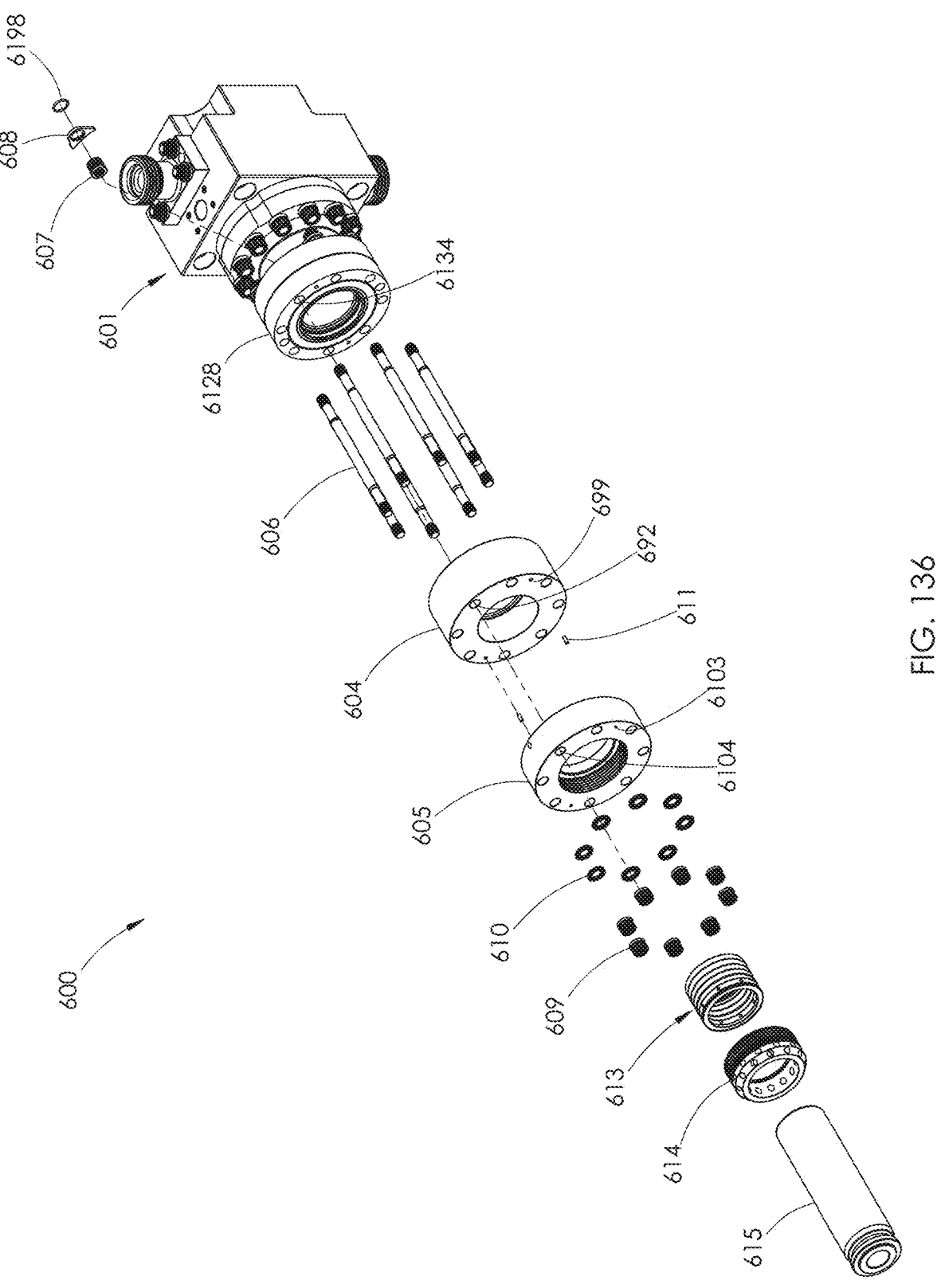

FIG. 136 is a partially exploded left rear perspective view of the fluid end section shown in FIG. 126.

Figures 137, 138:
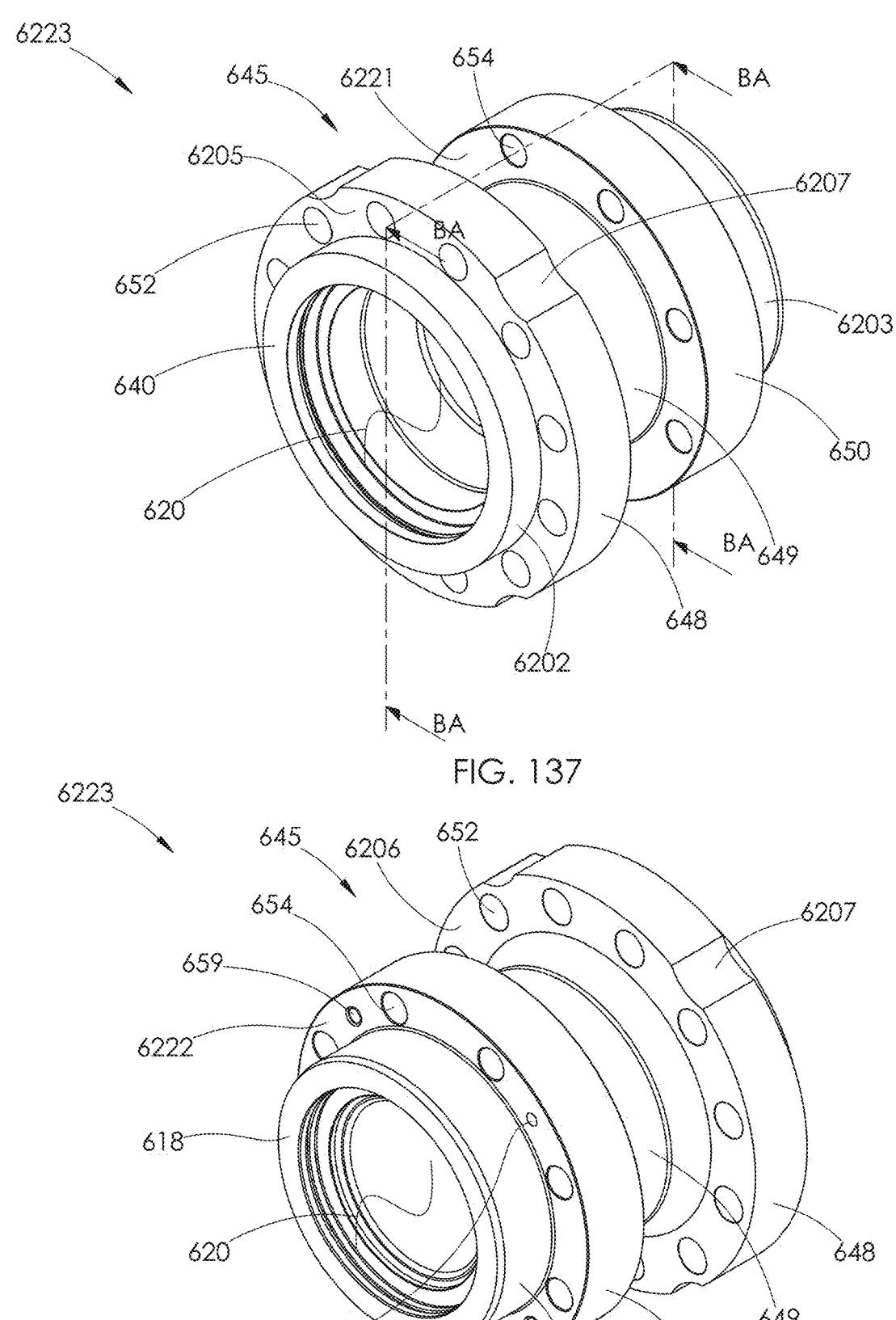

FIG. 137 is a right front perspective view of the body of section two of the fluid end section shown in FIG. 126.

FIG. 138 is a left rear perspective view of the body shown in FIG. 137.

Figure 139:
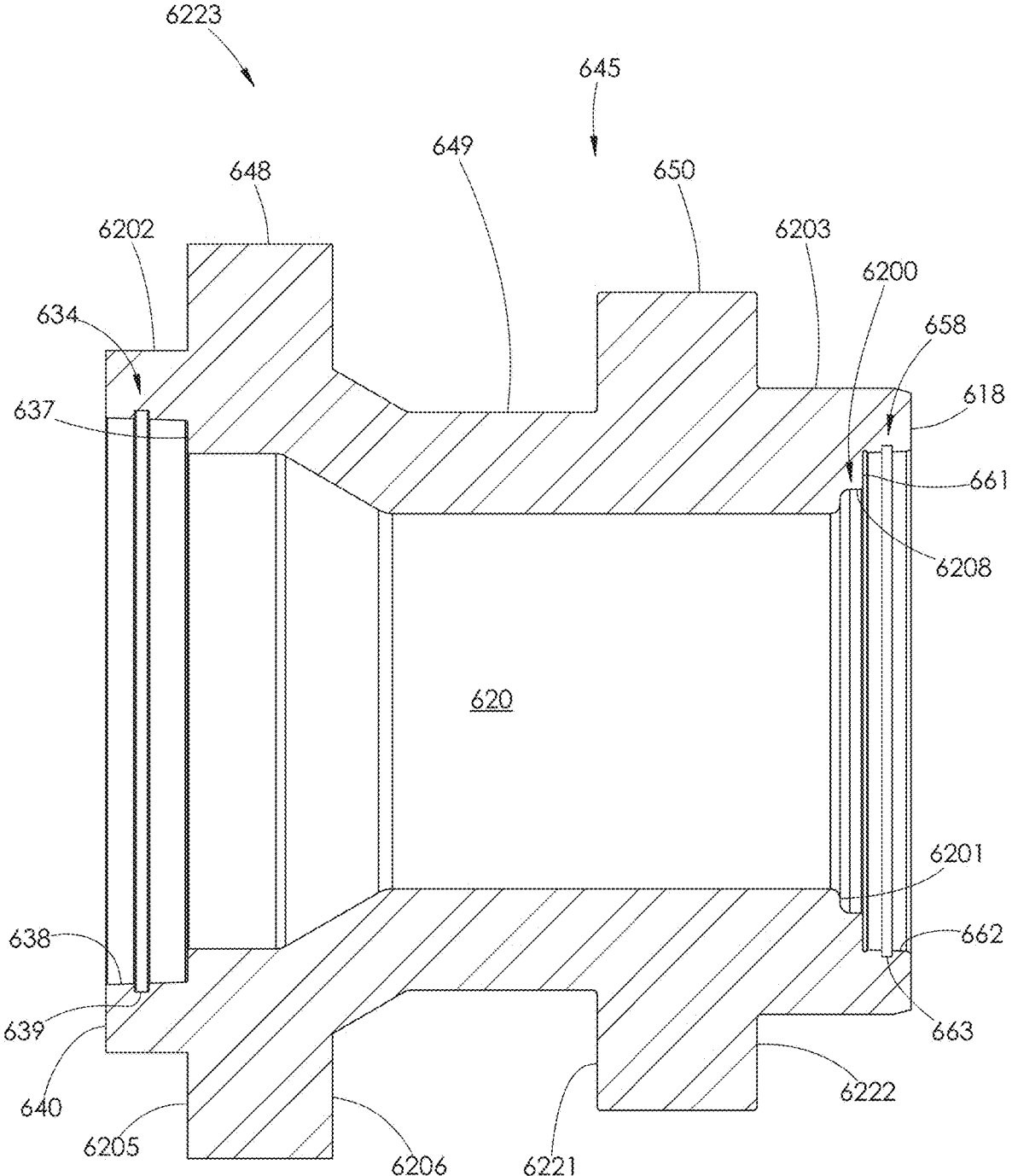

FIG. 139 is a cross-sectional view of the body shown in FIG. 137, taken along line BA-BA.

Figure 140:
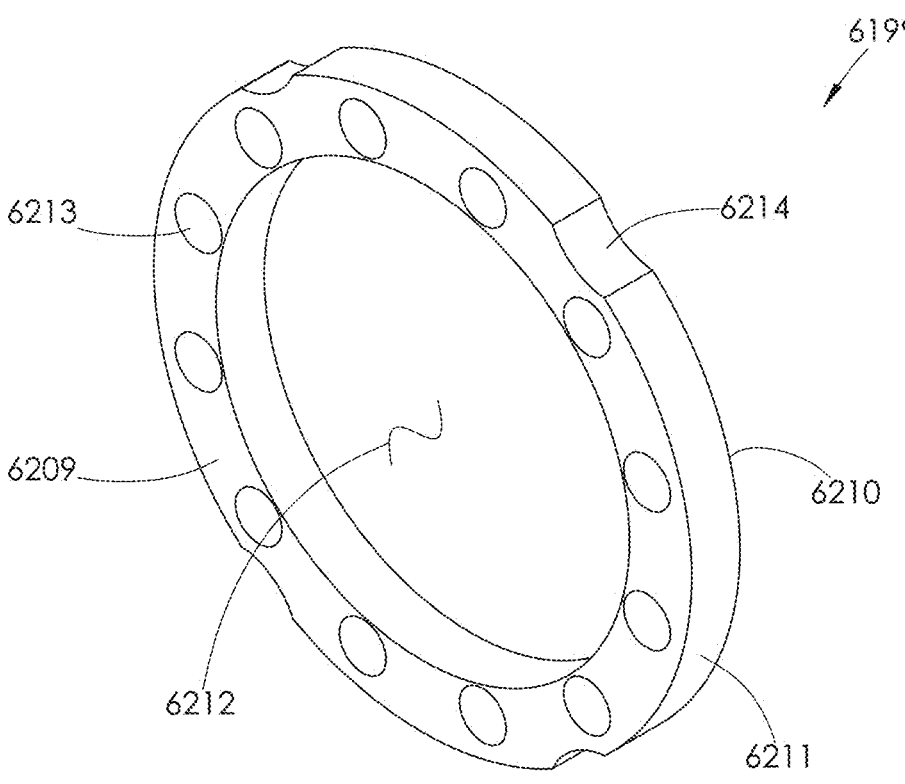

FIG. 140 is right front perspective view of the front spacer of the fluid end section shown in FIG. 126.

Figure 141:
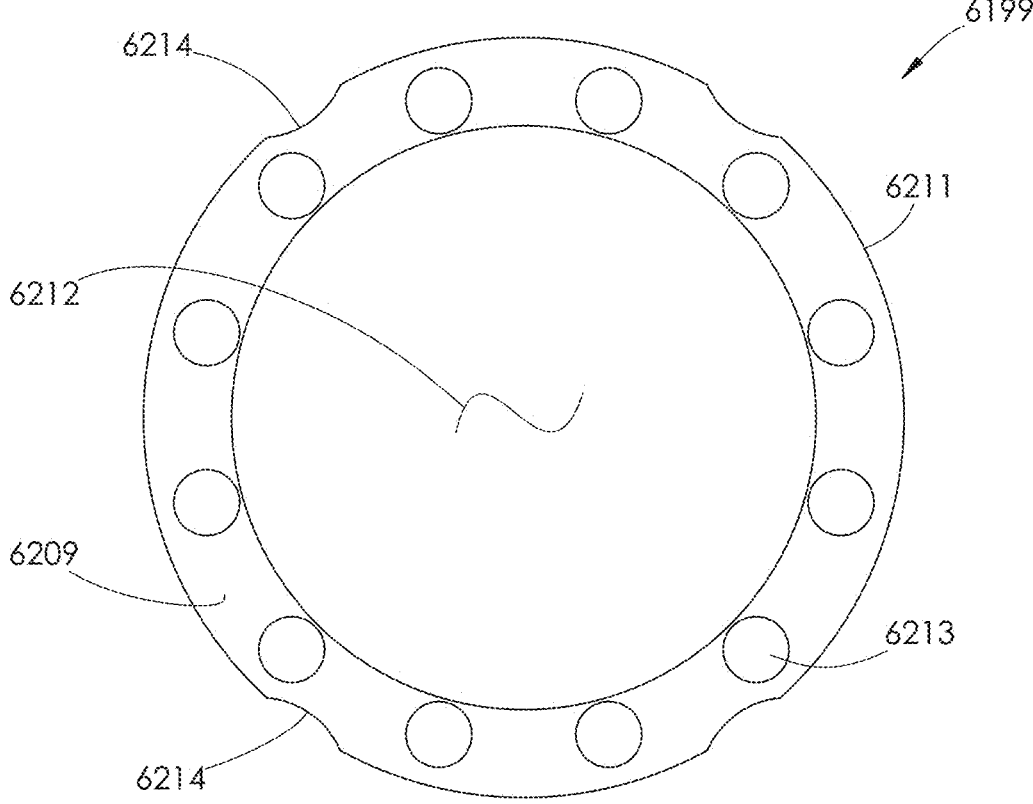

FIG. 141 is a front elevation view of the front spacer shown in FIG. 140.

Figures 142, 143:
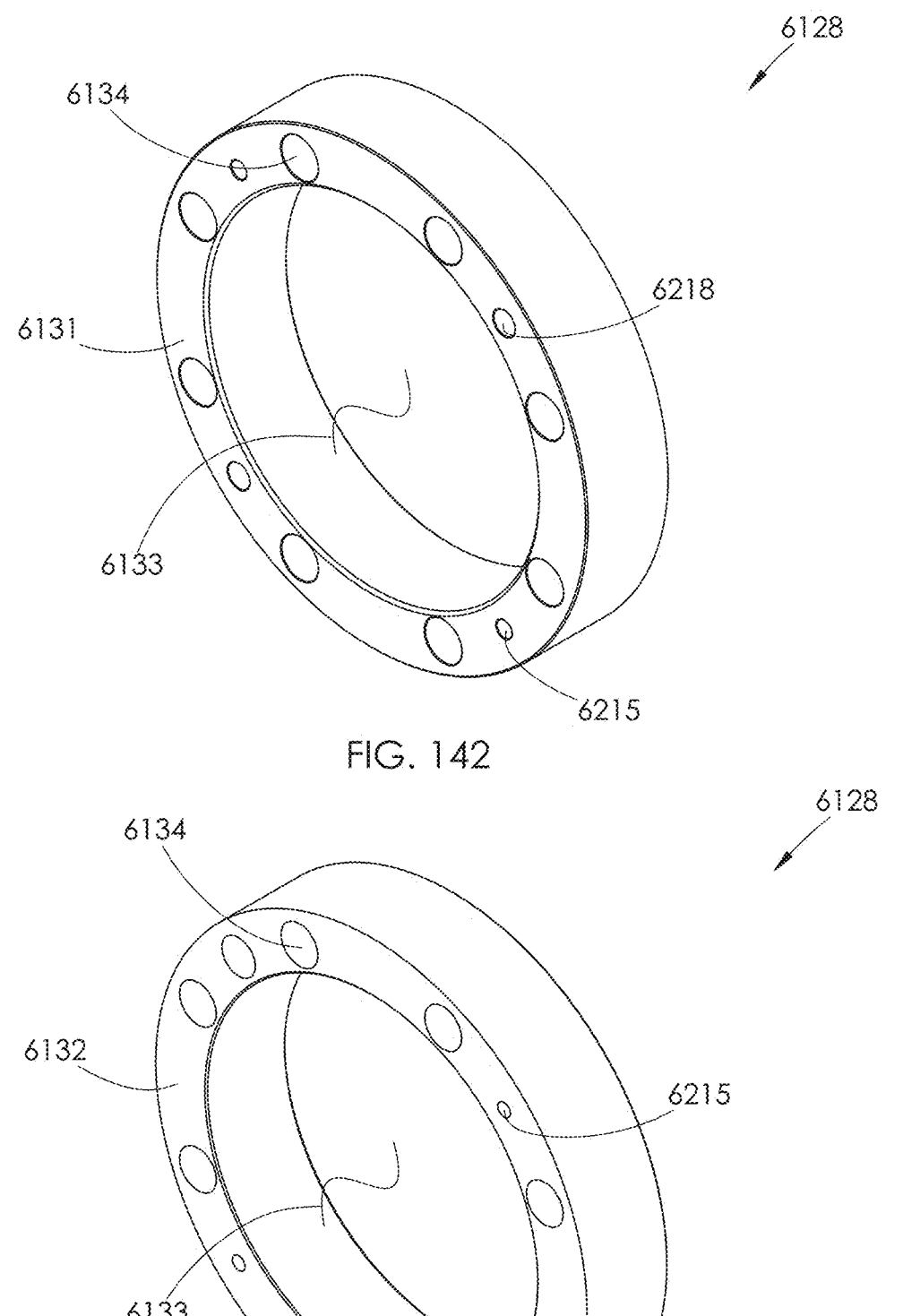

FIG. 142 is a right front perspective view of the rear spacer of the fluid end section shown in FIG. 126.

FIG. 143 is a left rear perspective view of the rear spacer shown in FIG. 142.

Figures 144, 145, 146, 147:
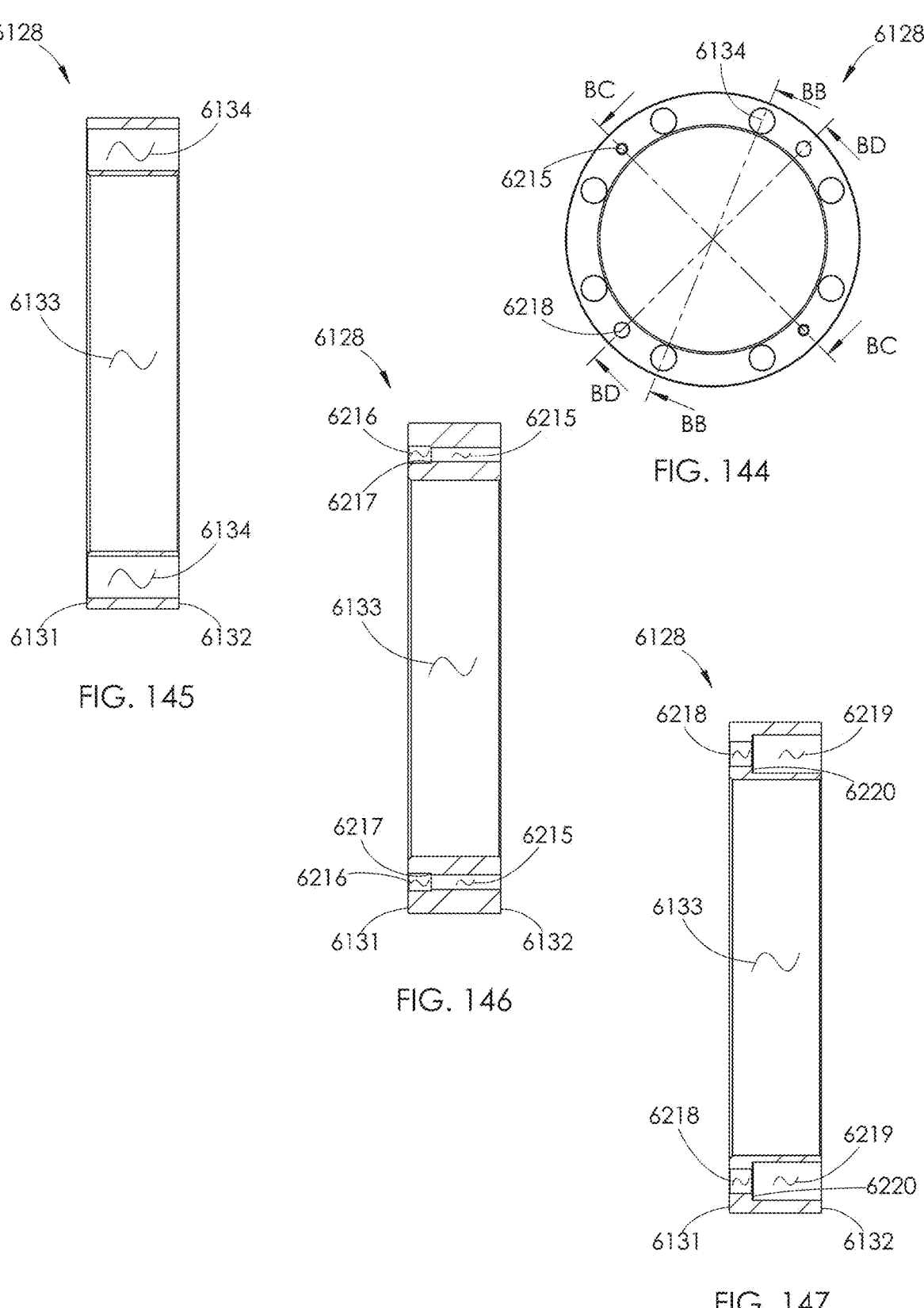

FIG. 144 is a front elevation view of the rear spacer shown in FIG. 142.

FIG. 145 is a cross-sectional view of the rear spacer shown in FIG. 144, taken along line BB-BB.

FIG. 146 is a cross-sectional view of the rear spacer shown in FIG. 144, taken along line BC-BC.

FIG. 147 is a cross-sectional view of the rear spacer shown in FIG. 144, taken along line BD-BD.

Figures 148, 149, 150:
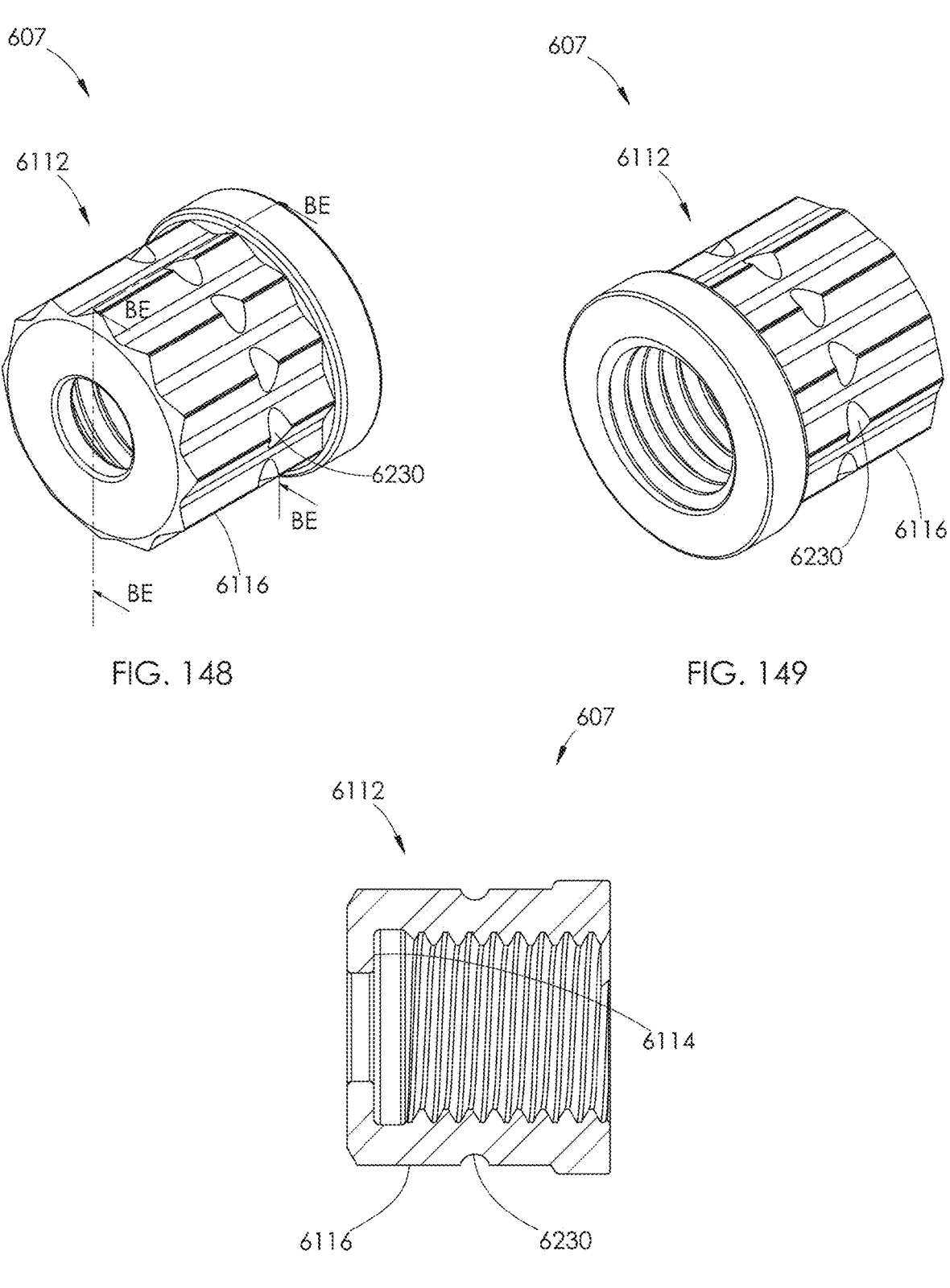

FIG. 148 is a right front perspective view of a blind nut of the fluid end shown in FIG. 126.

FIG. 149 is a left rear perspective view of the blind nut shown in FIG. 148.

FIG. 150 is a cross-sectional view of the blind nut shown in FIG. 148, taken along line BE-BE.

DETAILED DESCRIPTION

This application is directed to a clamping system for joining portions of a fluid end section together. Providing ease of disassembly of components along a bore of a fluid end section allows for wear components—such as packing within a stuffing box, valve components, and the like—to be quickly and promptly replaced or refurbished. However, the high pressure, abrasive environment of fluid ends, especially for hydraulic fracturing operations, also requires that such connections be properly made up. Errors in alignment are unacceptable, as they may cause damage to a pumping operation.

Shown in the attached figures is a fluid end section 100 of the type described in U.S. Patent Publication Number 2022/0397107, authored by Thomas, et. al., published Dec. 15, 2022, which is incorporated herein by reference. Referring now to FIGS. 1-5, the fluid end section 100 comprises a horizontally positioned housing 101, a fluid routing plug 102, retention plate 103, stuffing box 104, rear retainer 105, a plurality of studs 106, a plurality of blind nuts 107, a plurality of reaction washers 108, a plurality of nuts 109 a plurality of washers 110, a plurality of locating dowel pins 111, a plurality of retention plate fasteners 112, packing 113, a packing nut 114, a plunger 115, and a stuffing box seal 1127.

Referring now to FIGS. 6-10, the housing 101 comprises a longitudinal axis 116, opposed front and rear surfaces 117, 118 joined by an outer intermediate surface 119. A horizontal bore 120 is formed within the housing 101 and interconnects the front and rear surfaces 117, 118. The longitudinal axis 116 of the horizontal bore 120 is the longitudinal axis 116 of the housing 101. The horizontal bore 120 is sized to receive various components configured to route fluid through the housing 101. The various components will be described as necessary. The housing 101 is of multi-piece construction and further comprises a first section 121, a second section 122, a third section 123, a front wear ring 124, a front wear ring seal 125, a center wear ring 126, a center wear ring seal 127, a rear wear ring 128, a rear wear ring seal 129, a plurality of studs 130, a plurality of nuts 131, and a plurality of locating dowel pins 132.

Figures 13, 14, 15:
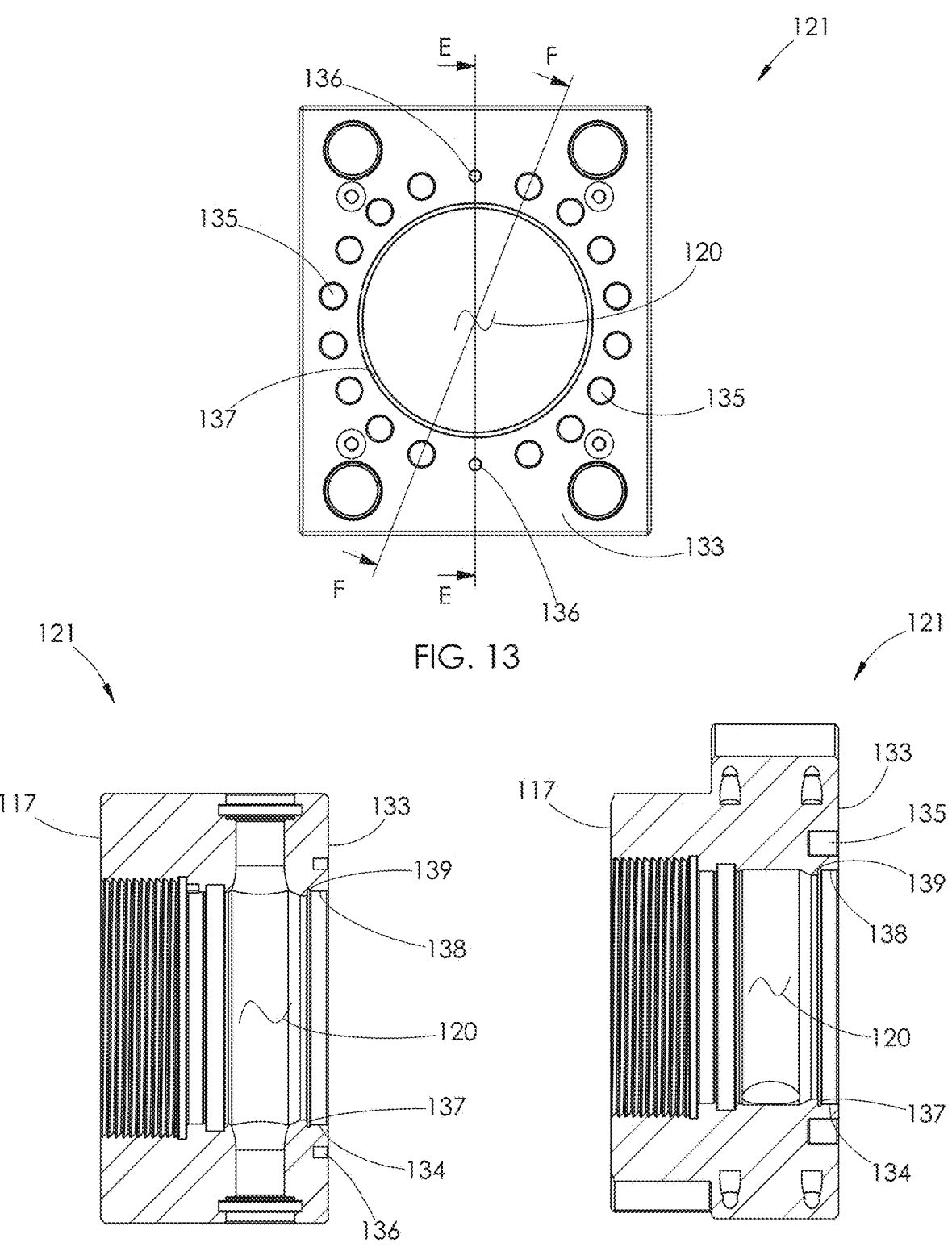
FIG. 13 is a rear elevation view of the first section shown in FIG. 11.
FIG. 14 is a cross-sectional view of the first section shown in FIG. 13, taken along line E-E.
FIG. 15 is a cross-sectional view of the first section shown in FIG. 13, taken along line F-F.

Referring now to FIGS. 11-15, the first section 121 comprises a front surface 117, which is also the front surface 117 of the housing 101, a rear surface 133, and a horizontal bore 120 interconnecting the front and rear surfaces 117, 133. The horizontal bore 120 of the first section 121 is a portion of the horizontal bore 120 of the housing 101. The rear surface 133 comprises a front wear ring counterbore 134, a plurality of threaded blind bores 135, and a plurality of blind bores 136 for receiving the locating dowel pins 132. The threaded blind bores 135 and blind bores 136 are spaced around the circumference of the horizontal bore 120 as shown in FIG. 13. When assembled, the longitudinal axes of the threaded blind bores 135 and blind bores 136 are parallel to the longitudinal axis 116 of the housing 101. The front wear ring counterbore 134 comprises a base 137 and a wall 138. The wall 138 comprises a seal groove 139.

Figures 16, 17, 18, 19:
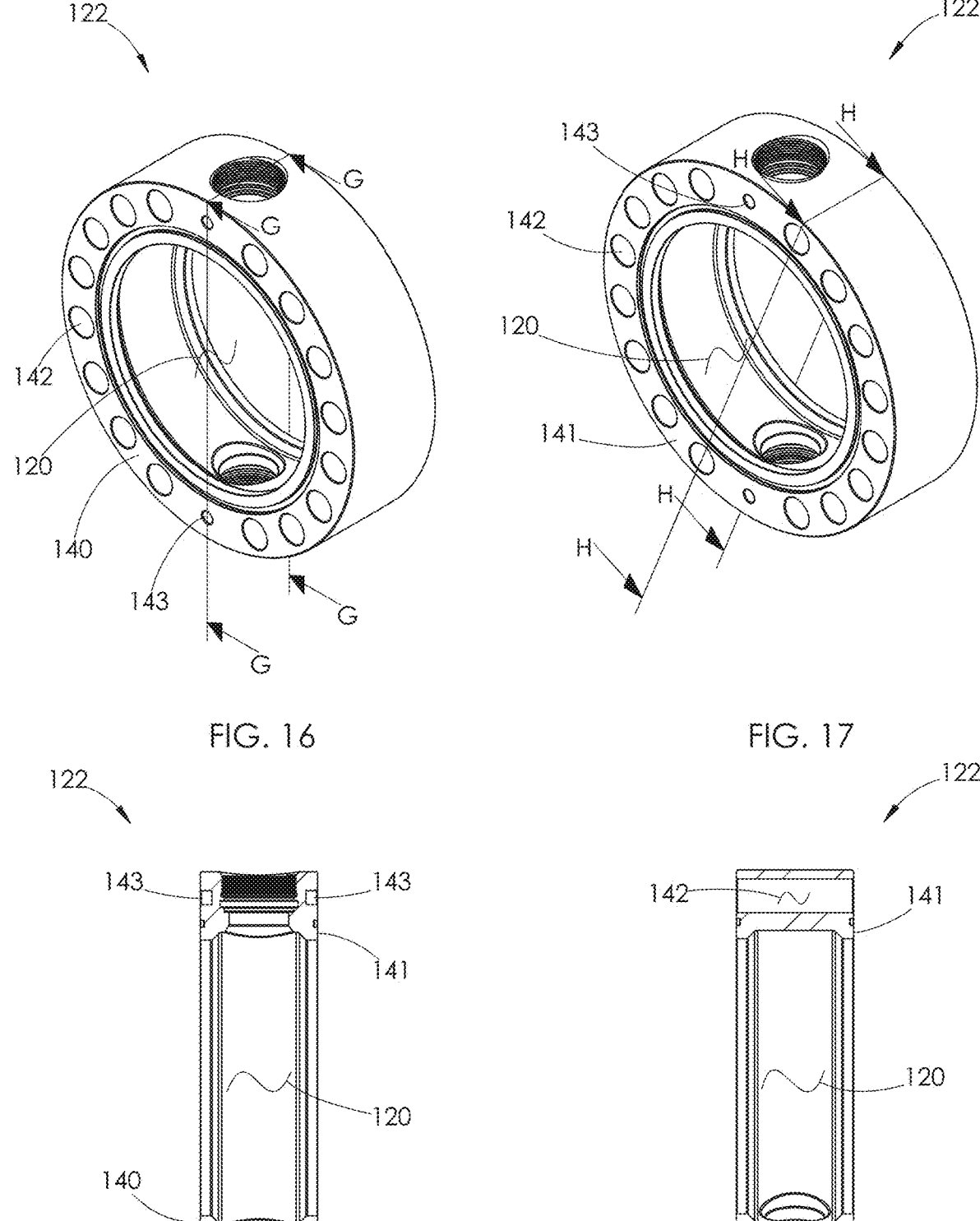
FIG. 16 is a right front perspective view of the second section.
FIG. 17 is a left rear perspective view of the second section shown in FIG. 16.
FIG. 18 is a cross-sectional view of the second section shown in FIG. 16, taken along line G-G.
FIG. 19 is a cross-sectional view of the second section shown in FIG. 17, taken along line H-H.

Referring now to FIGS. 16-19, the second section 122 comprises a front surface 140, rear surface 141, a plurality of through holes 142, and a horizontal bore 120. The horizontal bore 120 of the second section 122 is a portion of the horizontal bore 120 of the housing 101. The plurality of through holes 142 and the horizontal bore 120 interconnect the front and rear surfaces 140, 141. The front and rear surfaces 140, 141 comprise a plurality of blind bores 143 for receiving locating dowel pins 132. The through holes 142 and blind bores 143 are spaced around the circumference of the horizontal bore 120 as shown in FIGS. 16-17. When assembled, the longitudinal axes of the through holes 142 and blind bores 143 are parallel to the longitudinal axis 116 of the housing 101.

Figures 20, 21, 22, 23:
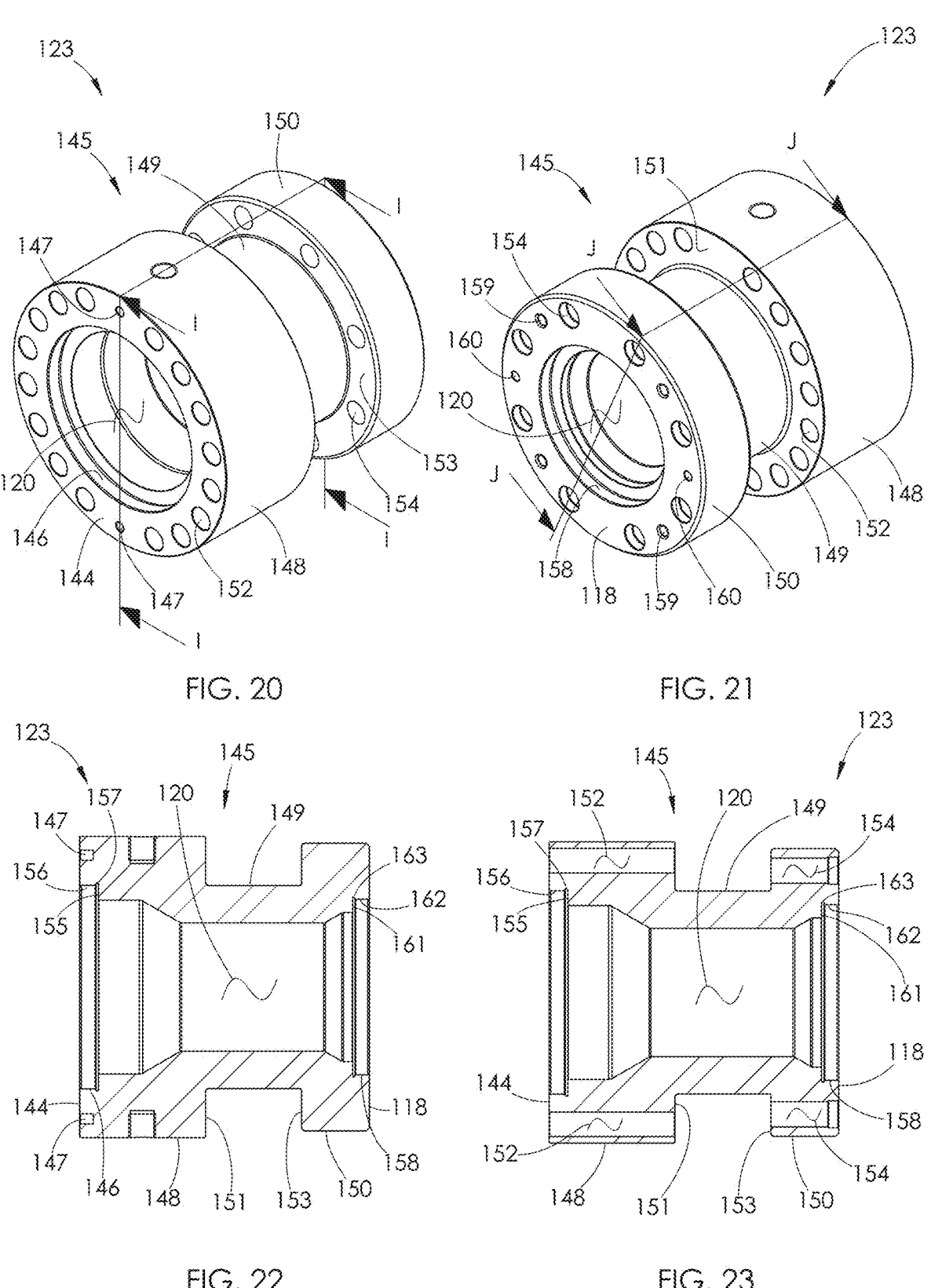
FIG. 20 is a right front perspective view of the third section.
FIG. 21 is a left rear perspective view of the third section shown in FIG. 20.
FIG. 22 is a cross-sectional view of the third section shown in FIG. 20, taken along line I-I.
FIG. 23 is a cross-sectional view of the third section shown in FIG. 21, taken along line J-J.

Referring now to FIGS. 20-23, the third section 123 comprises a front surface 144, a rear surface 118, which is also the rear surface 118 of the housing 101, an intermediate outer surface 145, and a horizontal bore 120. The horizontal bore 120 of the third section 123 is a portion of the horizontal bore 120 of the housing 101. The horizontal bore 120 interconnects the front and rear surfaces 144, 118 of the third section 123. The front surface 144 comprises a center wear ring counterbore 146, and a plurality of blind bores 147 for receiving locating dowel pins 132. The intermediate outer surface 145 comprises a front flange 148, center section 149, and rear flange 150. The front flange 148 comprises a front surface 144, which is also the front surface 144 of the third section 123, a rear surface 151, and a plurality of through holes 152 that interconnect the front surface 144 and the rear surface 151 of the front flange 148. The through holes 152 and blind bores 147 are spaced around the circumference of the horizontal bore 120 as shown in FIG. 20. When assembled, the longitudinal axes of the through holes 152 and blind bores 147 are parallel to the longitudinal axis 116 of the housing 101. The center wear ring counterbore 146 comprises a base 155 and a wall 156. The wall 156 comprises a seal groove 157. The rear flange 150 comprises a front surface 153, a rear surface 118, which is also the rear surface 118 of the third section 123 and the housing 101, and a plurality of through holes 154 that interconnect the front surface 153 to the rear surface 118 of the rear flange 150. The rear surface 118 comprises a rear wear ring counterbore 158, a plurality of threaded blind bores 159 for receiving the retention plate fasteners 112, and a plurality of blind bores 160 for receiving the locating dowel pins 132. The rear wear ring counterbore 158 comprises a base 161 and a wall 162. The wall 162 comprises a seal groove 163. The through holes 154 are spaced around the circumference of the horizontal bore 120 as shown in FIG. 21. When assembled, the longitudinal axes of the through holes 154, threaded blind bores 159, and blind bores 160 are parallel to the longitudinal axis 116 of the housing 101.

Figures 24, 25:
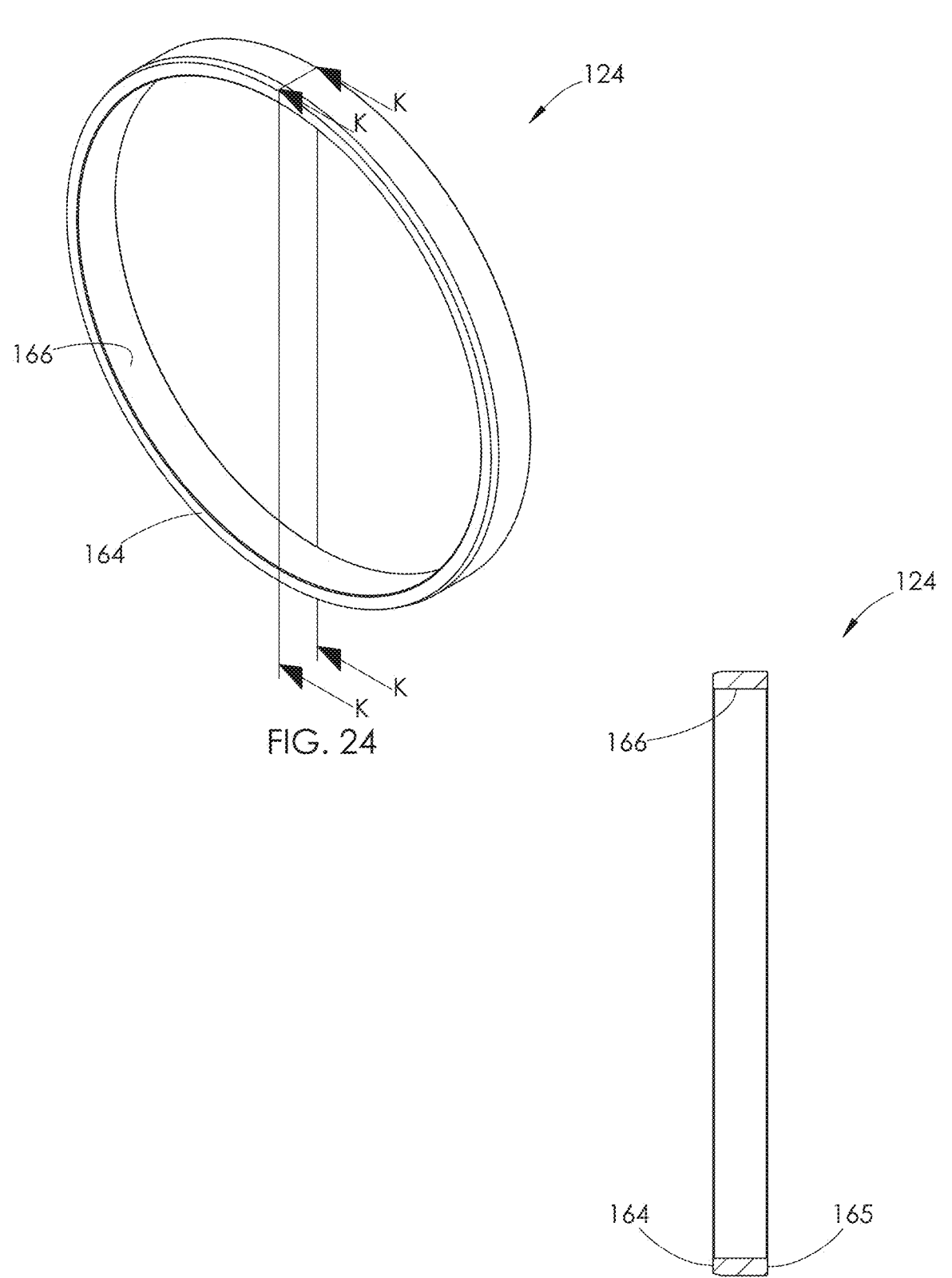
FIG. 24 is a front perspective view of the front wear ring.
FIG. 25 is a cross-sectional view of the front wear ring shown in FIG. 24, taken along line K-K.

The front wear ring 124 comprises a front surface 164, a rear surface 165, and an inner intermediate surface 166 as shown in FIGS. 24-25.

Figure 26:
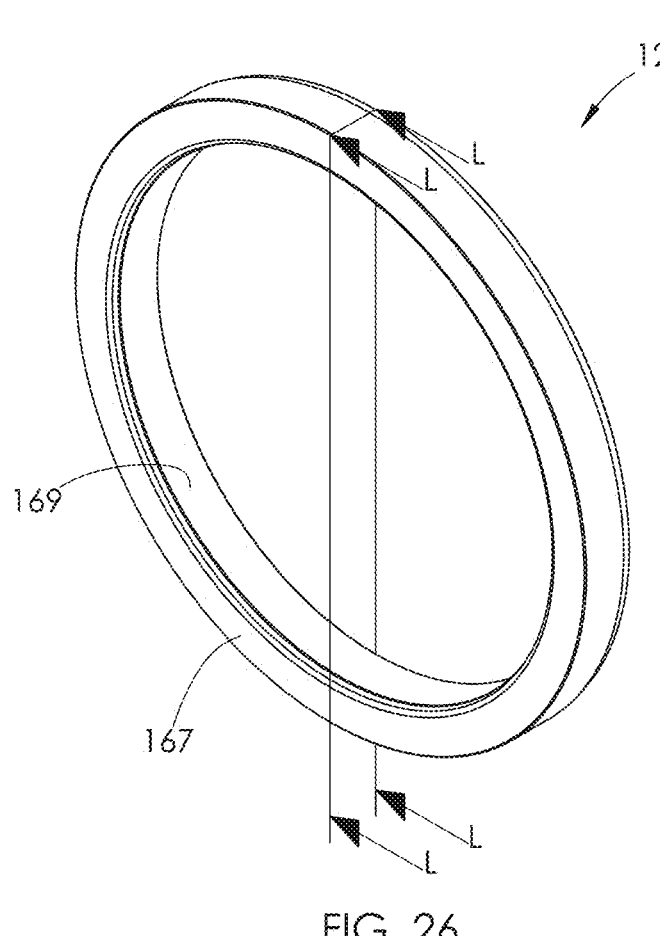
FIG. 26 is a front perspective view of the center wear ring.
Figure 27:
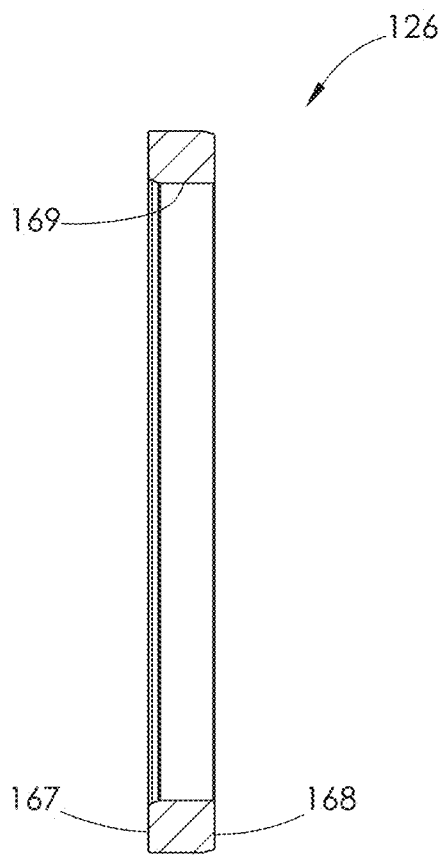
FIG. 27 is a cross-sectional view of the center wear ring shown in FIG. 26, taken along line L-L.

The center wear ring 126 comprises a front surface 167, a rear surface 168, and an inner intermediate surface 169 as shown in FIGS. 26-27.

Figures 28, 29:
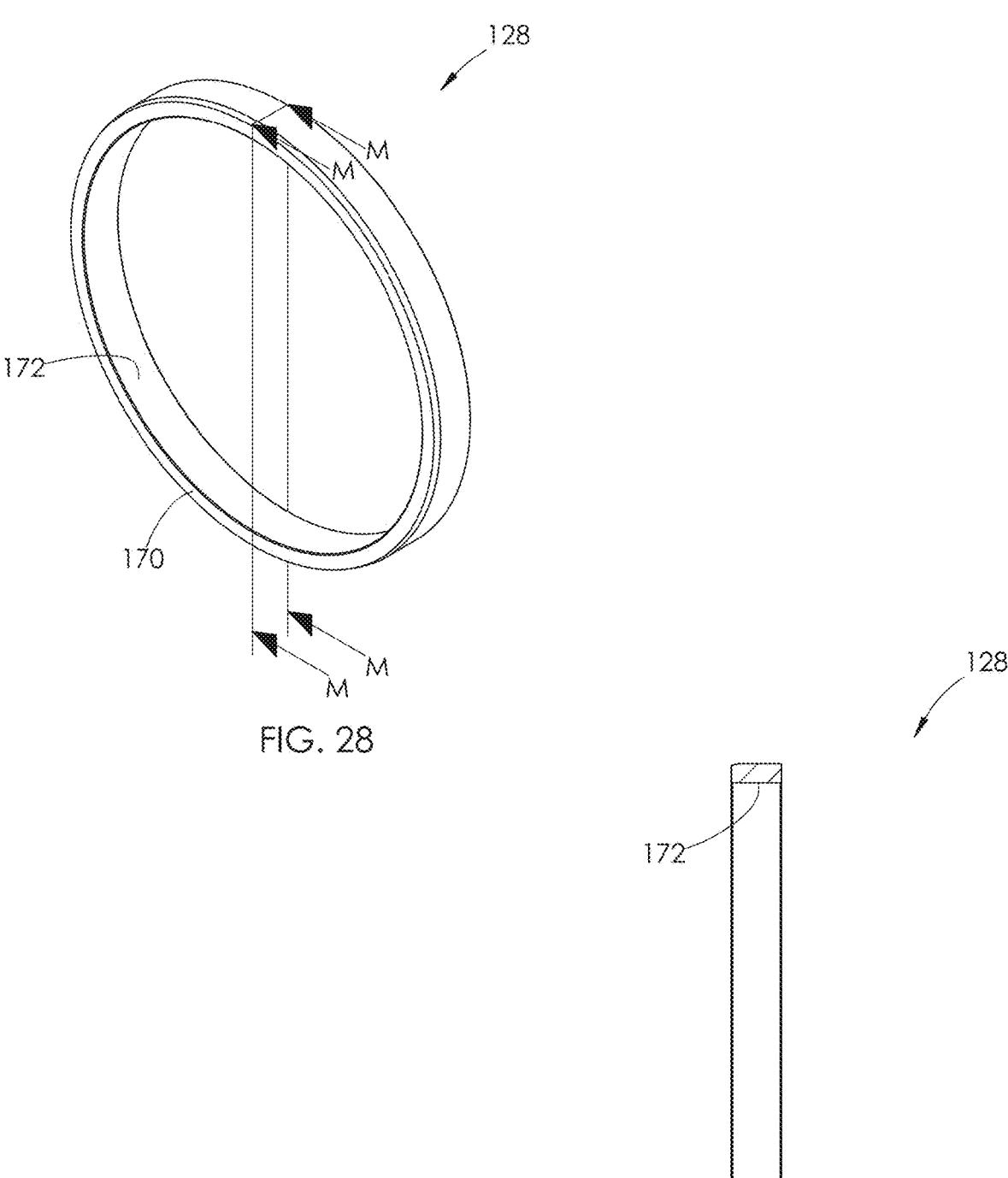
FIG. 28 is a front perspective view of the rear wear ring.
FIG. 29 is a cross-sectional view of the rear wear ring shown in FIG. 28, taken along line M-M.

The rear wear ring 128 comprises a front surface 170, a rear surface 171, and an inner intermediate surface 172 as shown in FIGS. 28-29.

Figure 9:
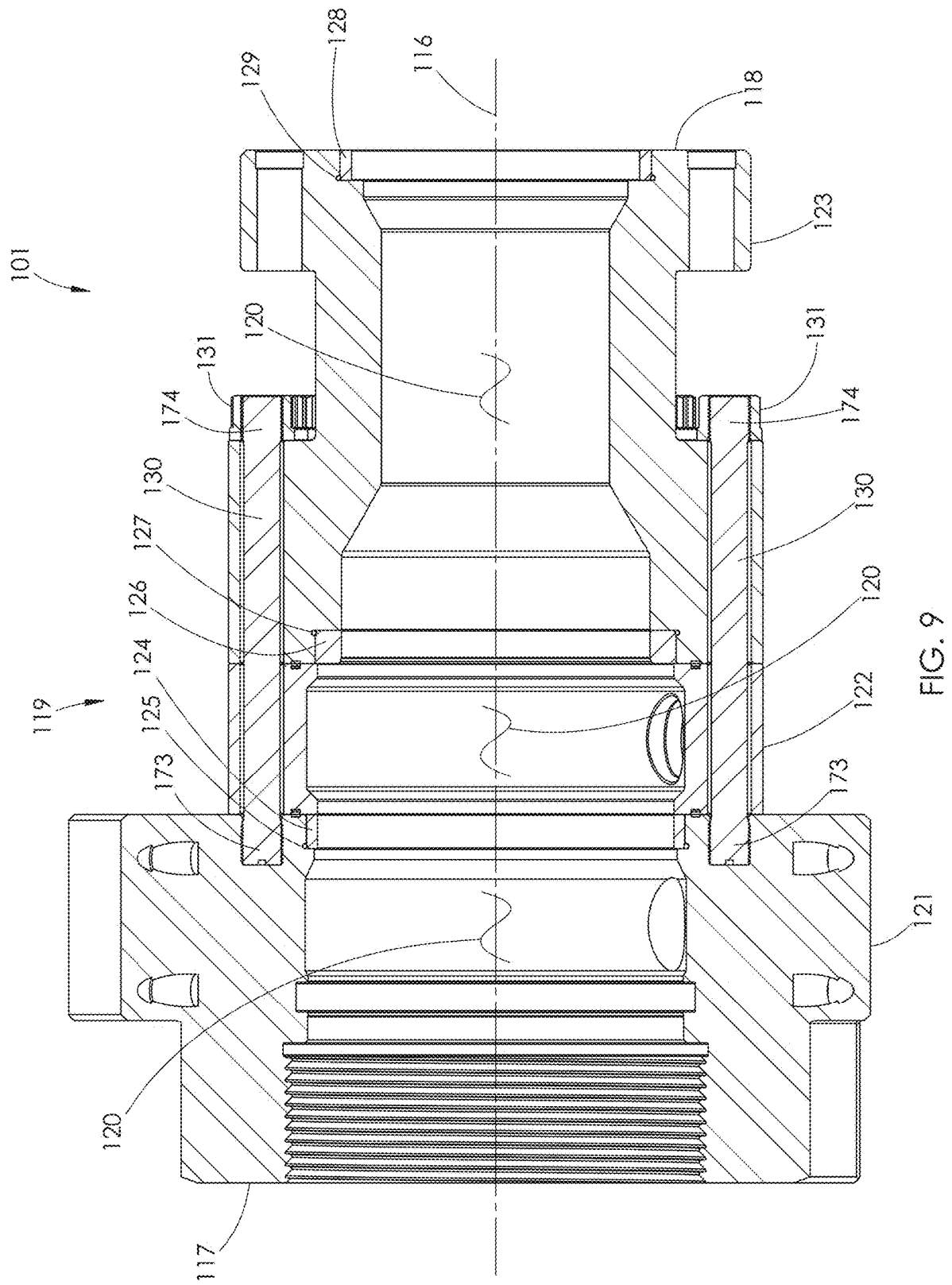
FIG. 9 is a cross-sectional view of the housing shown in FIG. 7, taken along line D-D.
Figure 10:
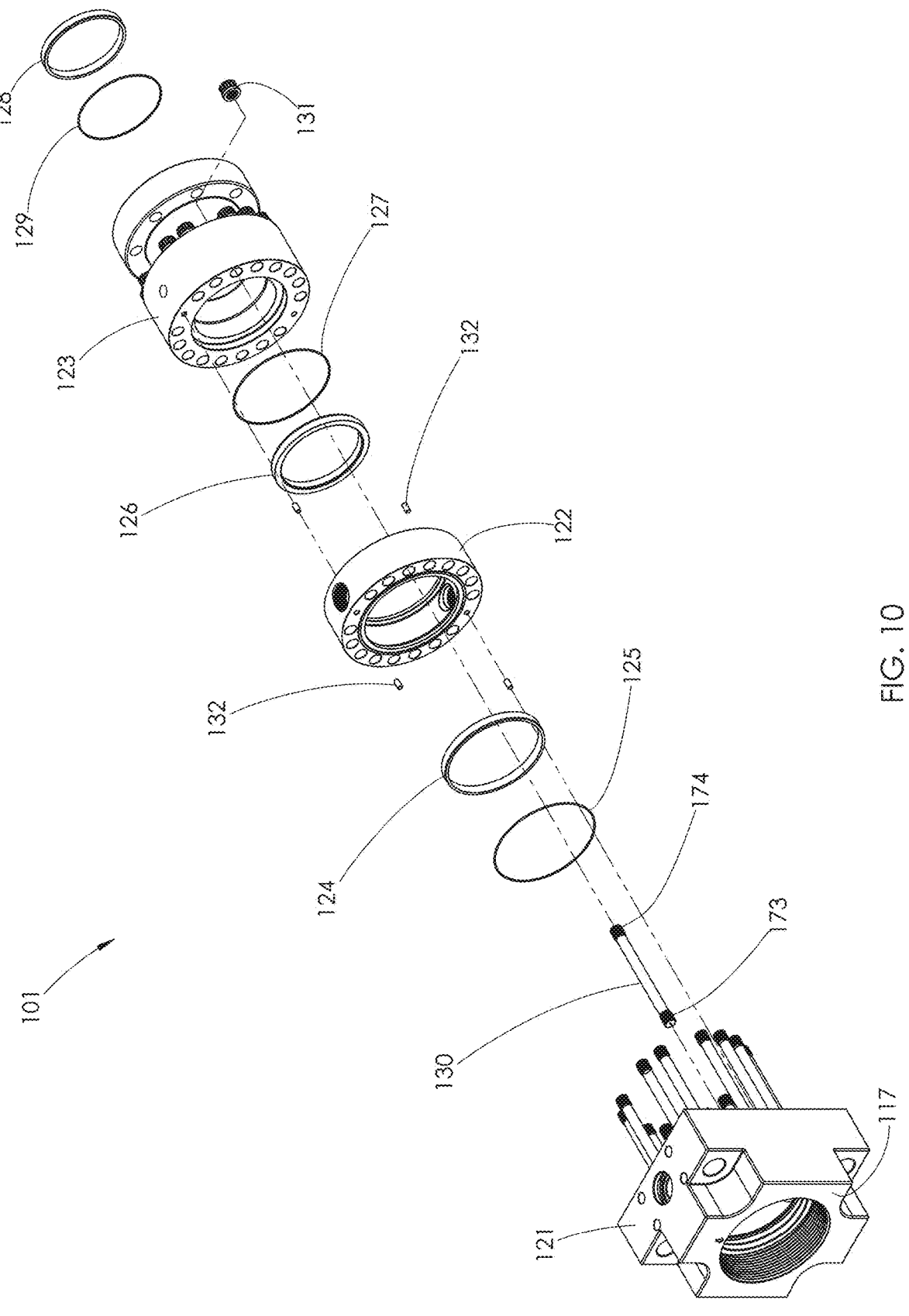
FIG. 10 is an exploded view of the housing shown in FIG. 6.
Figure 11:
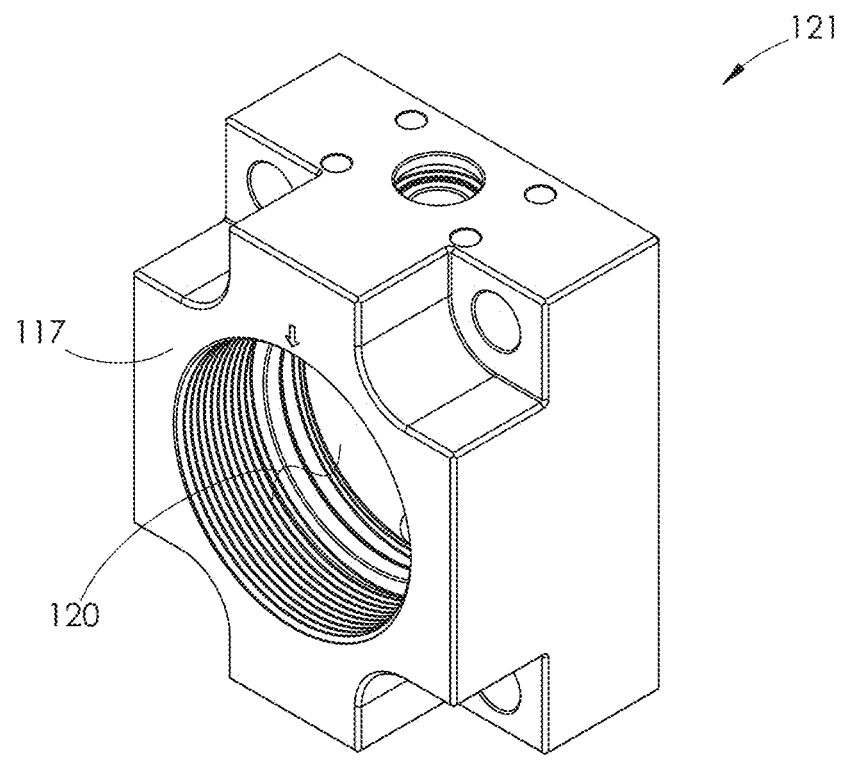
FIG. 11 is a right front perspective view of the first section.
Figure 12:
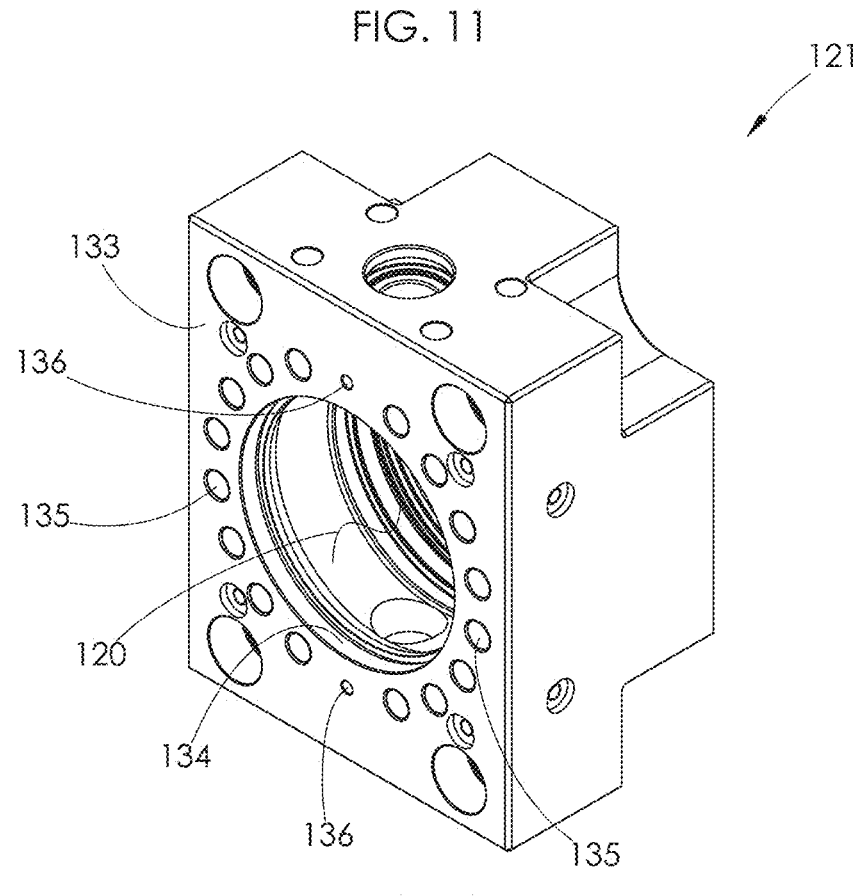
FIG. 12 is a left rear perspective view of the first section shown in FIG. 11.

Each stud 130 comprises a first externally threaded end 173 and a second externally threaded end 174 as shown in FIGS. 9-10.

Referring now to FIGS. 30-33, the fluid routing plug 102 comprises an outer intermediate surface 175, a front seal 176, and a rear seal 177. The outer intermediate surface 175 comprises an annular shoulder 178, front seal groove 179, and rear seal groove 180. The annular shoulder 178 comprises a stress relief cutout 181.

Figures 34, 35:
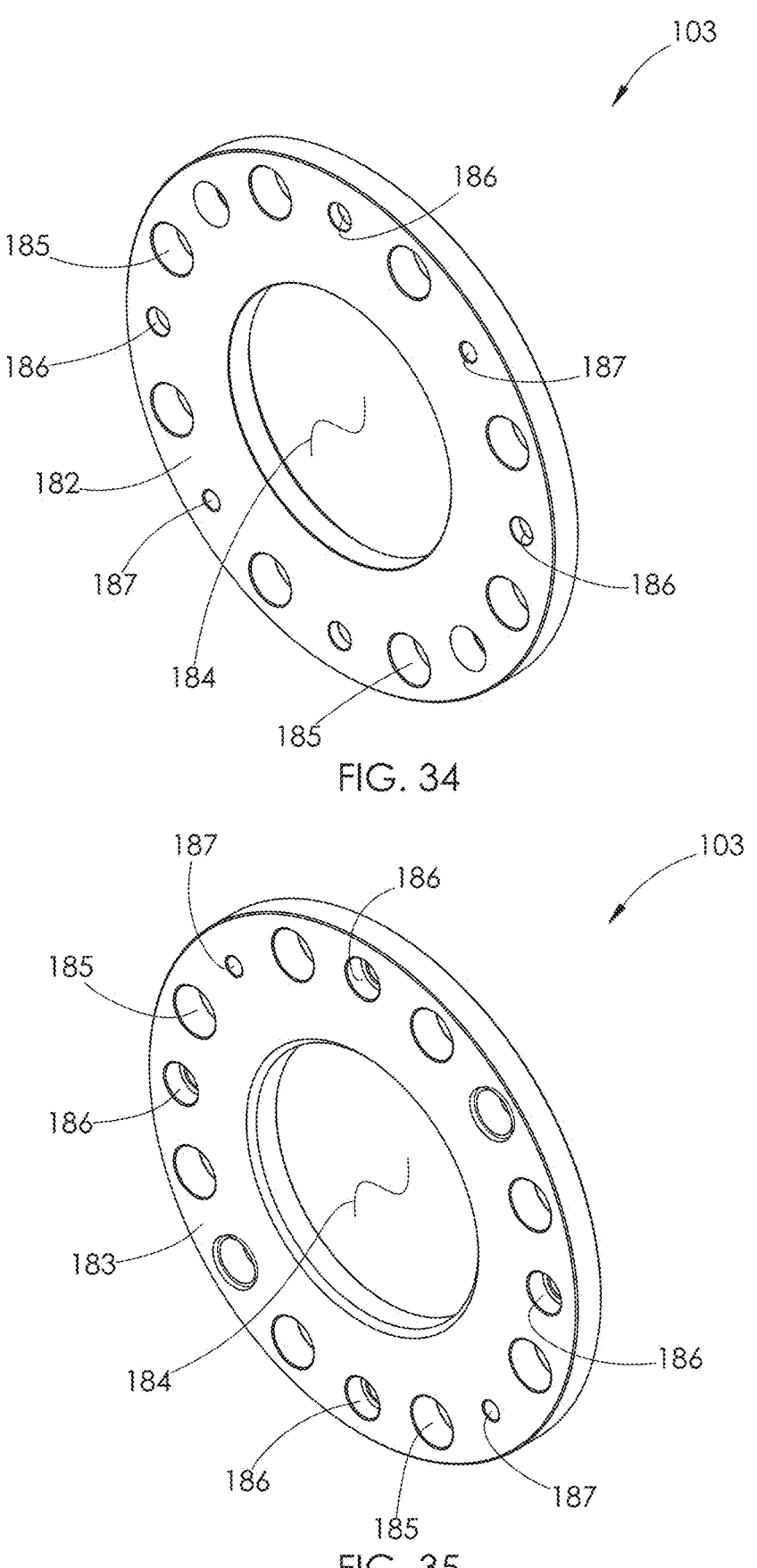
FIG. 34 is a right front perspective view of the retention plate.
FIG. 35 is a left rear perspective view of the retention plate shown in FIG. 34.

Referring now to FIGS. 34-35, the retention plate 103 comprises a front surface 182, rear surface 183, a central bore 184, a plurality of stud through holes 185, a plurality of fastener through holes 186, and a plurality of locating dowel pin through holes 187. When assembled, the central bore 184 is concentric with the horizontal bore 120 of the housing 101. The through holes 185, 186, 187 are spaced around the circumference of the central bore 184 as shown in FIGS. 34-35.

Referring now to FIGS. 36-38, the stuffing box 104 comprises a front surface 188, rear surface 189, an intermediate cylindrical outer surface 190, a central bore 191, and a plurality of through holes 192. When assembled, the central bore 191 is concentric with the horizontal bore 120 of the housing 101. The through holes 192 are spaced around the circumference of the central bore 191 as shown in FIGS. 36-37. The central bore 191 comprises a smaller diameter section 193, a larger diameter section 194, and a shoulder 195. The smaller diameter section 193 extends from the front surface 188 of the stuffing box 104 to the shoulder 195 formed by the increase in diameter. The larger diameter section 194 extends from the shoulder 195 to the rear surface 189 of the stuffing box 104. The front surface 188 comprises an annular extension 196. The annular extension 196 is concentric with the central bore 191 and comprises an inside diameter 197 and an outside diameter 198. The inside diameter 197 of the annular extension 196 is the same as the smaller diameter section 193 of the central bore 191. The outside diameter 198 is smaller than the outside diameter of the intermediate cylindrical outer surface 190. The rear surface 189 comprises a plurality of blind bores 199 for receiving the locating dowel pins 111.

Figures 39, 40, 41, 42:
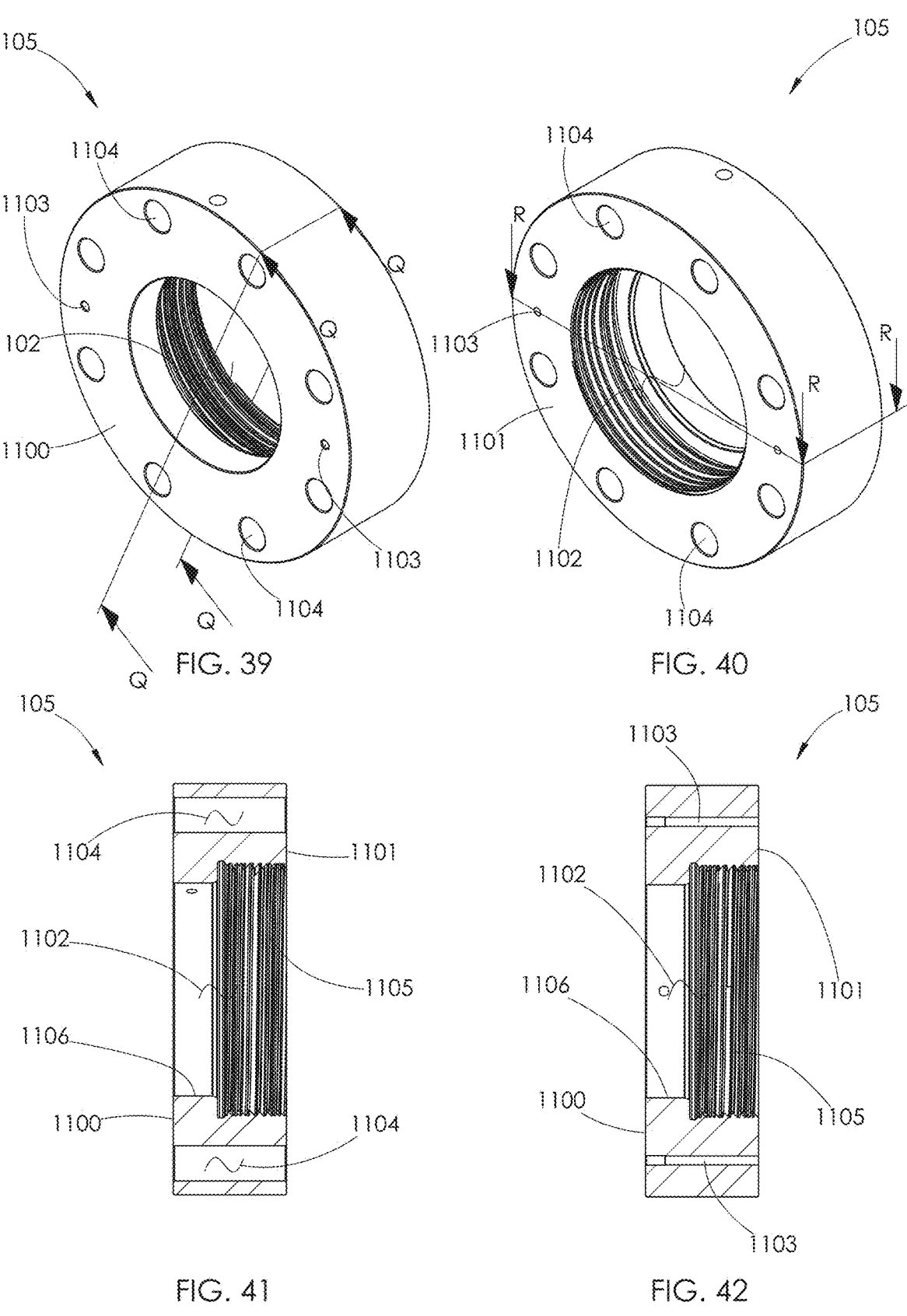
FIG. 39 is a right front perspective view of the rear retainer.
FIG. 40 is a left rear perspective view of the rear retainer shown in FIG. 39
FIG. 41 is a cross-sectional view of the rear retainer shown in FIG. 39, taken along line Q-Q.
FIG. 42 is a cross-sectional view of the rear retainer shown in FIG. 40, taken along line R-R.

Referring now to FIGS. 39-42, the rear retainer 105 comprises a front surface 1100, rear surface 1101, a central bore 1102, a plurality of locating dowel pin through holes 1103 and a plurality of stud through holes 1104. When assembled, the central bore 1102 is concentric with the horizontal bore 120 of the housing 101. The through holes 1103, 1104 are spaced around the circumference of the central bore 1102 as shown in FIGS. 39-40. The central bore 1102 comprises a threaded section 1105 and an unthreaded section 1106.

Figures 1, 2:
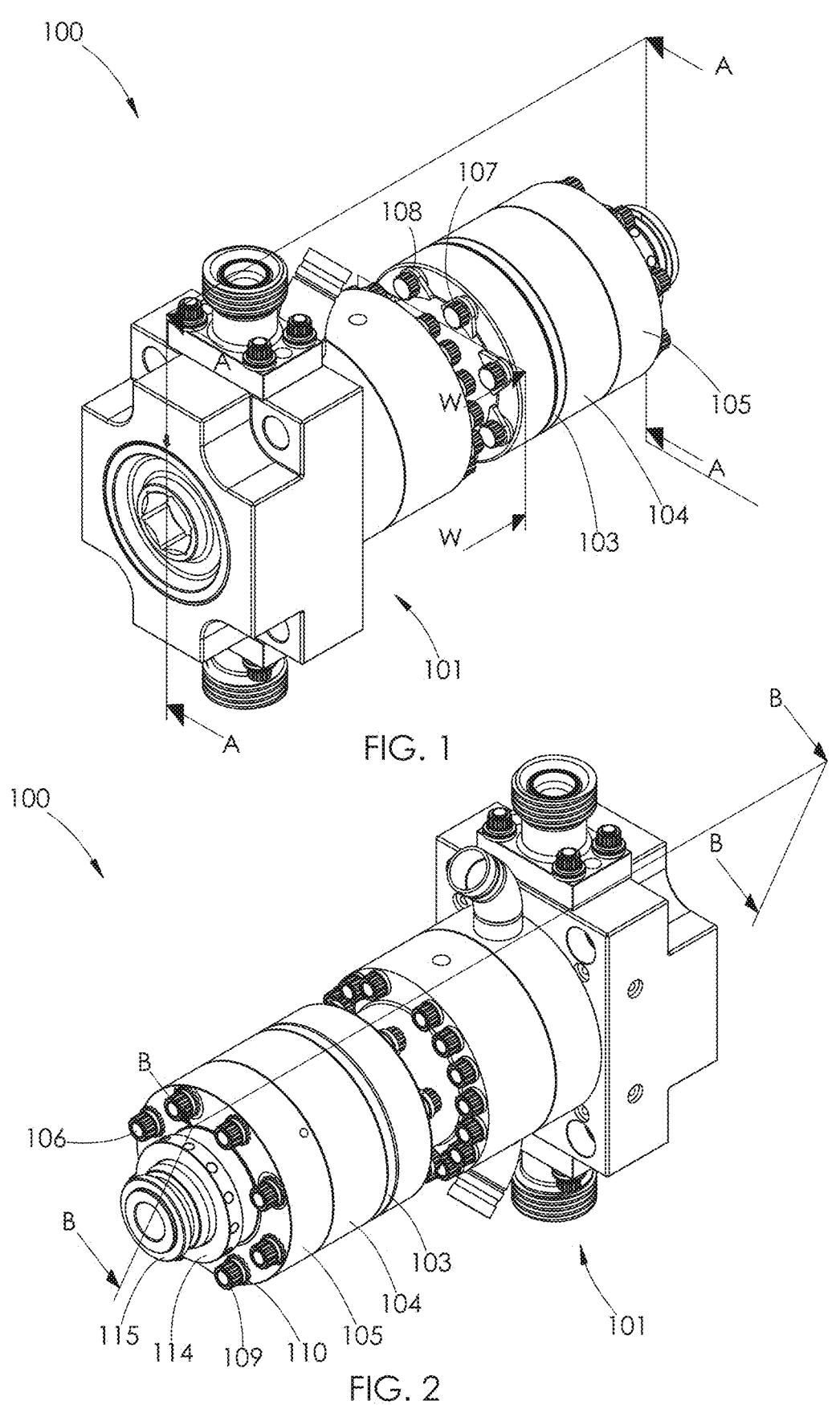
FIG. 1 is a right front perspective view of a fluid end section.
FIG. 2 is a left rear perspective view of the fluid end section shown in FIG. 1.
Figure 3:
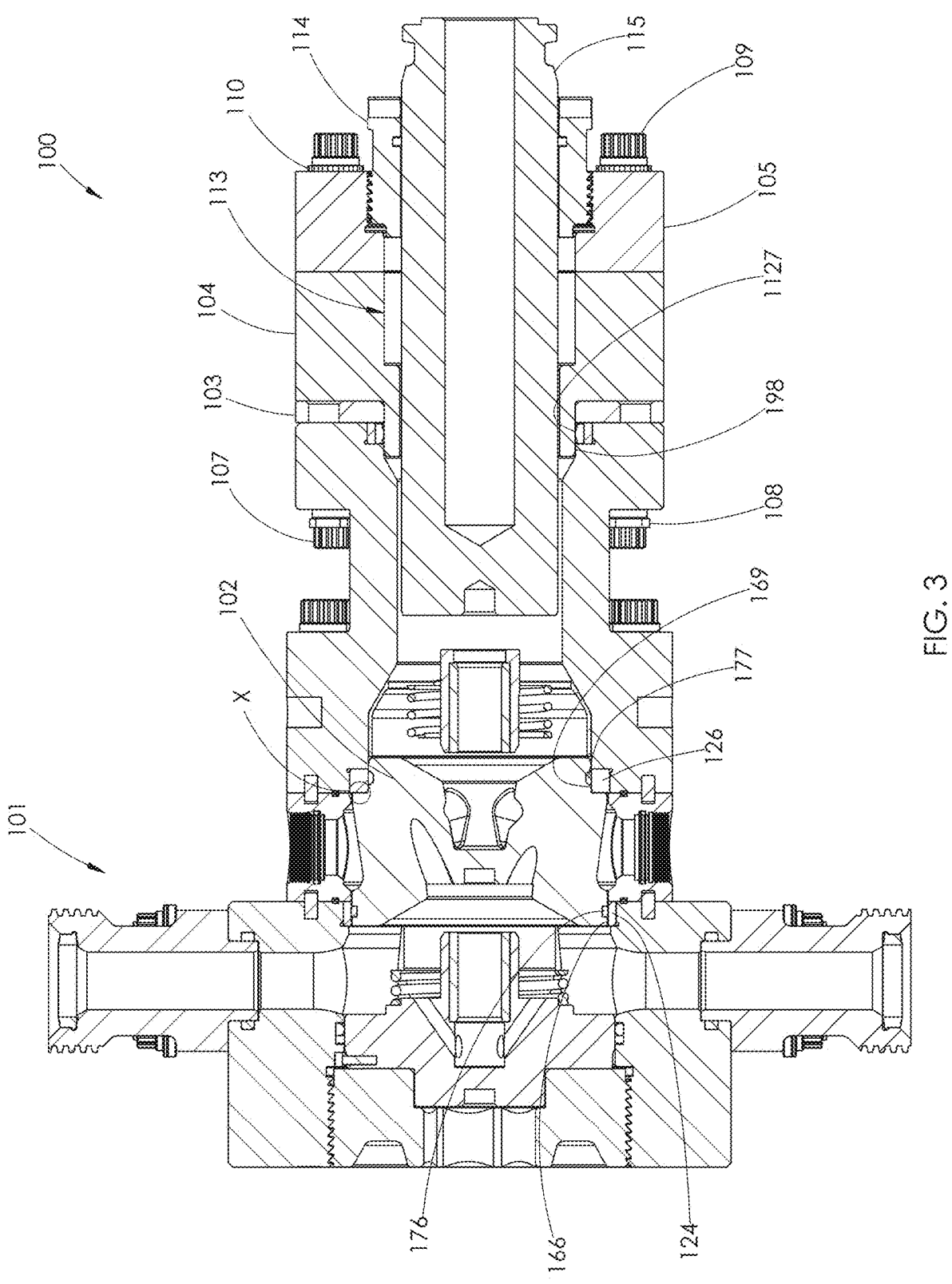
FIG. 3 is a cross-sectional view of the fluid end section shown in FIG. 1, taken along line A-A.
Figure 4:
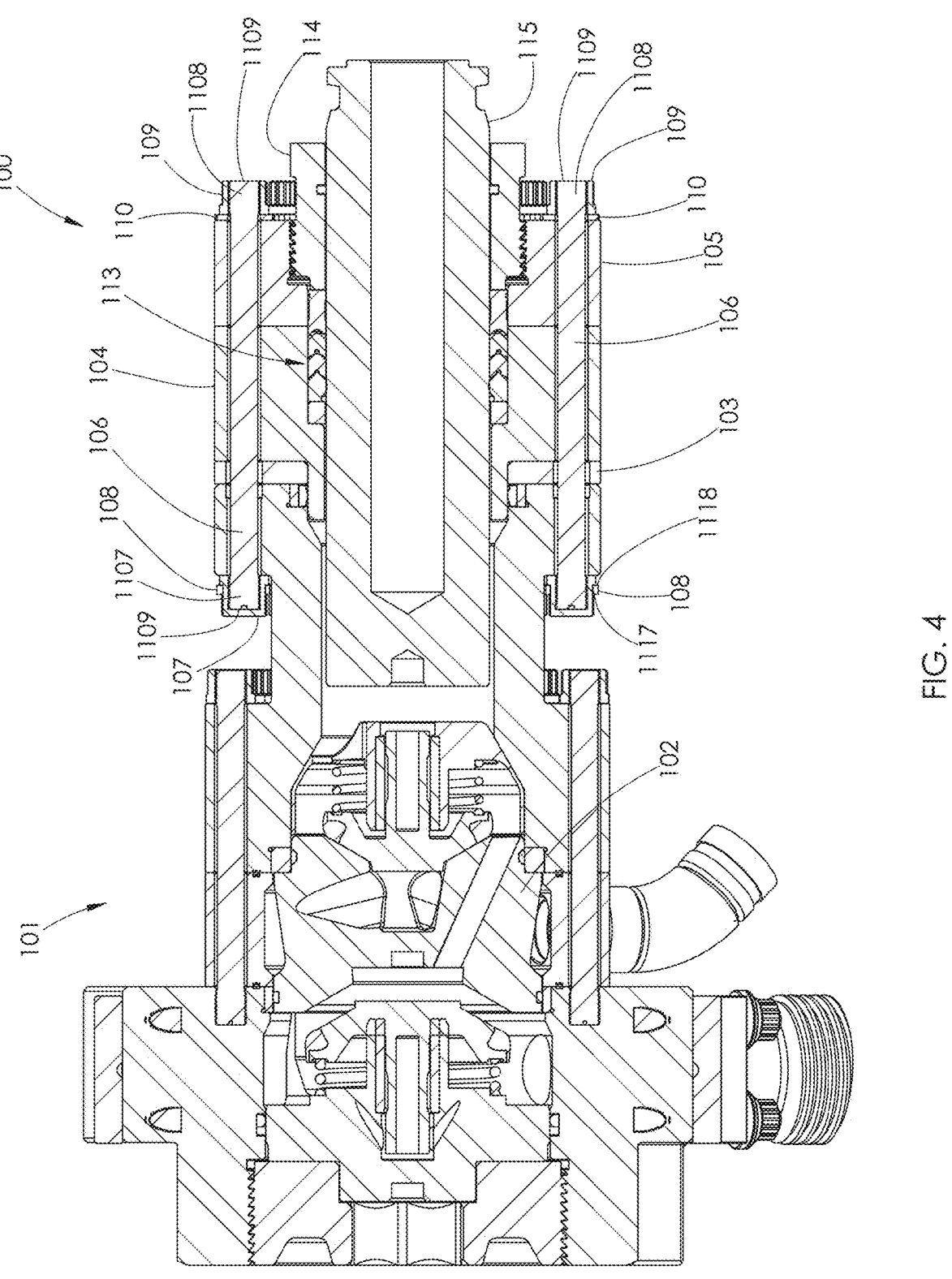
FIG. 4 is a cross-sectional view of the fluid end section shown in FIG. 2, taken along line B-B.
Figure 5:
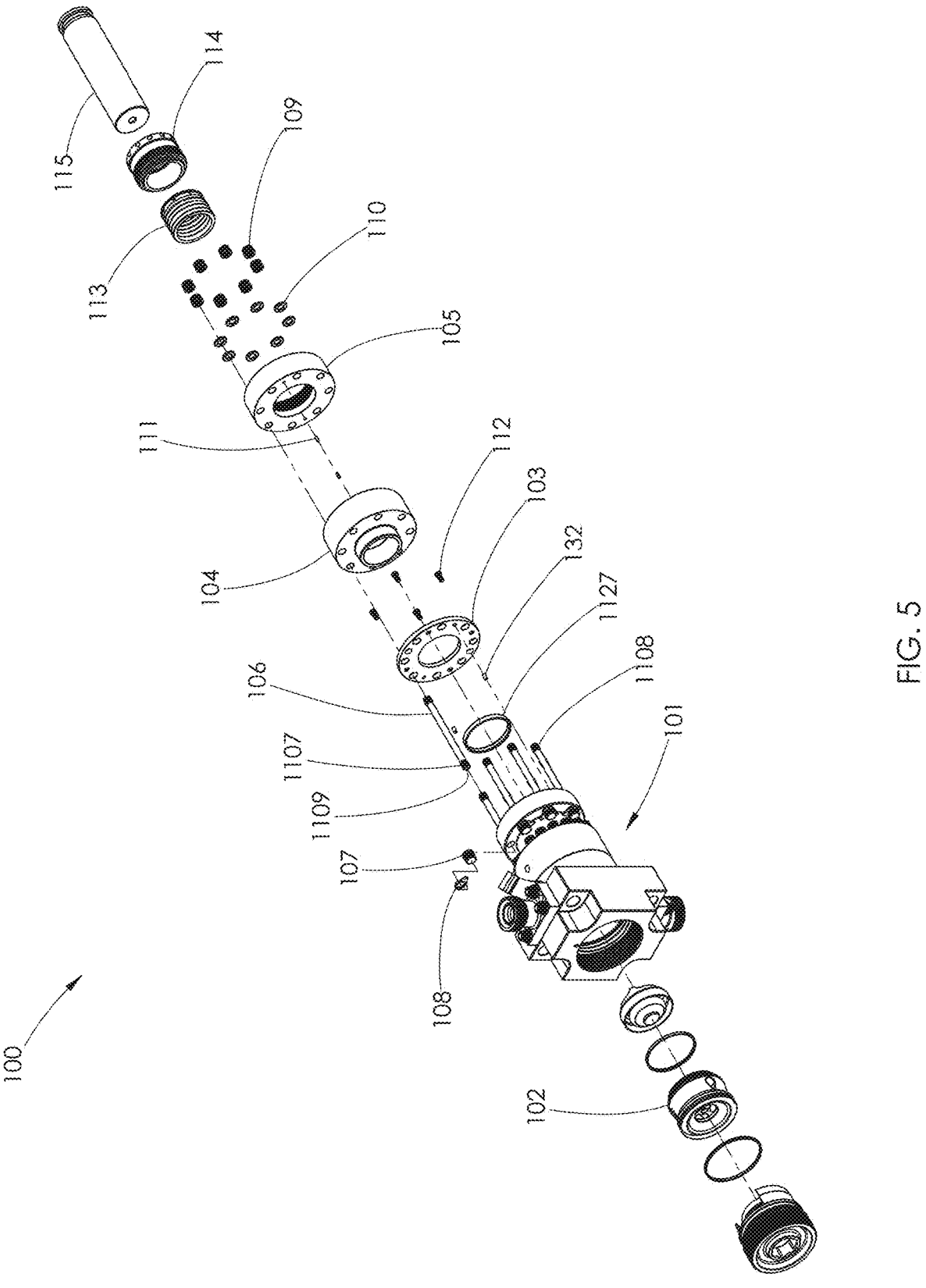
FIG. 5 is a partially exploded view of the fluid end section shown in FIG. 1.
Figure 6:
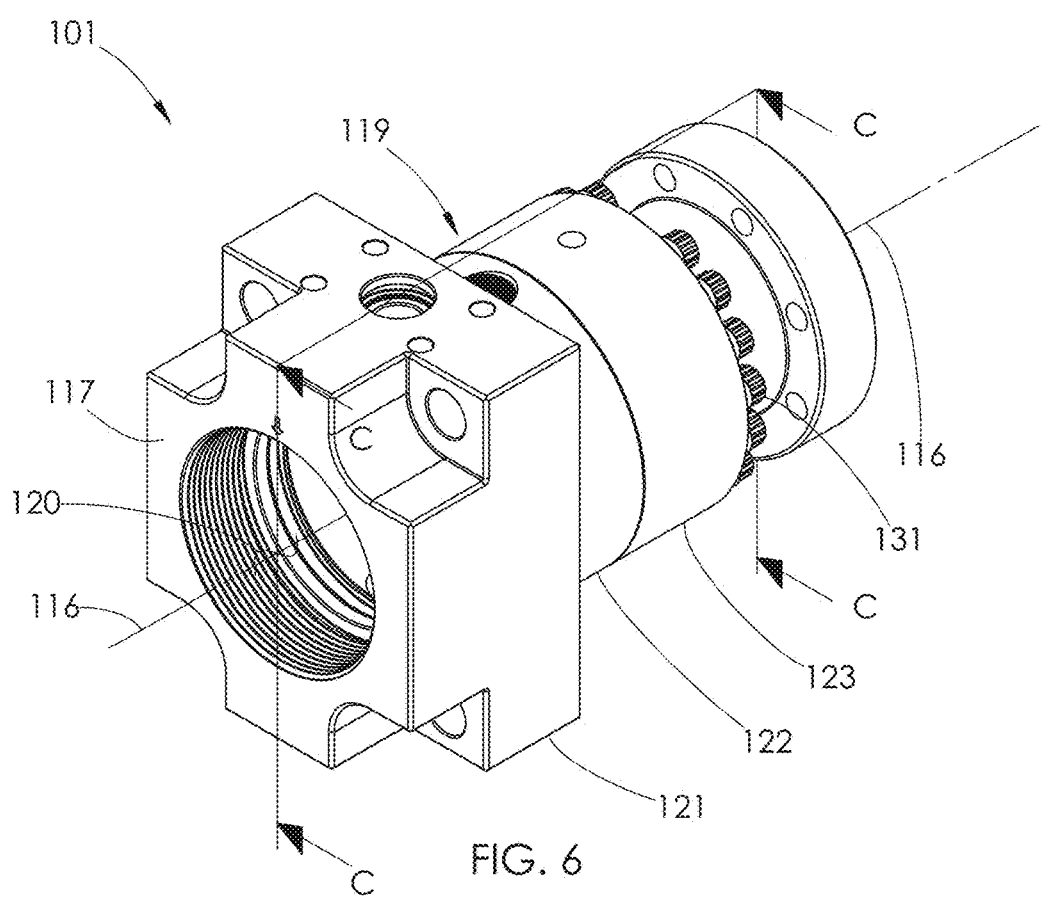
FIG. 6 is a right front perspective view of a housing.
Figure 7:
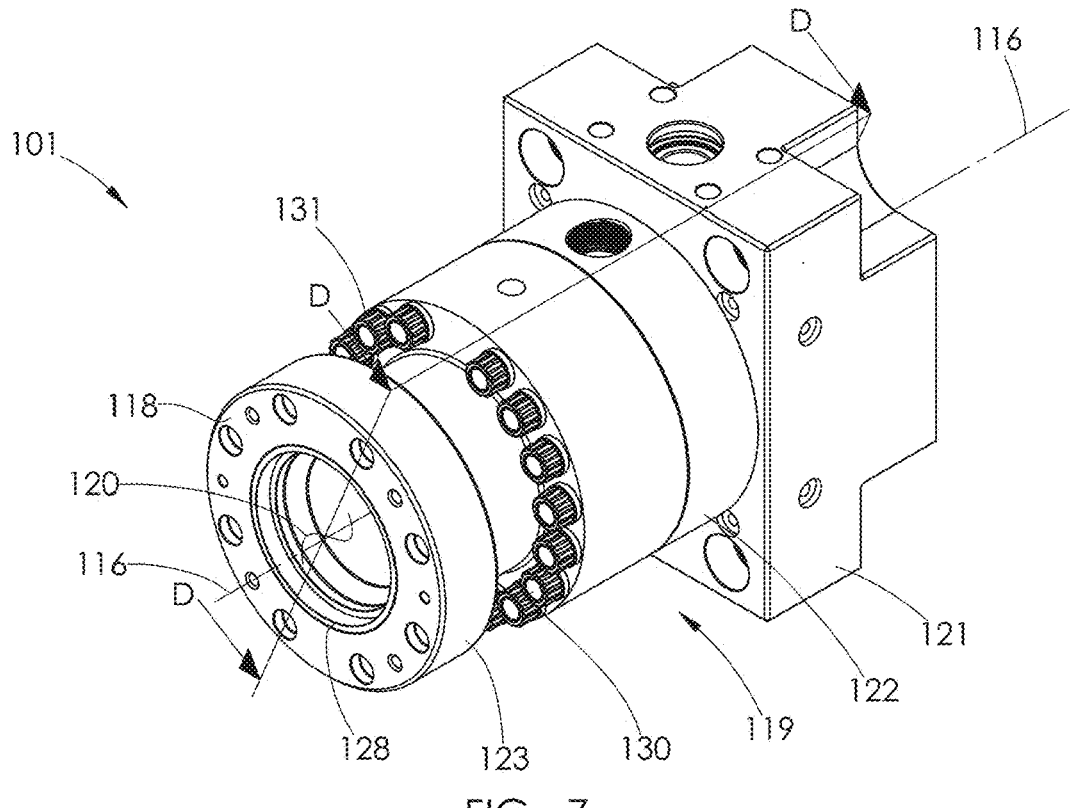
FIG. 7 is a left rear perspective view of the housing shown in FIG. 6.

Each stud 106 comprises a first externally threaded end 1107, a second externally threaded end 1108, and a plurality of end surfaces 1109 as shown in FIGS. 4-5.

Figures 43, 44, 45:
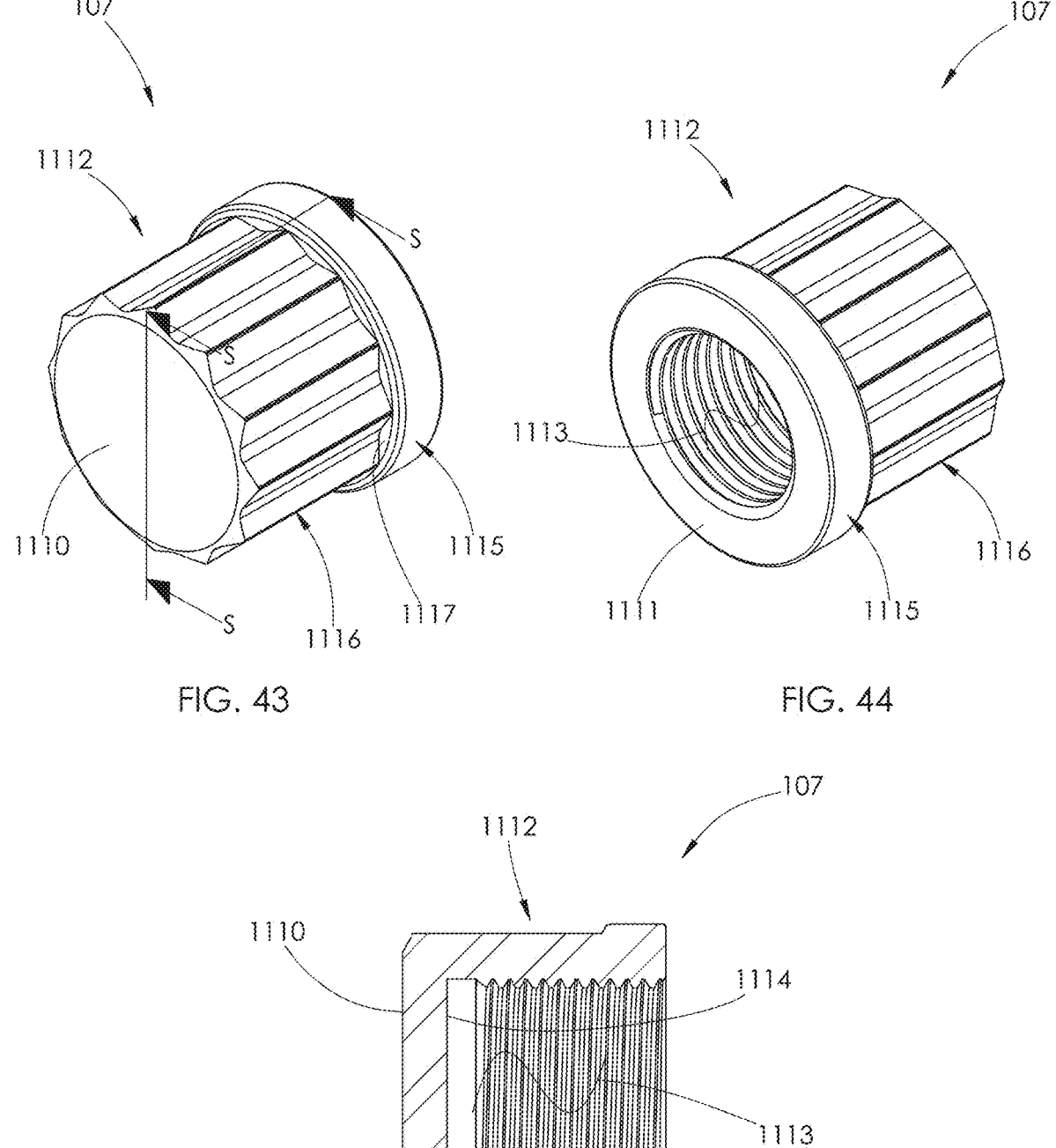
FIG. 43 is a right front perspective view of the blind nut.
FIG. 44 is a left rear perspective view of the blind nut shown in FIG. 43.
FIG. 45 is a cross-sectional view of the blind nut shown in FIG. 43, taken along line S-S.

Referring now to FIGS. 43-45, each blind nut 107 comprises a front surface 1110, a rear surface 1111, and an intermediate outer surface 1112. The front surface 1110 comprises a threaded blind bore 1113. The threaded blind bore 1113 comprises a base 1114. The intermediate outer surface 1112 comprises a flange section 1115 and a drive section 1116. The flange section 1115 comprises a front surface 1117 that abuts the drive section 1116, and a rear surface 1111 that is also the rear surface 1111 of the blind nut 107. The drive section 1116 comprises a standard 12-point drive sometimes called a double hex drive.

Figure 46:
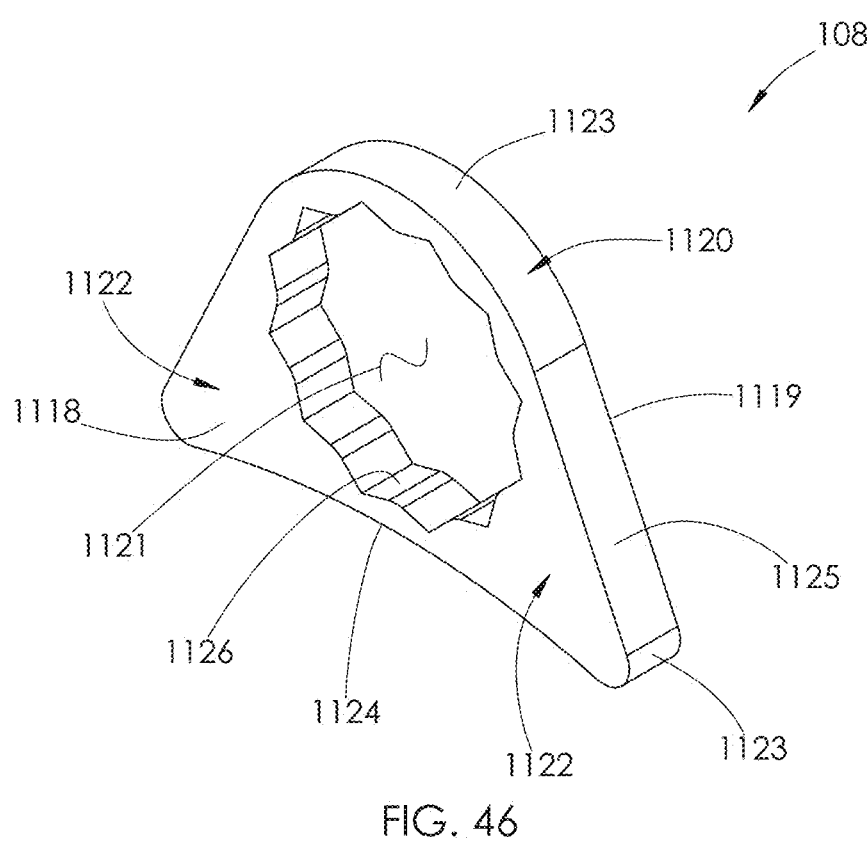
FIG. 46 is a right front perspective view of the reaction washer.
Figure 47:
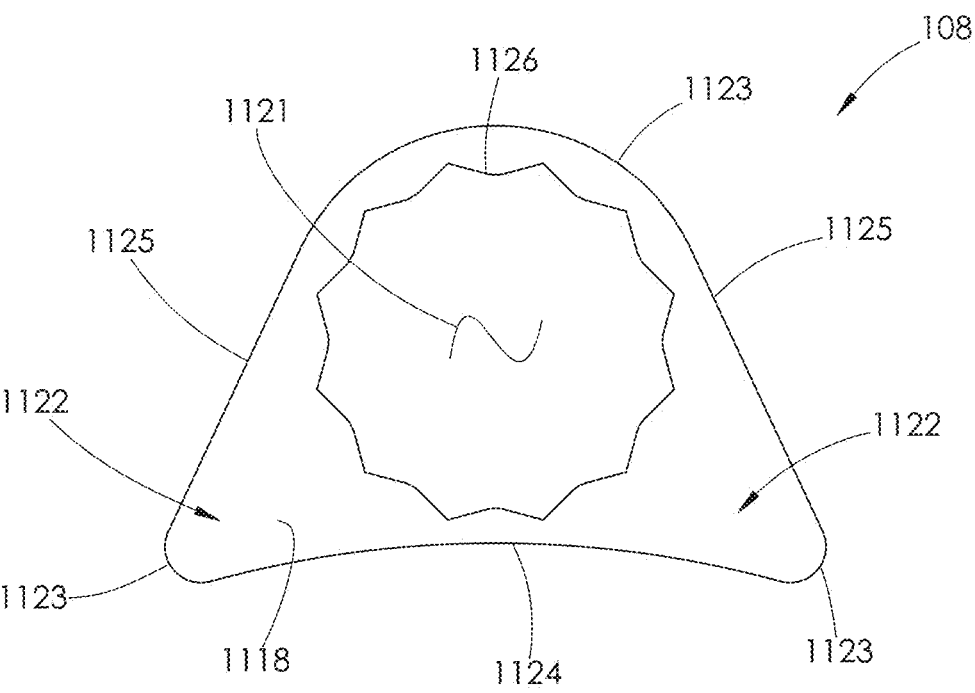
FIG. 47 is a front elevation view of the reaction washer shown in FIG. 46.

Referring now to FIGS. 46-47, each reaction washer 108 comprises a front surface 1118, a rear surface 1119, an intermediate outer surface 1120, a through hole 1121, and a plurality of torque reaction arms 1122. The intermediate outer surface 1120 comprises a plurality of convex radii 1123, a concave radius 1124, and a plurality of connecting sections 1125. The through hole 1121 comprises a 12-point wall 1126 which is congruent to the 12-point drive of the drive section 1116 of the blind nut 107.

Figure 8:
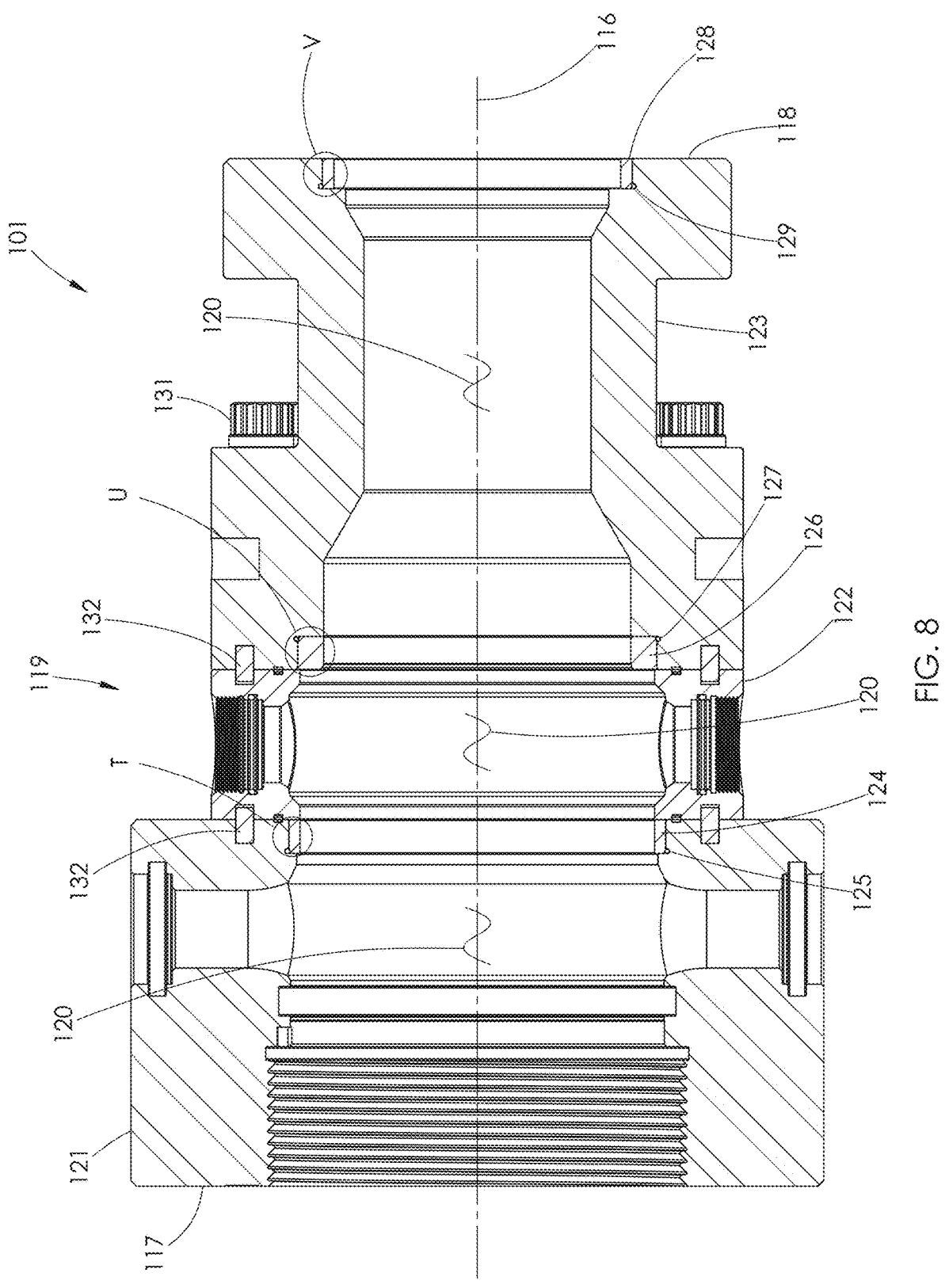
FIG. 8 is a cross-sectional view of the housing shown in FIG. 6, taken along line C-C.
Figures 48, 49, 50:
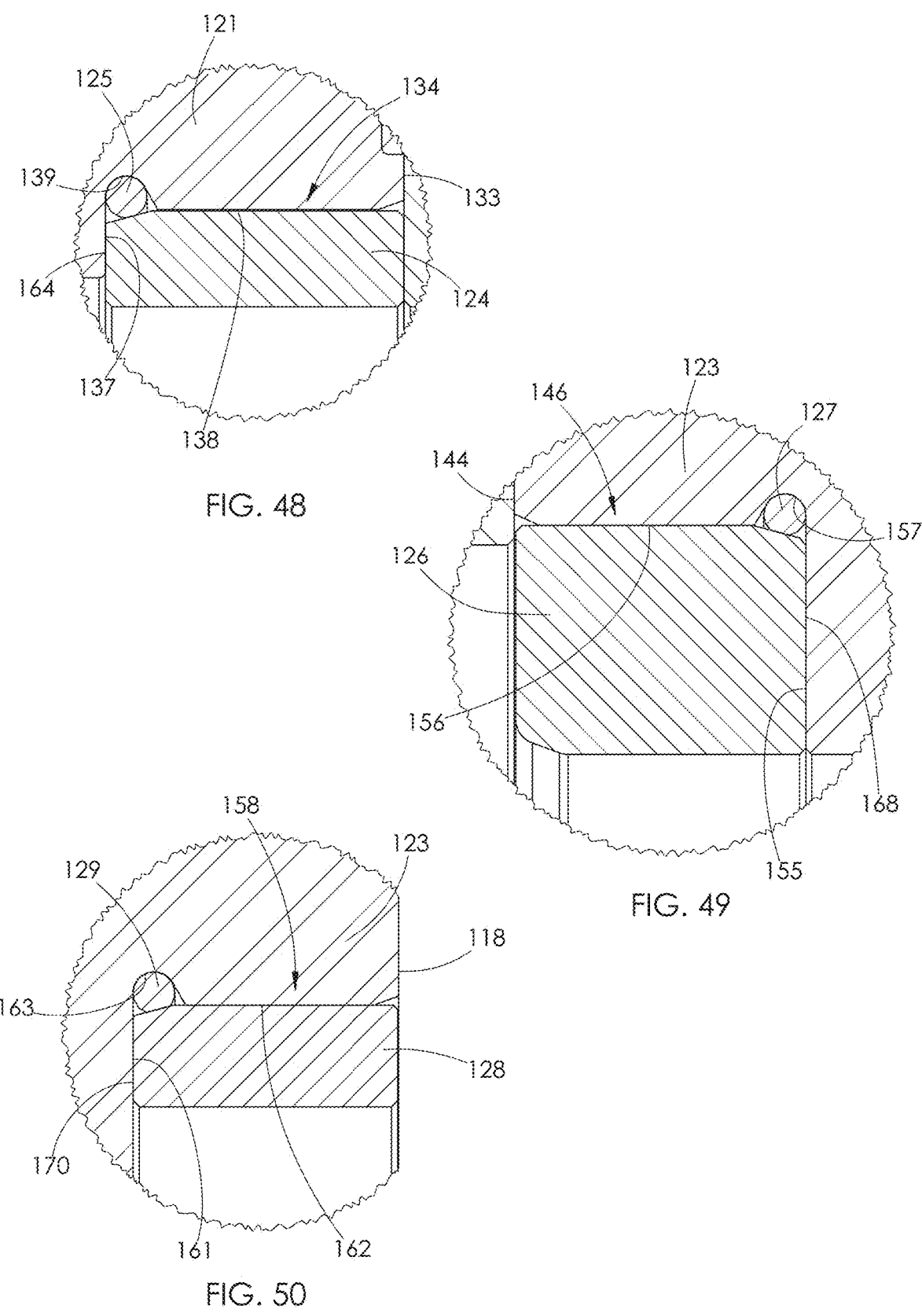
FIG. 48 is an enlarged view of area Tin FIG. 8.
FIG. 49 is an enlarged view of area U in FIG. 8.
FIG. 50 is an enlarged view of area V in FIG. 8.

Referring now to FIGS. 3-5, 8-10, 48-53, during assembly of the fluid end section 100 the front wear ring seal 125 is inserted in the seal groove 139 of the wall 138 of the front wear ring counterbore 134 on the rear surface 133 of the first section 121, FIGS. 8, 48. In the same manner the center wear ring seal 127 is inserted in the seal groove 157 of the wall 156 of the center wear ring counterbore 146 on the front surface 144 of the third section 123, FIGS. 8, 49. Likewise, the rear wear ring seal 129 is inserted in the seal groove 163 of the wall 162 of the rear wear ring counterbore 158 on the rear surface 118 of the third section 123, FIGS. 8, 50.

After installing the seals 125, 127, 129 the wear rings 124, 126, 128 are installed in their respective wear ring counterbores 134, 146, 158. The front and rear wear rings 124, 128 are oriented so that when installed their front surfaces 164, 170 will abut the bases 137, 161 of their corresponding wear ring counterbores 134, 158 as shown in FIGS. 8, 48, 50. The center wear ring 126 is oriented so that its rear surface 168 abuts the base 155 of the center wear ring counterbore 146 when installed as shown in FIGS. 8, 49.

Referring now to FIGS. 8-23, the first, second, and third sections 121, 122, 123 are joined by: Inserting the locating dowel pins 132 in the blind bores 136 of the rear surface 133 of the first section 121. Torquing the first externally threaded end 173 of a stud 130 into each of the plurality of threaded blind bores 135 on the rear surface 133 of the first section 121. Orienting the second section 122 so that the front surface 140 of the second section 122 will abut the rear surface 133 of the first section 121 when installed. Aligning the through holes 142 of the second section 122 with the second externally threaded ends 174 of the studs 130 now protruding from the rear surface 133 of the first section 121. Aligning the blind bores 143 of the front surface 140 of the second section 122 with the locating dowel pins 132 now protruding from the rear surface 133 of the first section 121. Simultaneously inserting the second externally threaded ends 174 of the studs 130 into the through holes 142 and the locating dowel pins 132 in the blind bores 143 of the front surface 140 of the second section 122 until the rear surface 133 of the first section 121 abuts the front surface 140 of the second section 122. Inserting the locating dowel pins 132 in the blind bores 140 of the rear surface 141 of the second section 122. Orienting the third section 123 so that the front surface 144 of the third section 123 will abut the rear surface 141 of the second section 122 when installed. Aligning the through holes 152 of the front flange 148 of the third section 123 with the second externally threaded ends 174 of the studs 130 now protruding from the rear surface 141 of the second section 122. Aligning the blind bores 147 of the front surface 144 of the front flange 148 of the third section 123 with the locating dowel pins 132 now protruding from the rear surface 141 of the second section 122. Simultaneously inserting the second externally threaded ends 174 of the studs 130 into the through holes 152 and the locating dowel pins 132 in the blind bores 147 of the front surface 144 of the third section 123 until the rear surface 141 of the second section 122 abuts the front surface 144 of the third section 123. Threading the nuts 131 on the second externally threaded ends 174 of the studs 130 that are now protruding from the rear surface 151 of the front flange 148 of the third section 123 and torquing them to specification. At this point, the assembly of the housing 101 is complete.

Referring now to FIGS. 1-5, 30-53, to continue the assembly of the fluid end section 100 the various components configured to route fluid through the housing 101 are installed in the horizontal bore 120. One of these components is the fluid routing plug 102. Prior to installation in the horizontal bore 120 the front seal 176 of the fluid routing plug 102 is installed in the front seal groove 179 of the outer intermediate surface 175 of the fluid routing plug 102 and the rear seal 177 of the fluid routing plug 102 is installed in the rear seal groove 180 of the outer intermediate surface 175 of the fluid routing plug 102, FIGS. 30-32. Once the fluid routing plug 102 is installed in the housing 101 the annular shoulder 178 of the outer intermediate surface 175 will abut the front surface 167 of the center wear ring 126 FIGS. 52-53. Also, the front seal 176 of the fluid routing plug 102 will engage the inner intermediate surface 166 of the front wear ring 124 and the rear seal 177 of the fluid routing plug 102 will engage the inner intermediate surface 169 of the center wear ring 126, FIG. 3.

After installing the fluid routing components: The first externally threaded ends 1107 of the studs 106 are inserted into the through holes 154 of the rear flange 150 of the third section 123. A blind nut 107 is then torqued onto each of the first externally threaded ends 1107 of the studs 106 until the end surface 1109 of the stud 106 abuts the base 1114 of the threaded blind bore 1113 of the blind nut 107. The locating dowel pins 111 are inserted in the blind bores 160 on the rear surface 118 of the third section 123. The retention plate 103 is oriented so that the front surface 182 of the retention plate 103 will abut the rear surface 118 of the third section 123 when assembled. The stud through holes 185 of the retention plate 103 are aligned with the second externally threaded ends 1108 of the studs 106 now protruding from the rear surface 118 of the third section 123. The locating dowel pin through holes 187 are aligned with the locating dowel pins 111 now protruding from the rear surface 118 of the third section 123. The retention plate fastener through holes 186 are aligned with the threaded blind bores 159 on the rear surface 118 of the third section 123. Simultaneously the studs 106 are inserted into the stud through holes 185 and the locating dowel pins 111 are inserted in the locating dowel pin through holes 187. The retention plate fasteners 112 are inserted in the retention plate fastener through holes 186 from the rear surface 183 of the retention plate 103 and torqued into the threaded blind bores 159 on the rear surface 118 of the third section 123. This fastens the retention plate 103 to the housing 101. The stuffing box 104 is oriented so that the front surface 188 of the stuffing box 104 will abut the rear surface 183 of the retention plate 103 when assembled. The through holes 192 of the stuffing box 104 are aligned with the second externally threaded ends 1108 of the studs 106 now protruding from the rear surface 183 of the retention plate 103 and the second externally threaded ends 1108 of the studs 106 are inserted into the through holes 192. Simultaneously the annular extension 196 is inserted into the stuffing box seal 1127 with the outside diameter 198 of the annular extension 196 engaging the inside diameter of the stuffing box seal 1127. Locating dowel pins 111 are inserted in the blind bores 199 on the rear surface 189 of the stuffing box 104. The rear retainer 105 is oriented so that the front surface 1100 of the rear retainer 105 will abut the rear surface 189 of the stuffing box 104 when assembled. The stud through holes 1104 of the rear retainer 105 are aligned with the studs 106 now protruding from the rear surface 189 of the stuffing box 104. The locating dowel pin through holes 1103 are aligned with the locating dowel pins 111 now protruding from the rear surface 189 of the stuffing box 104. Simultaneously the studs 106 are inserted in the stud through holes 1104 and the locating dowel pins 111 are inserted in the locating dowel pin through holes 1103 of the rear retainer 105 until the rear surface 189 of the stuffing box 104 abuts the front surface 1100 of the rear retainer 105. The washers 110 are placed on the second externally threaded ends 1108 of the studs 106. The nuts 109 are threaded onto the second externally threaded ends 1108 of the studs 106 now protruding from the rear surface 1101 of the rear retainer 105. The reaction washers 108 are installed on the blind nuts 107 by orienting the reaction washer 108 so that the concave radius 1124 of the intermediate outer surface 1120 is approximately concentric with the center section 149 of the intermediate outer surface 145 of the third section 123 then sliding the 12-point wall 1126 of the through holes 1121 over the congruent 12-point drive of the drive section 1116 of the blind nut 107 until the front or rear surface 1118, 1119 of the reaction washer 108 abuts the front surface 1117 of the flange section 1115 of the blind nut 107. The nuts 109 are then torqued to specification. The packing 113 is installed. The plunger 115 is inserted in the packing 113 and the packing nut 114 is threaded into the internal threads of the rear retainer 105.

Figure 51:
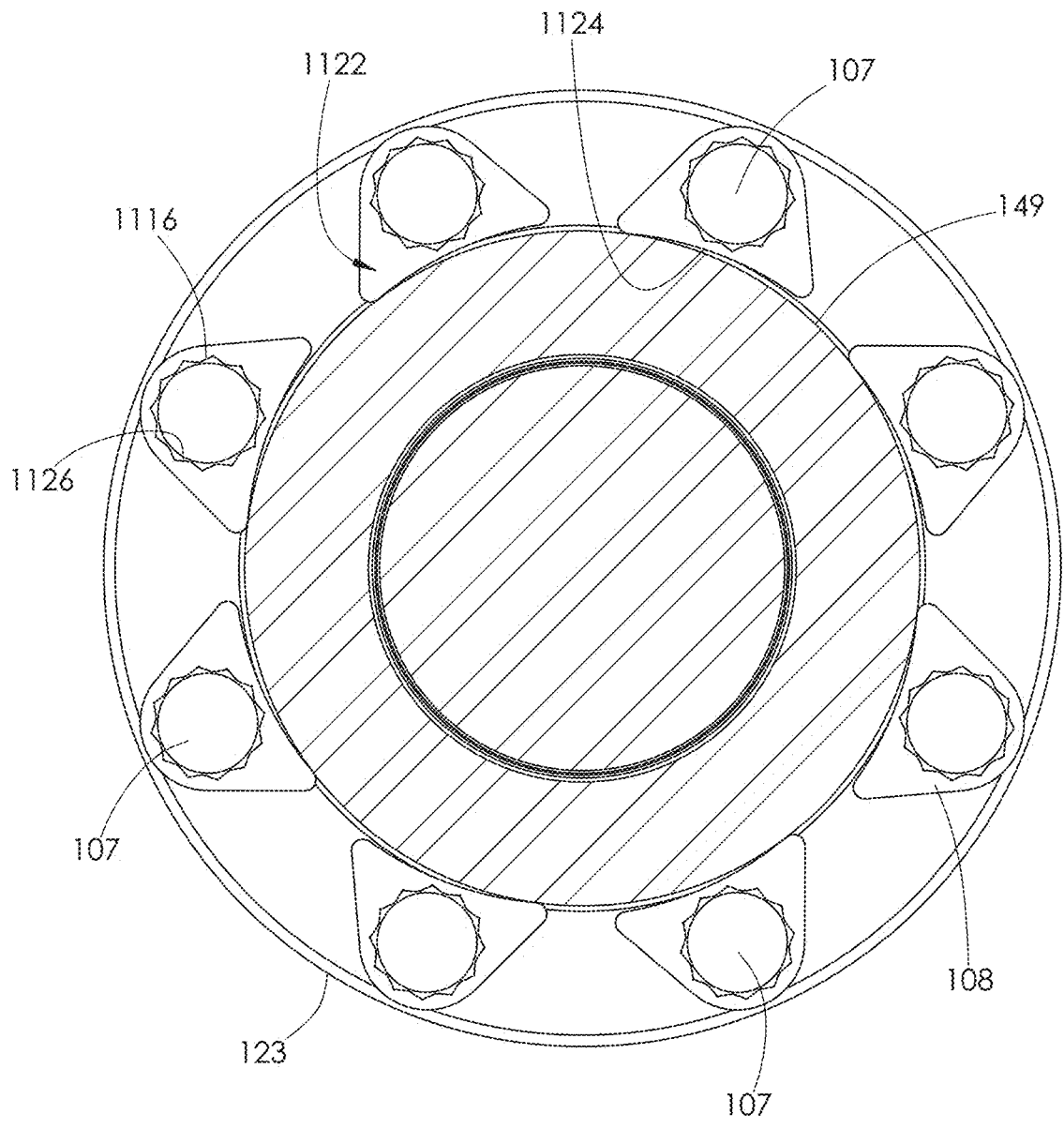
FIG. 51 is a cross-sectional view of the fluid end section shown in FIG. 1, taken along line W-W.

During assembly and disassembly, the reaction washers 108 provide a mechanism for resisting the torque applied to the nut 109 allowing the nut 109 to be tightened or loosened without the blind nut 107 and stud 106 spinning freely. After assembly, the reaction washers 108 may be removed, however in practice, the left torque reaction arm 1122, as viewed from the front of the fluid end section 100, is in contact with the center section 149 of the intermediate outer surface 145 of the third section 123 as shown in FIG. 51. The contact force is great enough to prevent the reaction washer 108 from sliding off the blind nut 107 and to make it difficult to remove. While the primary advantage of the reaction washers 108 is during assembly and disassembly they also prevent the rotation of the blind nut 107 during operation reducing the likelihood of the fasteners coming loose.

In operation the front, center, and rear wear ring seals 125, 127, 129 prevent fluid from flowing around the outside of the wear rings. While the wear ring seals shown in this embodiment are typical O-ring seals any other suitable seal may be used. Also, the location of the wear ring seals 125, 127, 129 in this embodiment is in the walls 138, 156, 162 of their respective counterbores 134, 146, 158, engaging the outer surfaces of their respective wear rings 124, 126, 128. The location of the seals 125, 127, 129 could be in the bases 137, 155, 161 of the counterbores 134, 146, 158 engaging the appropriate front surfaces 164, 167, 170 or rear surfaces 165, 168, 171 of the wear rings. Also, grooves or other provision could be made for the seals to be located in the wear rings.

Figure 52:
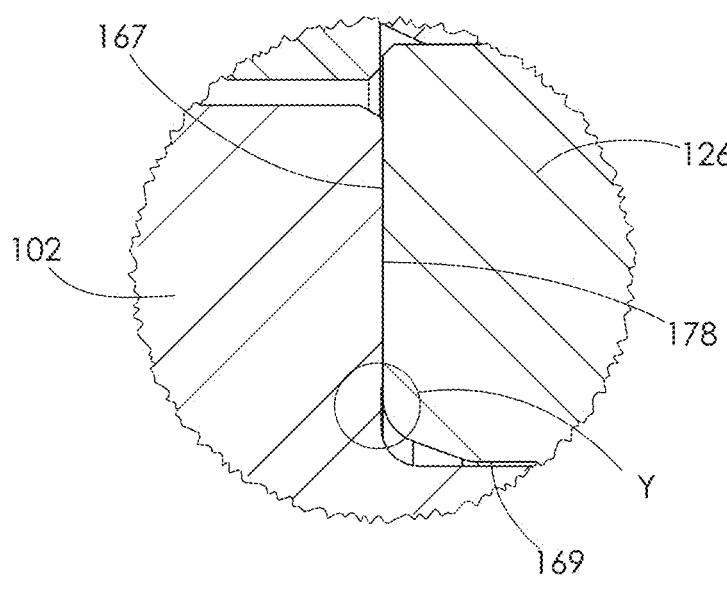
FIG. 52 is an enlarged view of area X in FIG. 3.
Figure 53:
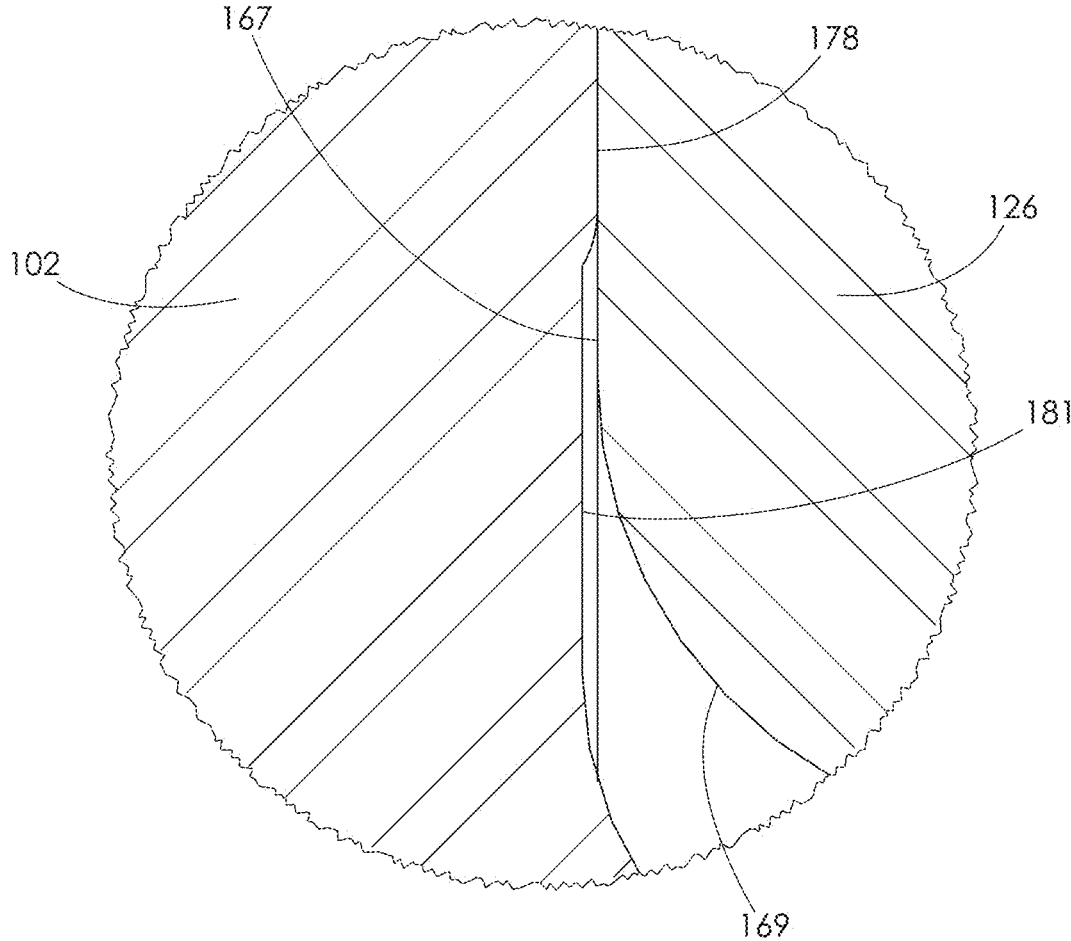
FIG. 53 is an enlarged view of area Y in FIG. 52.
Figure 54:
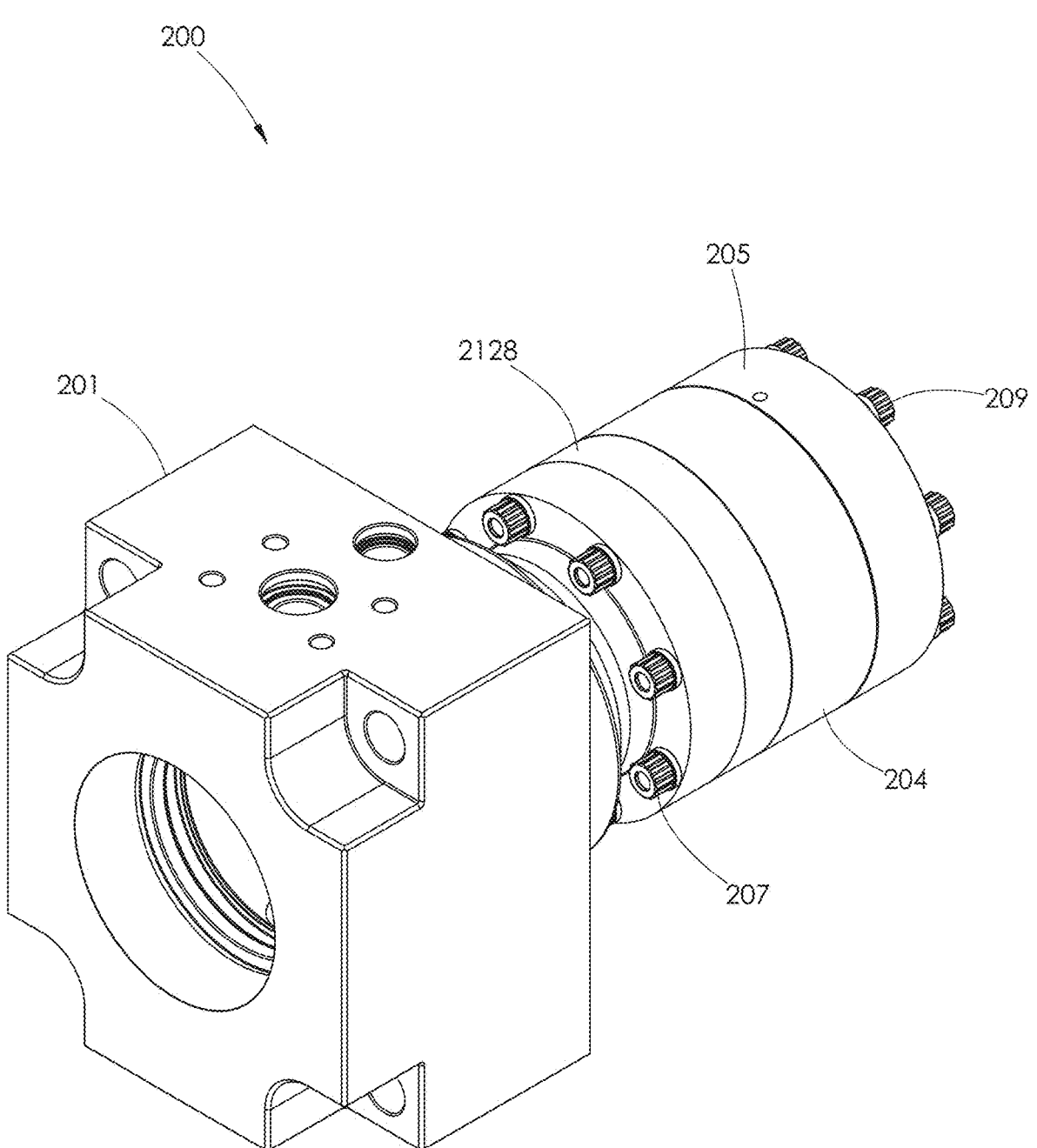
FIG. 54 is a right front perspective view of another embodiment of a fluid end section.
Figure 55:
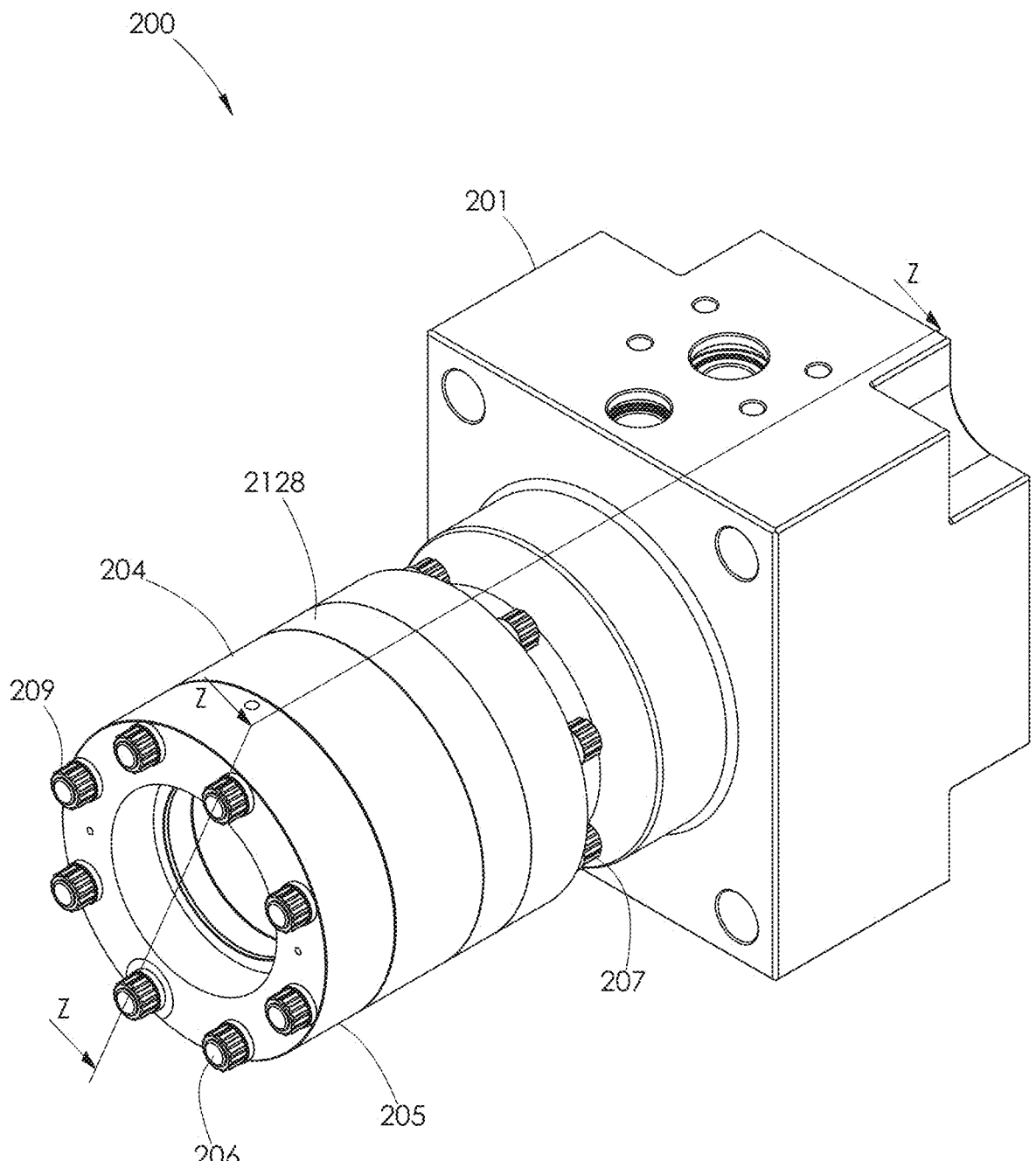
FIG. 55 is a left rear perspective view of the fluid end section shown in FIG. 54.

Referring now to FIGS. 52-53, the stress relief cutout 181 on the annular shoulder 178 of the outer intermediate surface 175 of the fluid routing plug 102 does not contact the front surface 167 of the center wear ring 126. The absence of contact reduces the stress on the inner intermediate surface 169 near the front surface 167 of the center wear ring 126. In this embodiment the stress relief cutout 181 is formed on the annular shoulder 178 of the fluid routing plug 102 however the stress relief cutout 181 may be formed on the center wear ring 126.

Referring now to FIGS. 54-73, another embodiment of a fluid end section 200 is shown. The fluid end section 200 comprises a horizontally positioned housing 201, stuffing box 204, rear retainer 205, a plurality of studs 206, a plurality of blind nuts 207, a plurality of nuts 209, a plurality of locating dowel pins 211, a rear wear ring 228, a rear wear ring seal 229, a stuffing box seal 2127, and a spacer sleeve 2128.

Referring now to FIGS. 56-60, the rear wear ring 228 comprises a front surface 270, a rear surface 271, and an inner intermediate surface 272. The stuffing box seal 2127 comprises opposing front and rear surfaces 2135, 2136, an outer intermediate surface 2137, and an inner intermediate surface 2138. The studs 206 comprise a first externally threaded end 2107, a second externally threaded end 2108, and an end surface 2109. The blind nut 207 comprises a threaded blind bore 2113. The threaded blind bore 2113 comprises a base 2114.

Referring now to FIGS. 61-64, the housing 201 comprises a longitudinal axis 216, opposed front and rear surfaces 217, 218 joined by an outer intermediate surface 219. A horizontal bore 220 is formed within the housing 201 and interconnects the front and rear surfaces 217, 218. The longitudinal axis 216 of the horizontal bore 220 is the longitudinal axis 216 of the housing 201. The horizontal bore 220 is sized to receive various components, not shown, configured to route fluid through the housing 201. The housing 201 is of single piece construction.

Figure 61:
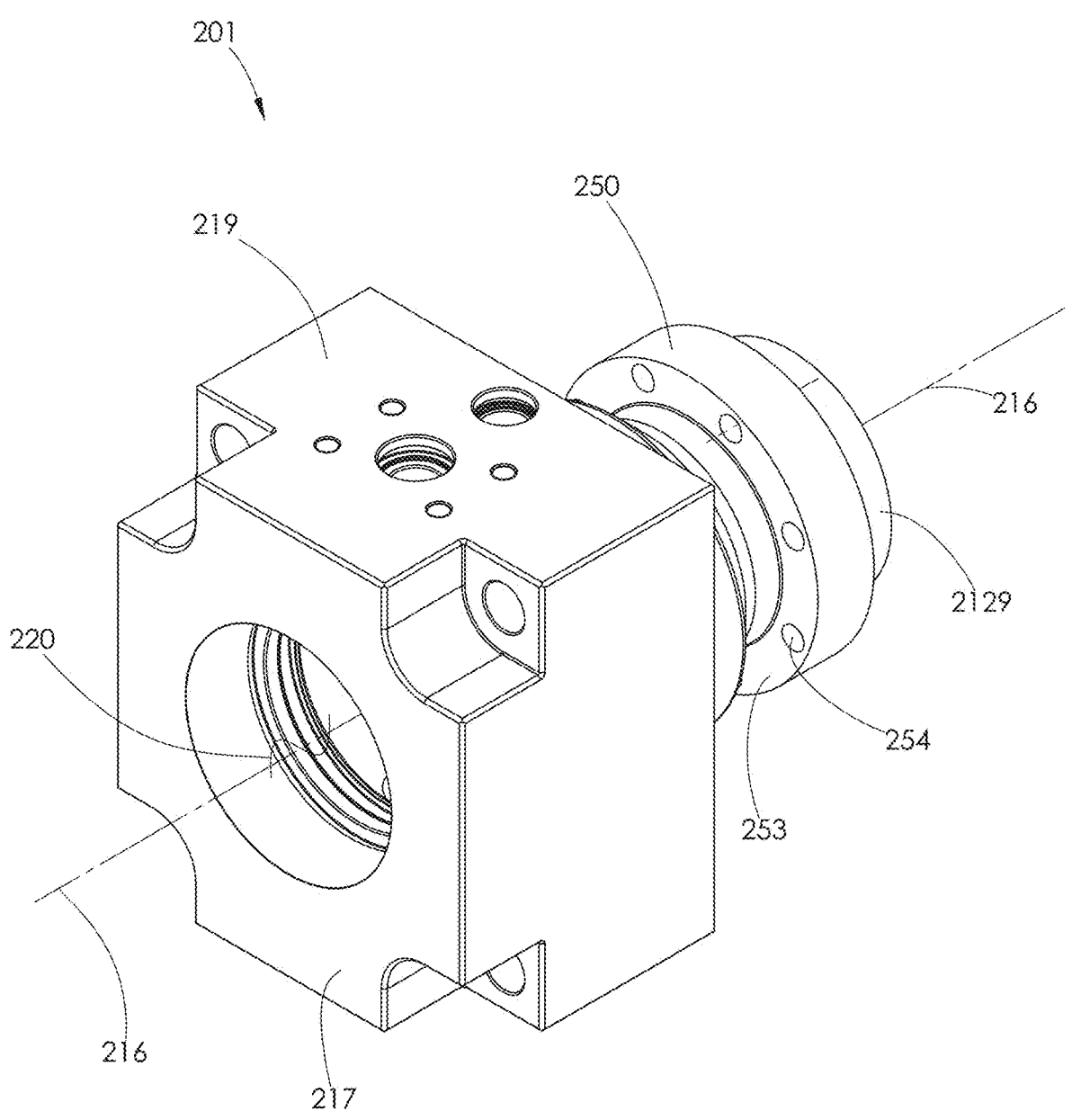
FIG. 61 is a right front perspective view of the housing of the fluid end section shown in FIG. 54.
Figure 62:
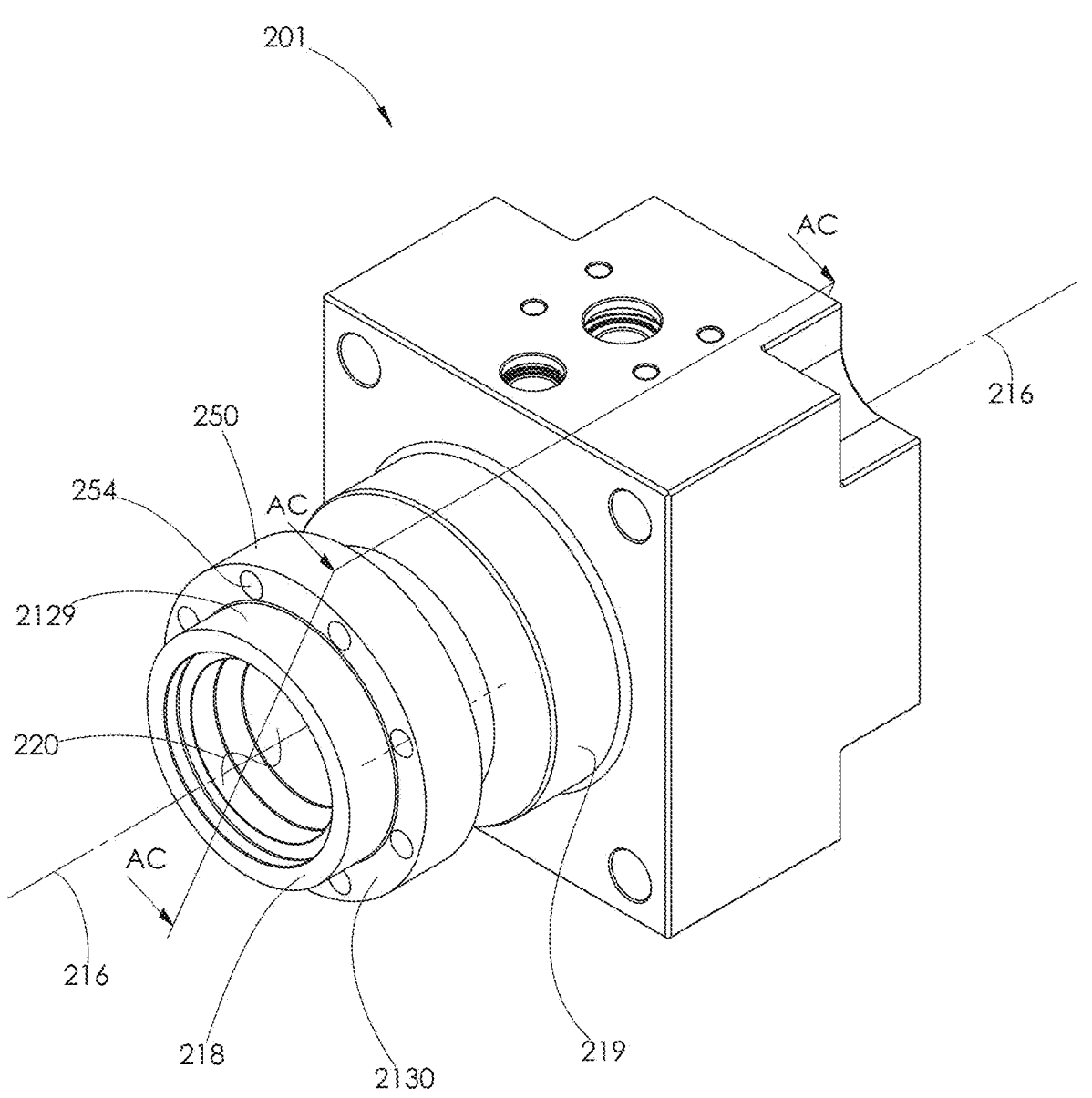
FIG. 62 is a left rear perspective view of the housing shown in FIG. 61.
Figure 63:
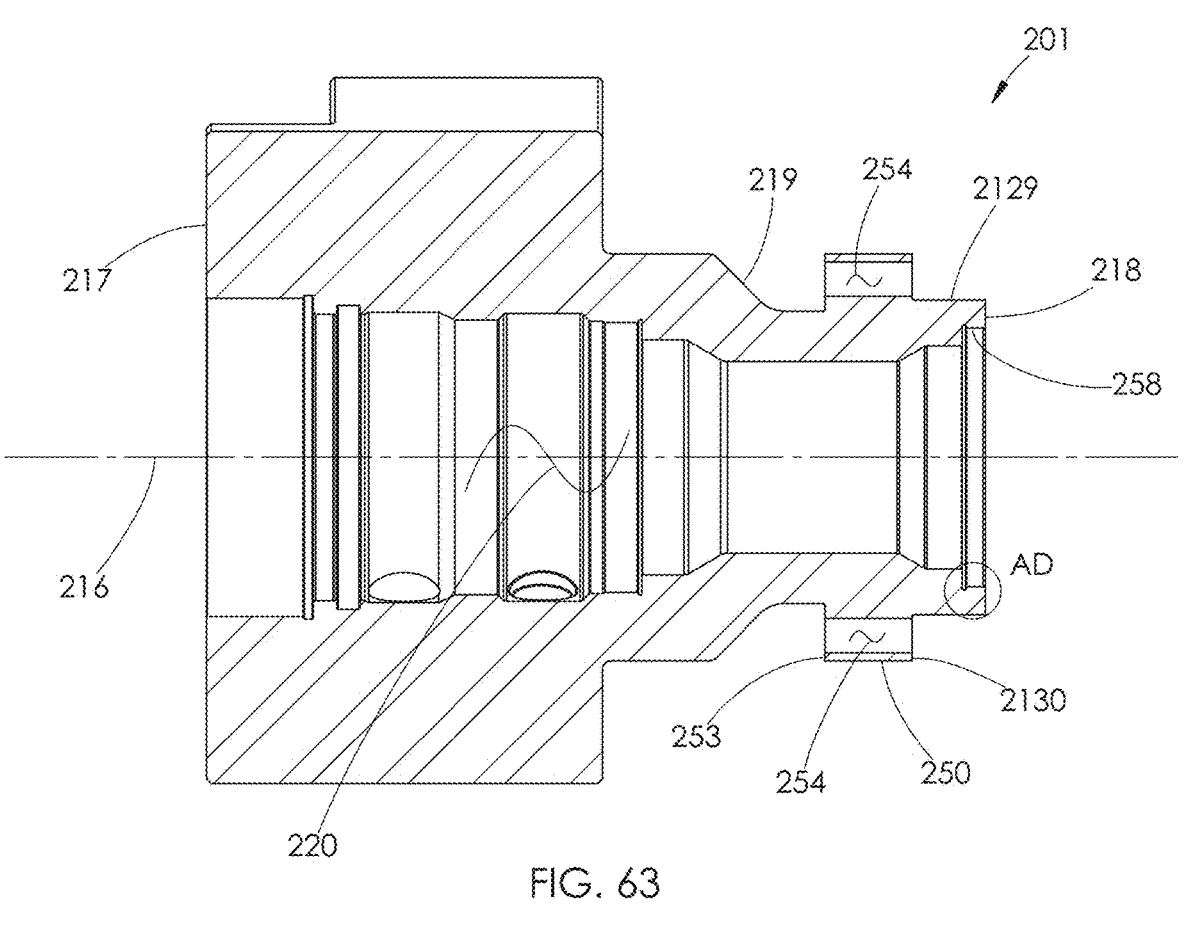
FIG. 63 is a cross-sectional view of the housing shown in FIG. 62, taken along line AC-AC.
Figure 64:
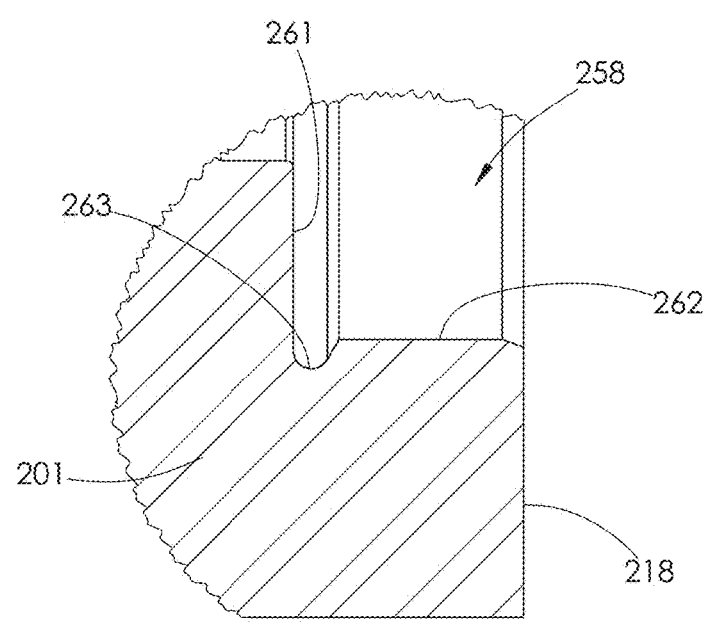
FIG. 64 is an enlarged view of area AD shown in FIG. 63.

The outer intermediate surface 219 of the housing 201 comprises a rear flange 250 and a protruding section 2129. The rear flange 250 comprises a front surface 253, a rear surface 2130, and a plurality of through holes 254 that interconnect the front surface 253 to the rear surface 2130 of the rear flange 250. As shown in FIGS. 61-62, the through holes 254 are spaced around the circumference of the rear flange 250 and the longitudinal axes of the through holes 254 are parallel to the longitudinal axis 216 of the housing 201. The rear surface 218 comprises a rear wear ring counterbore 258. The rear wear ring counterbore 258 comprises a base 261 and a wall 262. The wall 262 comprises a seal groove 263 as shown in FIGS. 63-64.

Figures 65, 66, 67:
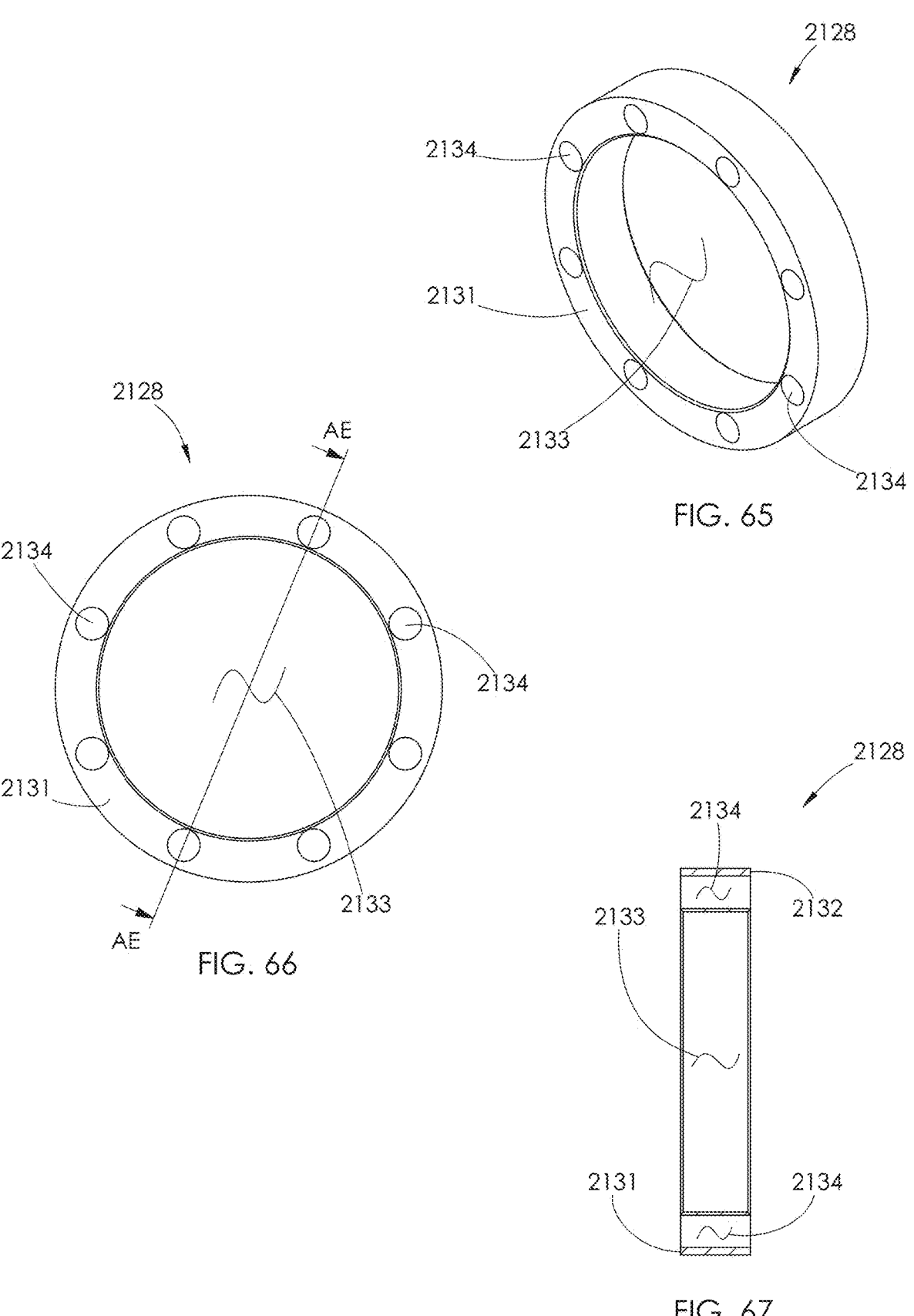
FIG. 65 is a right front perspective view of the spacer sleeve of the fluid end section shown in FIG. 54.
FIG. 66 is a front elevation view of the spacer sleeve shown in FIG. 65.
FIG. 67 is a cross-sectional view of the spacer sleeve shown in FIG. 66, taken along line AE-AE.

Referring now to FIGS. 65-67, the spacer sleeve 2128 comprises a front surface 2131, rear surface 2132, a central bore 2133, and a plurality of stud through holes 2134. When assembled, the central bore 2133 is concentric with the horizontal bore 220 of the housing 201. The stud through holes 2134 are spaced around the circumference of the central bore 2133 as shown.

Figures 68, 69, 70:
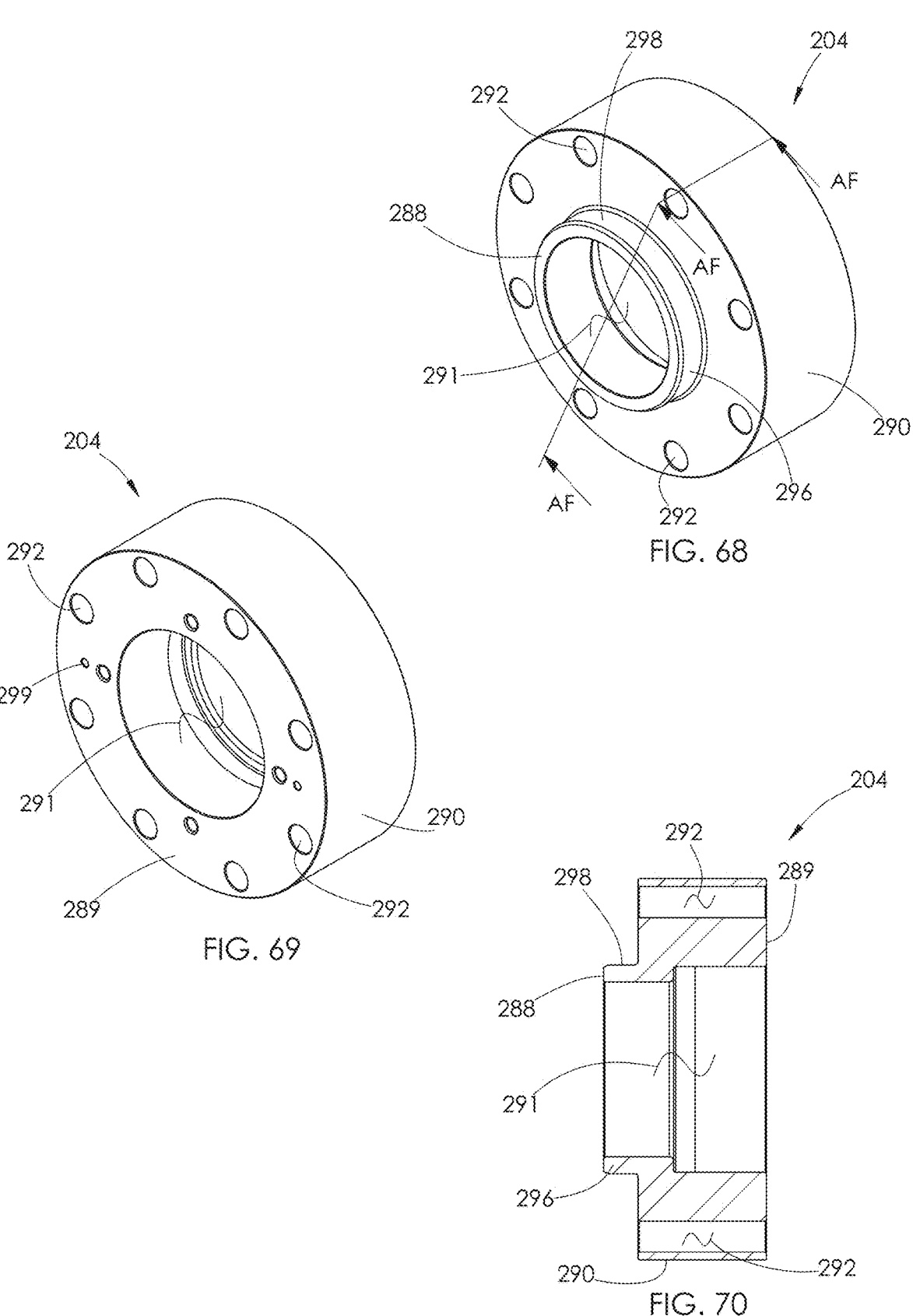
FIG. 68 is a right front perspective view of the stuffing box of the fluid end section shown in FIG. 54.
FIG. 69 is a left rear perspective view of the stuffing box shown in FIG. 68.
FIG. 70 is a cross-sectional view of the stuffing box shown in FIG. 68, taken along line AF-AF.

Referring now to FIGS. 68-70, the stuffing box 204 comprises a front surface 288, rear surface 289, an intermediate cylindrical outer surface 290, a central bore 291, and a plurality of through holes 292. When assembled, the central bore 291 is concentric with the horizontal bore 220 of the housing 201. The through holes 292 are spaced around the circumference of the central bore 291 as shown. The front surface 288 comprises an annular extension 296. The annular extension 296 is concentric with the central bore 291 and comprises an outside diameter 298. The outside diameter 298 is smaller than the outside diameter of the intermediate cylindrical outer surface 290. The rear surface 289 comprises a plurality of blind bores 299 for receiving the locating dowel pins 211.

Figures 71, 72, 73:
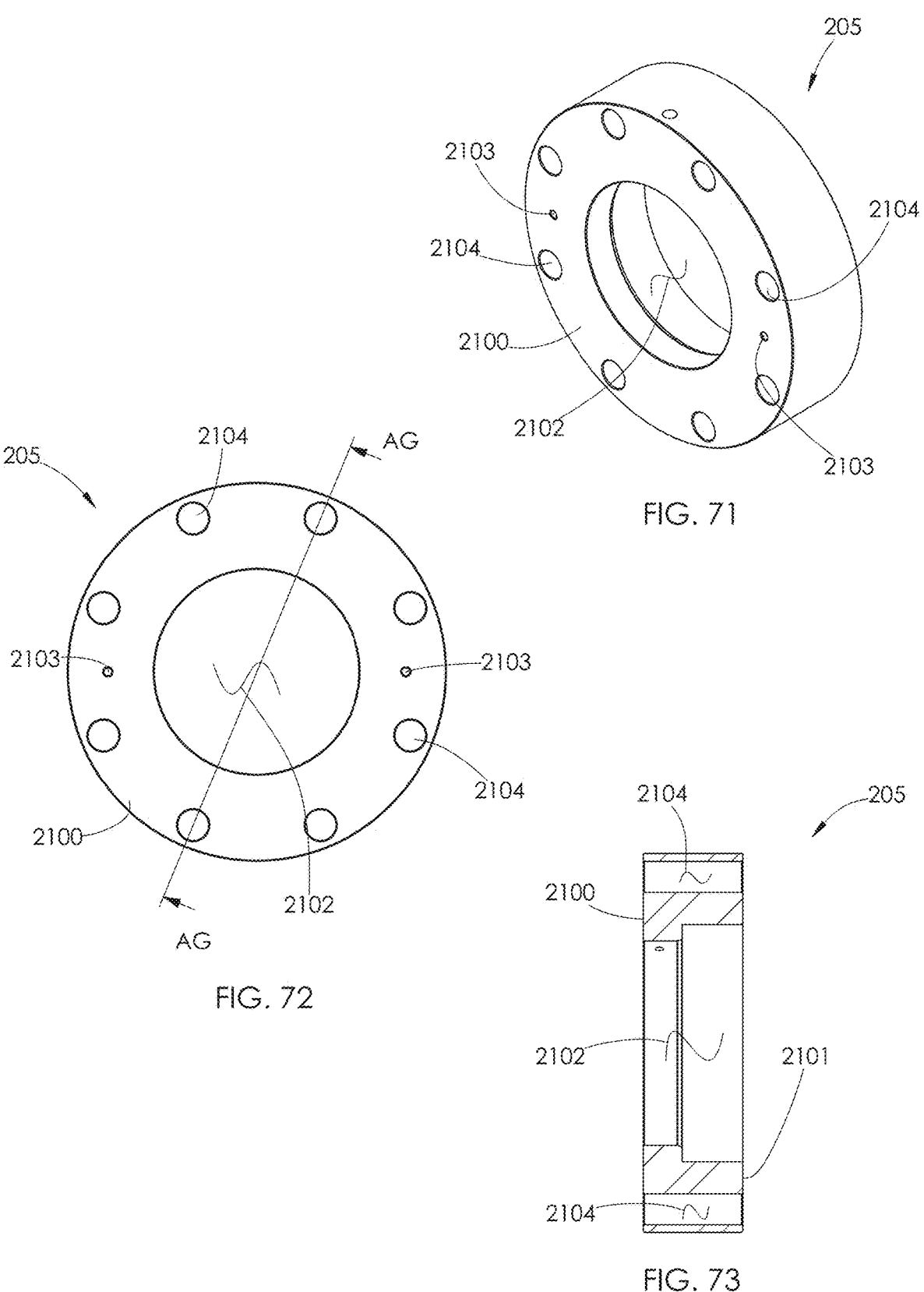
FIG. 71 is a right front perspective view of the rear retainer of the fluid end section shown in FIG. 54.
FIG. 72 is a front elevation view of the rear retainer shown in FIG. 71.
FIG. 73 is a cross-sectional view of the rear retainer shown in FIG. 72, taken along line AG-AG.
Figures 74, 75:
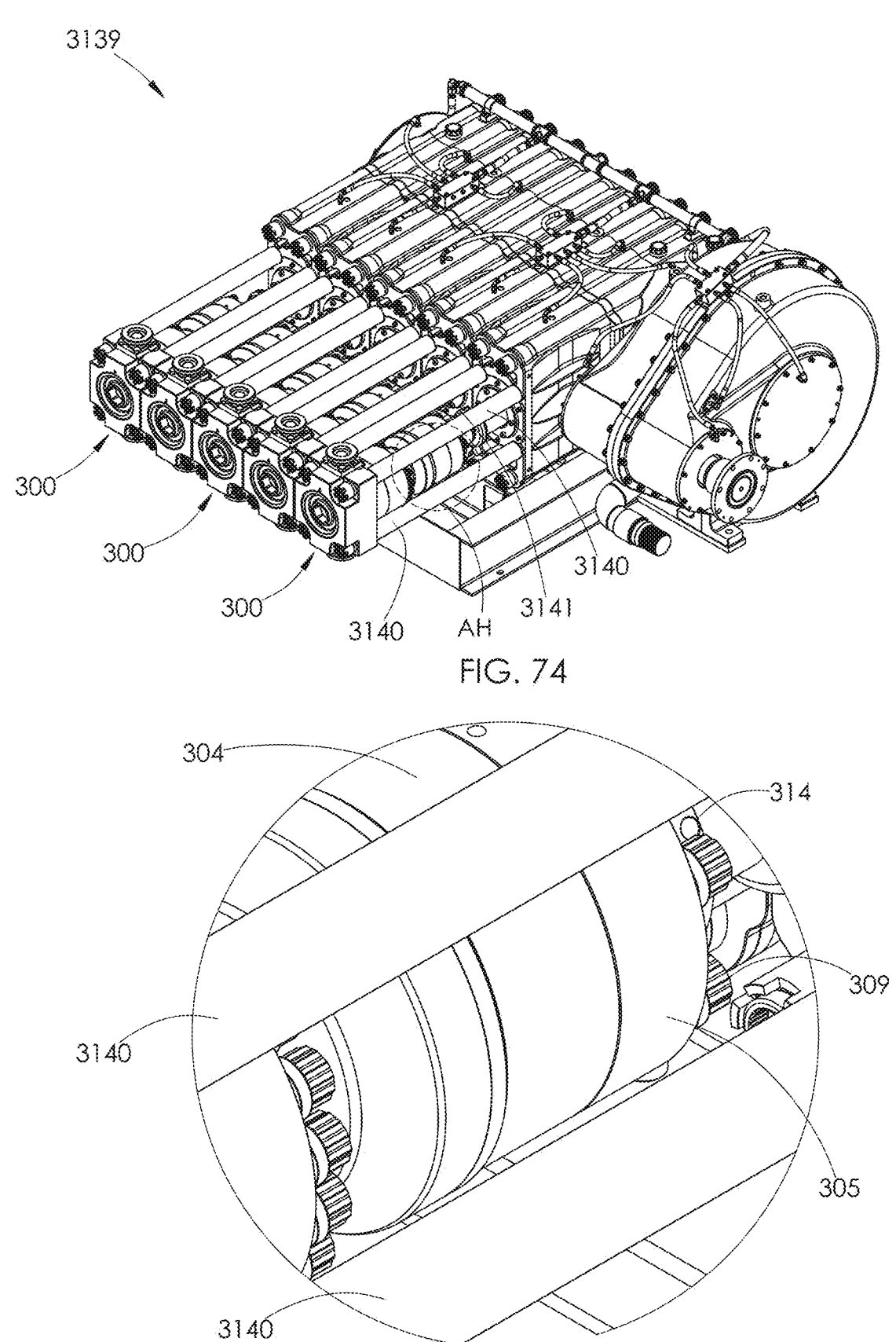
FIG. 74 is a right front perspective view of a prior art high-pressure pump.
FIG. 75 is an enlarged view of area AH shown in FIG. 74.
Figures 76, 77:
FIG. 76 is a right rear perspective view of the high-pressure pump shown in FIG. 74.
FIG. 77 is an enlarged view of area AI shown in FIG. 76.
Figure 78:
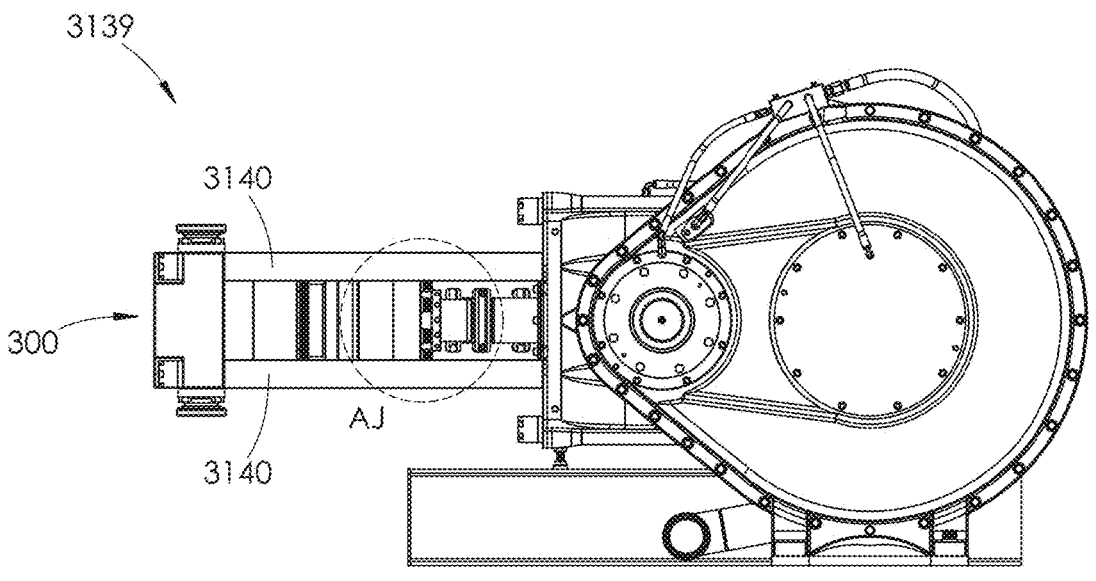
FIG. 78 is right side elevational view of the high-pressure pump shown in FIG. 74.
Figure 79:
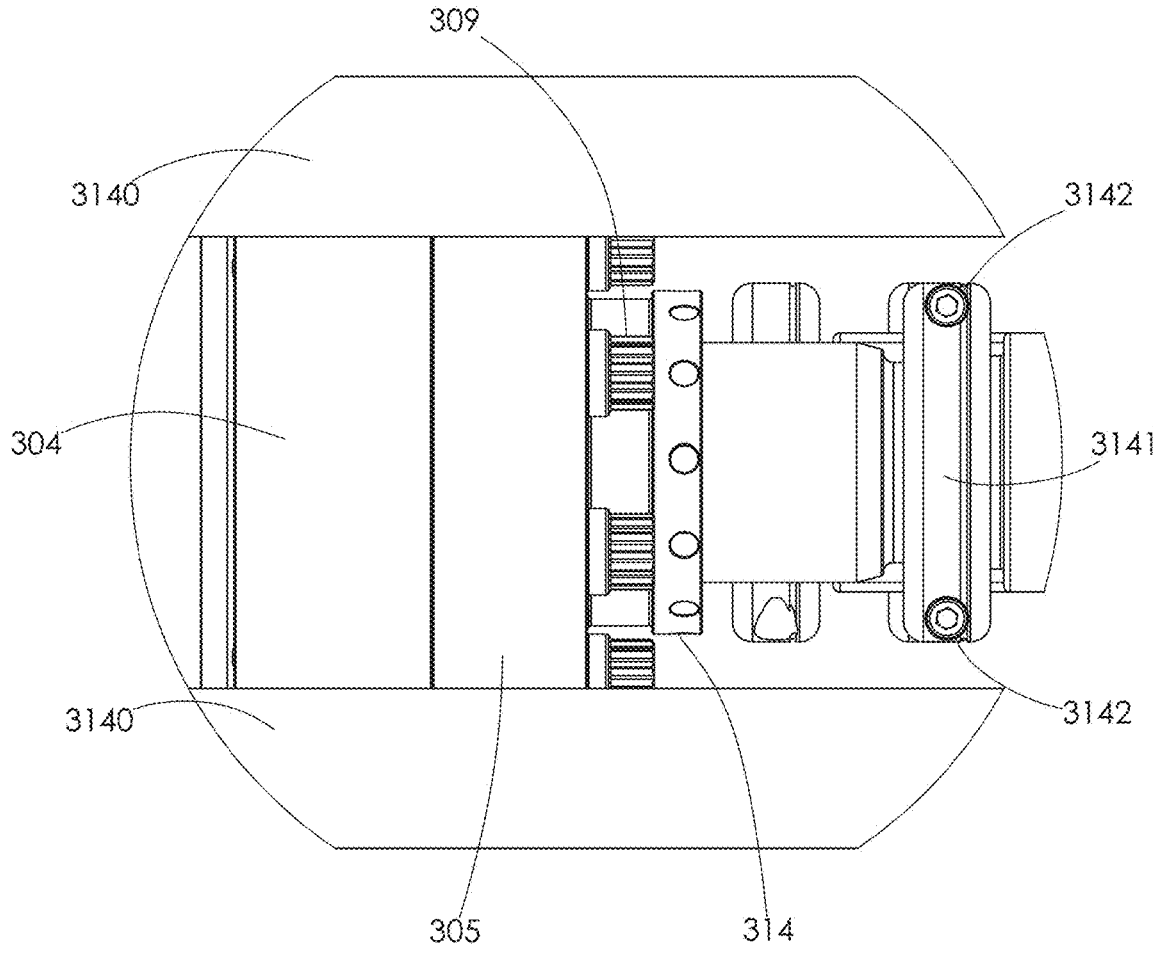
FIG. 79 is an enlarged view of area AJ shown in FIG. 78.
Figure 80:
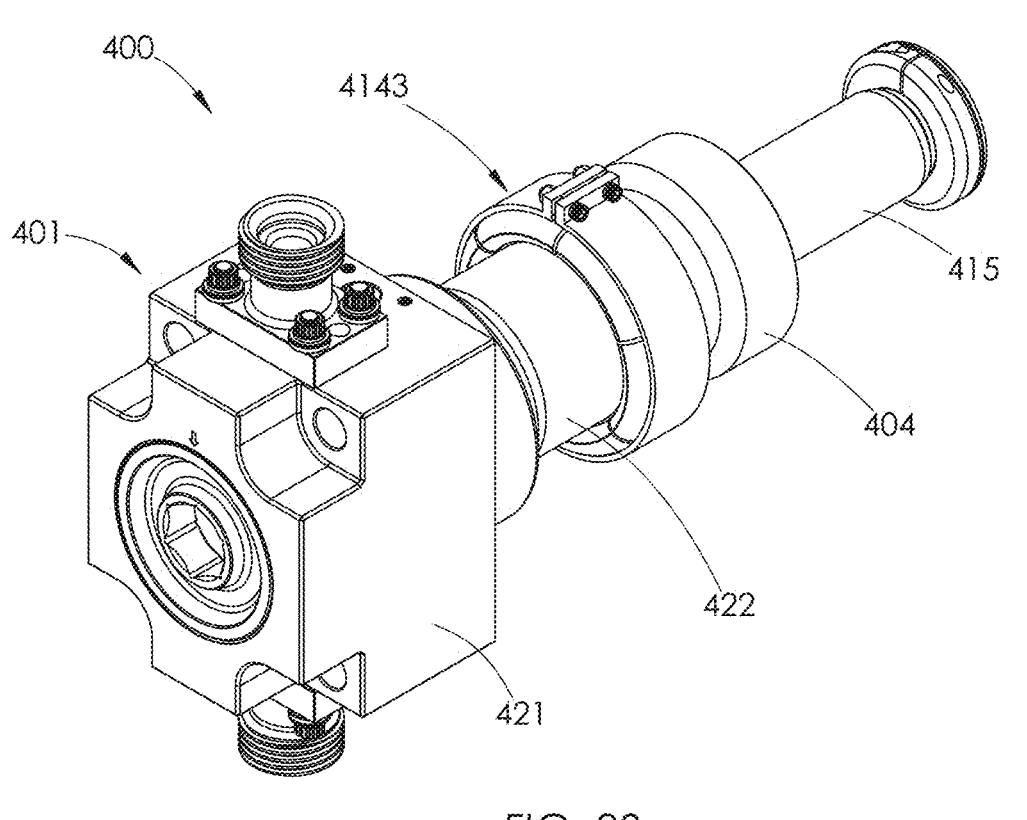
FIG. 80 is a right front perspective view of another embodiment of a fluid end section.
Figure 81:
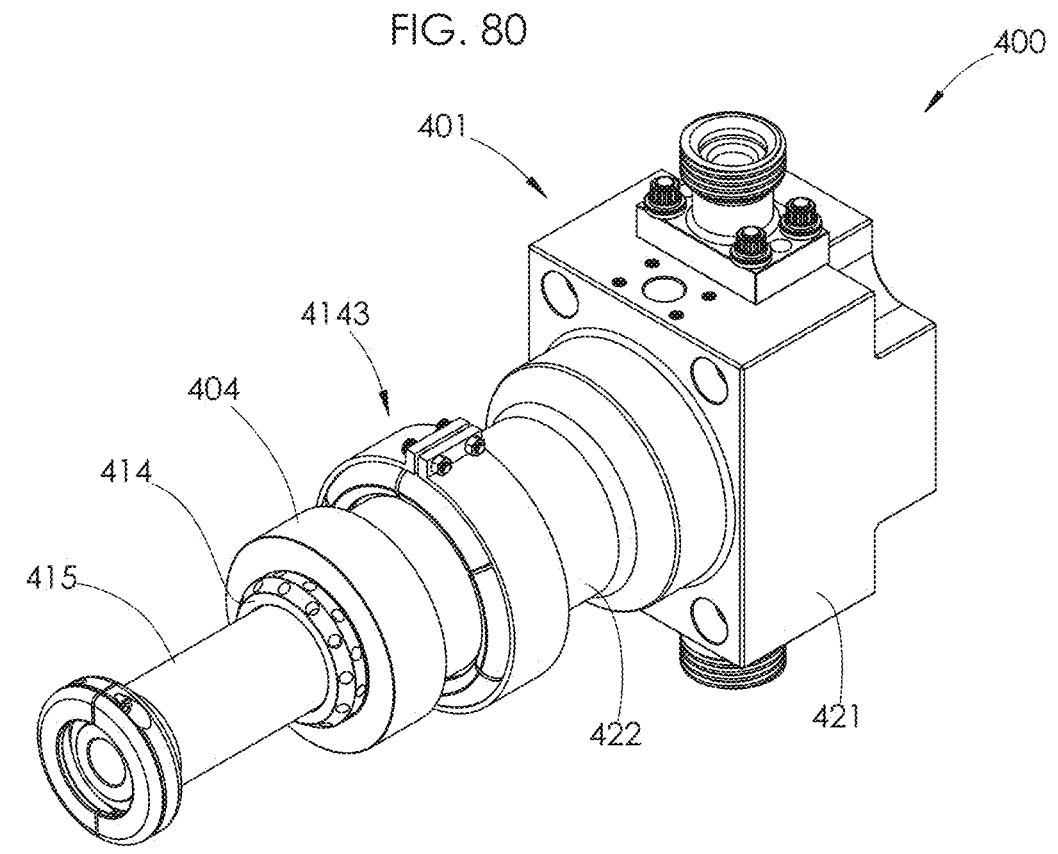
FIG. 81 is a left rear perspective view of the fluid end section shown in FIG. 80.

Referring now to FIGS. 71-73, the rear retainer 205 comprises a front surface 2100, rear surface 2101, a central bore 2102, a plurality of locating dowel pin through holes 2103 and a plurality of stud through holes 2104. When assembled, the central bore 2102 is concentric with the horizontal bore 220 of the housing 201. The through holes 2103, 2104 are spaced around the circumference of the central bore 2102 as shown.

Referring now to FIGS. 56-60, assembly of the fluid end section 200 begins with the insertion of the rear wear ring seal 229 into the seal groove 263 of the wall 262 of the rear wear ring counterbore 258 on the rear surface 218 of the housing 201.

Figure 58:
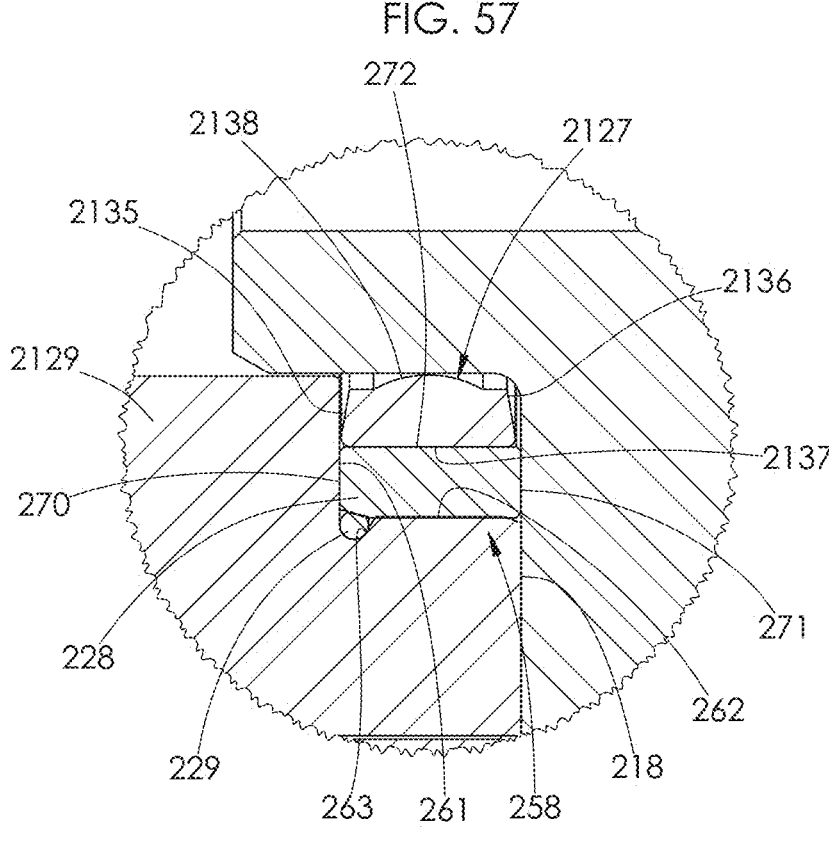
FIG. 58 is an enlarged view of area AB of FIG. 56.
Figure 59:
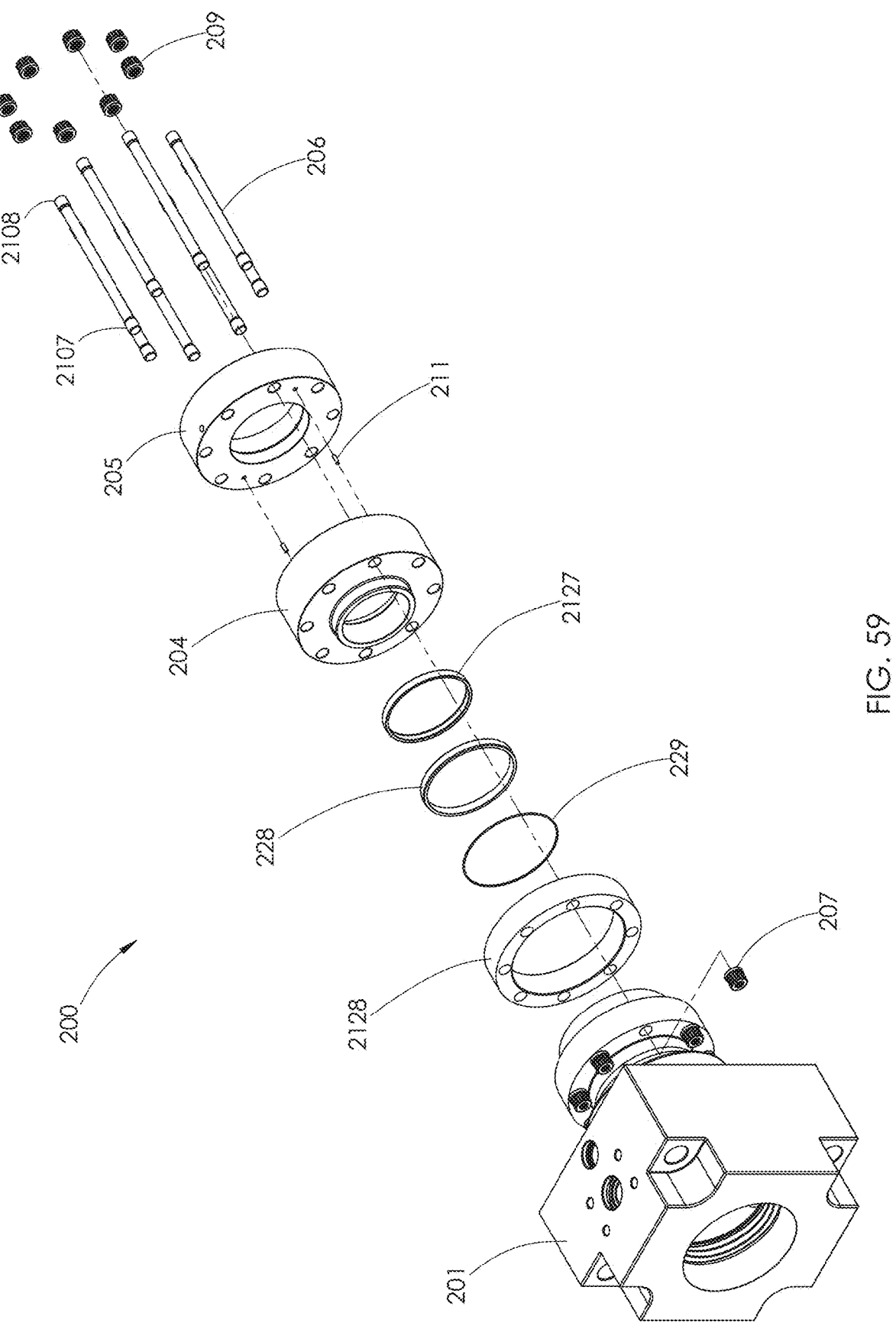
FIG. 59 is an exploded right front perspective view of the fluid end section shown in FIG. 54.
Figure 60:
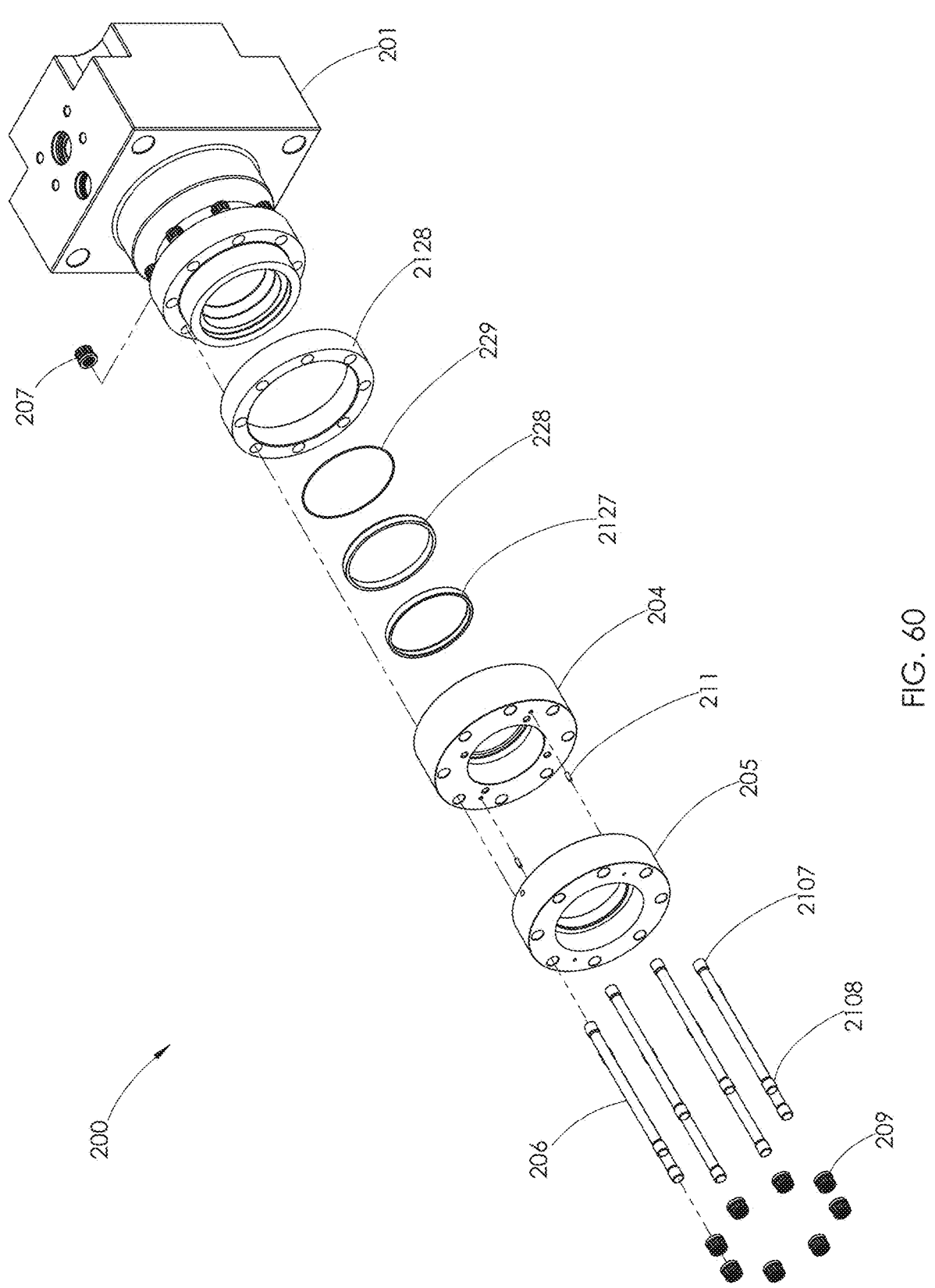
FIG. 60 is an exploded left rear perspective view of the fluid end section shown in FIG. 54.

After installing the rear wear ring seal 229 the rear wear ring 228 is installed in the rear wear ring counterbore 258, this is typically a press fit. The rear wear ring 228 is oriented so that when installed the front surface 270 will abut the base 261 of the wear ring counterbore 258 as shown in FIG. 58.

Figure 56A:
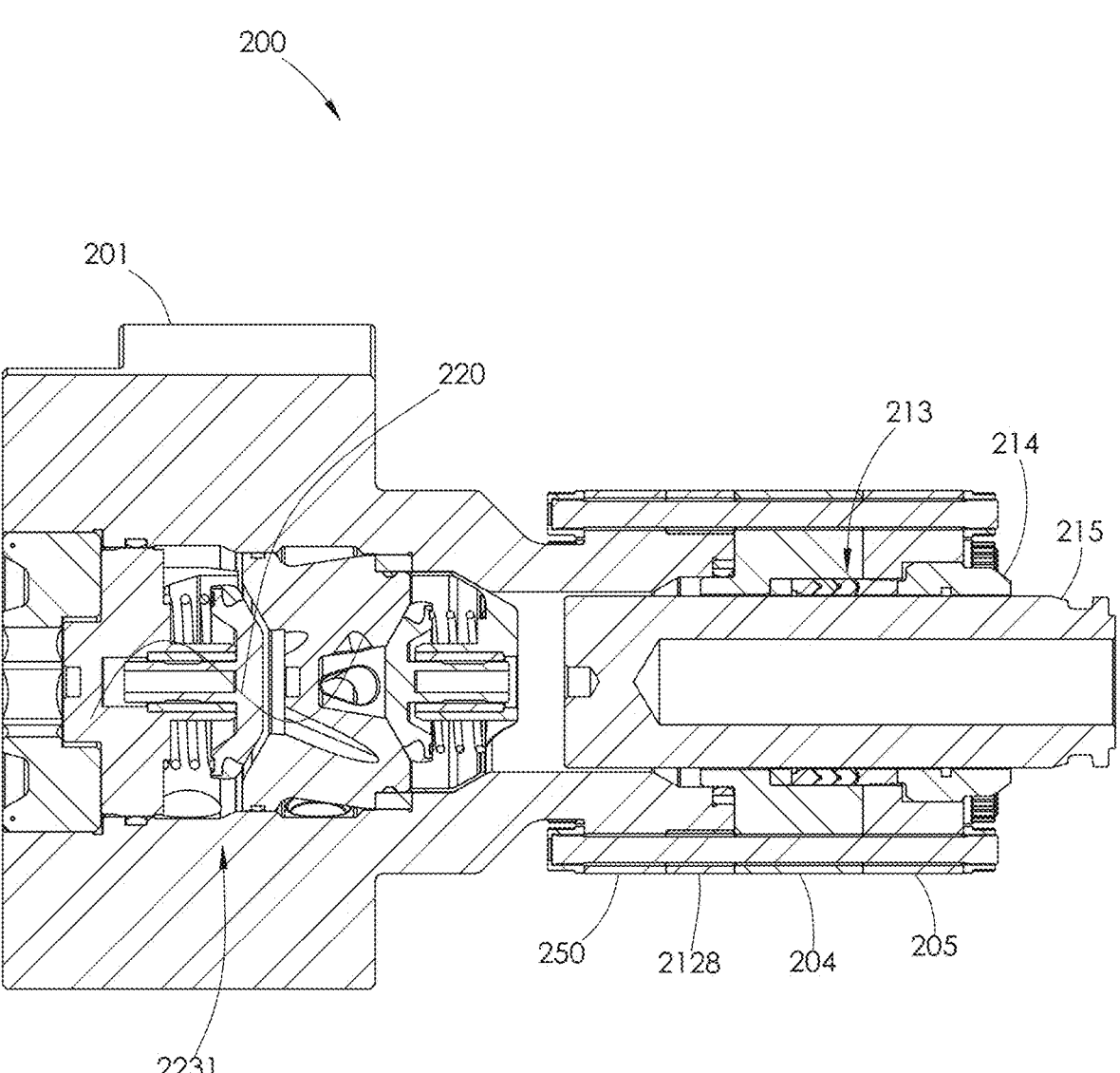
FIG. 56A is the cross-sectional view of the fluid end section shown in FIG. 56 with the flow control components, packing, packing nut, and plunger shown.
Figure 57:
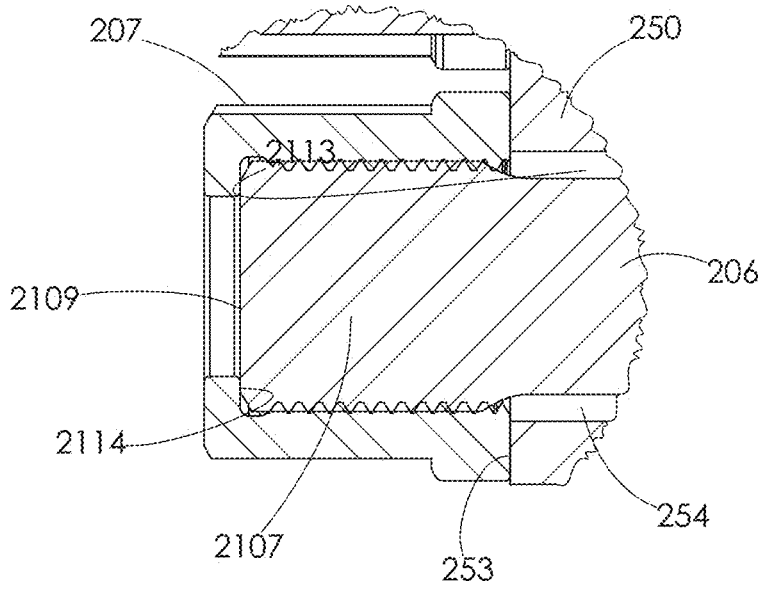
FIG. 57 is an enlarged view of area AA of FIG. 56.

To continue the assembly of the fluid end section 200 the various components 2231 that are configured to route fluid through the housing 201 are installed in the horizontal bore 220 as shown in FIG. 56A. In contrast to the housing 101 shown in FIG. 3, the housing 201 does not include the front wear ring 124. The stuffing box seal 2127 is inserted into the rear wear ring 228 so that the outer intermediate surface 2137 of the stuffing box seal 2127 engages the inner intermediate surface 272 of the rear wear ring 228, and the front surface 2135 of the stuffing box seal 2127 abuts the base 261 of the rear wear ring counterbore 258, as shown in FIGS. 56 and 58.

Next, the first externally threaded ends 2107 of the studs 206 are inserted into the through holes 254 of the rear flange 250 of the housing 201. A blind nut 207 is then torqued onto each of the first externally threaded ends 2107 of the studs 206 until the end surface 2109 of the stud 206 abuts the base 2114 of the threaded blind bore 2113 of the blind nut 207, as shown in FIGS. 56 and 58.

The spacer sleeve 2128 is oriented so that the front surface 2131 will abut the rear surface 2130 of the rear flange 250 when assembled. The stud through holes 2134 of the spacer sleeve 2128 are aligned with the second externally threaded ends 2108 of the studs 206 now protruding from the rear surface 2130 of the rear flange 250 and the protruding section 2129 of the outer intermediate surface 219 of the housing 201 is aligned with central bore 2133 of the spacer sleeve 2128. Next, simultaneously, the second externally threaded ends 2108 of the studs 206 are inserted into the stud through holes 2134 and the protruding section 2129 is inserted into the central bore 2133 of the spacer sleeve 2128 until the rear surface 2130 of the rear flange 250 abuts the front surface 2131 of the spacer sleeve 2128.

The stuffing box 204 is oriented so that the front surface 288 of the stuffing box 204 will abut the rear surface 218 of the housing 201 and the rear surface 2132 of the spacer sleeve 2128 when assembled. The through holes 292 of the stuffing box 204 are aligned with the second externally threaded ends 2108 of the studs 206 now protruding from the rear surface 2130 of the spacer sleeve 2128 and the second externally threaded ends 2108 of the studs 206 are inserted into the through holes 292. Simultaneously the annular extension 296 is inserted into the stuffing box seal 2127 with the outside diameter 298 of the annular extension 296 engaging the inner intermediate surface 2138 of the stuffing box seal 2127. Locating dowel pins 211 are inserted in the blind bores 299 on the rear surface 289 of the stuffing box 204. The rear retainer 205 is oriented so that the front surface 2100 of the rear retainer 205 will abut the rear surface 289 of the stuffing box 204 when assembled. The stud through holes 2104 of the rear retainer 205 are aligned with the studs 206 now protruding from the rear surface 289 of the stuffing box 204. The locating dowel pin through holes 2103 are aligned with the locating dowel pins 211 now protruding from the rear surface 289 of the stuffing box 204. Simultaneously the studs 206 are inserted in the stud through holes 2104 and the locating dowel pins 211 are inserted in the locating dowel pin through holes 2103 of the rear retainer 205 until the rear surface 289 of the stuffing box 204 abuts the front surface 2100 of the rear retainer 205. The nuts 209 are threaded onto the second externally threaded ends 2108 of the studs 206 now protruding from the rear surface 2101 of the rear retainer 205. The nuts 209 are then torqued to specification. Referring now to FIG. 56A, the packing 213 is inserted in the stuffing box 204 and the plunger 215 is inserted through the packing 213. Finally, the packing nut 214 is threaded in rear retainer 205 and torqued until the desired compression of the packing 213 is obtained.

In operation the central bore 2133 of the spacer sleeve 2128 is sized such that the spacer sleeve 2128 never applies any meaningful compressive force to the outer intermediate surface 219 of the housing 201. Specifically, the spacer sleeve 2128 does not constrain the expansion of the protruding section 2129 when the rear wear ring 228 is pressed into the rear wear ring counterbore 258. This results in a uniform, or more uniform, deflection of the rear wear ring 228 upon installation. The stress resulting from the deflection is therefore also more uniform. This eliminates, or drastically reduces, stress concentration areas within the rear wear ring 228 increasing the life of the component and the maintenance intervals for the pump.

Quantitative simulations of the stress distribution in the rear wear ring 228 show a relationship between the length of the protruding section 2129 and the distribution of stress within the rear wear ring 228. Specifically, the longer the protruding section 2129 is the more uniform the stress distribution is in the rear wear ring 228. There is, of course, a point at which any further increase in length of the protruding section 2129 results in no measurable change in the stress distribution of the rear wear ring 228.

Also, during operation the spacer sleeve 2128 is sized such that the rear surface 2132 shares the compressive load with the rear surface 218 of the housing 201 reducing the stress on the rear surface 218 of the housing 201. The front surface 2131 of the spacer sleeve 2128 provides a reactionary surface for the rear surface 2130 of the rear flange 250. This reduces the bending deflection of the rear flange 250 and consequently the bending stress in the rear flange 250. These benefits again increase the life of the components involved and the maintenance intervals for the pump.

Referring now to FIGS. 74-79, a high-pressure pump 3139 with a plurality of prior art fluid end sections 300 is shown. This high-pressure pump 3139 is of a type disclosed in U.S. Patent Publication No. 2022/0389916, authored by Keith et al., and published on Dec. 8, 2022, the entire contents of which are incorporated herein by reference. While the stay rods 3140 provide a means for simple and quick replacement of completely assembled fluid end sections 300, any maintenance to be performed on the rear of the fluid end section 300 without completely removing the fluid end section 300 is made more difficult by the minimal clearance between the stay rods 3140. Therefore, the discussion below provides an improvement over the incorporated Keith reference.

Specifically, it is desirable to be able to replace or adjust the packing (not shown) without removing the fluid end section 300. Replacement of the packing requires removing or loosening the packing nut 314, pony rod clamp 3141, and at least the rear retainer 305.

The packing nut 314 is removed using a spanner wrench (not shown). With the stay rods 3140 in place the usable stroke of the spanner wrench is very small and requires numerous small rotations and resets of the spanner wrench to loosen or remove the packing nut 314.

The pony rod clamp 3141 is removed by removing a plurality of pony rod clamp fasteners 3142. The pony rod clamp fasteners 3142 are removed using a ratchet wrench (not shown) and are accessible using a long extension so are not considered overly difficult to remove.

The rear retainer 305 is removed by removing the plurality of nuts 309. In the embodiment shown there are eight nuts 309 holding the retainer 305 to the stuffing box 304. Again, due to the minimal clearances between the stay rods 3140, the removal of each nut 309 requires numerous short strokes and resets by the wrench (not shown) used to remove the nut 309. A method is needed to reduce the time and effort it takes to service the rear end of the fluid end section 300.

Figures 82, 83:
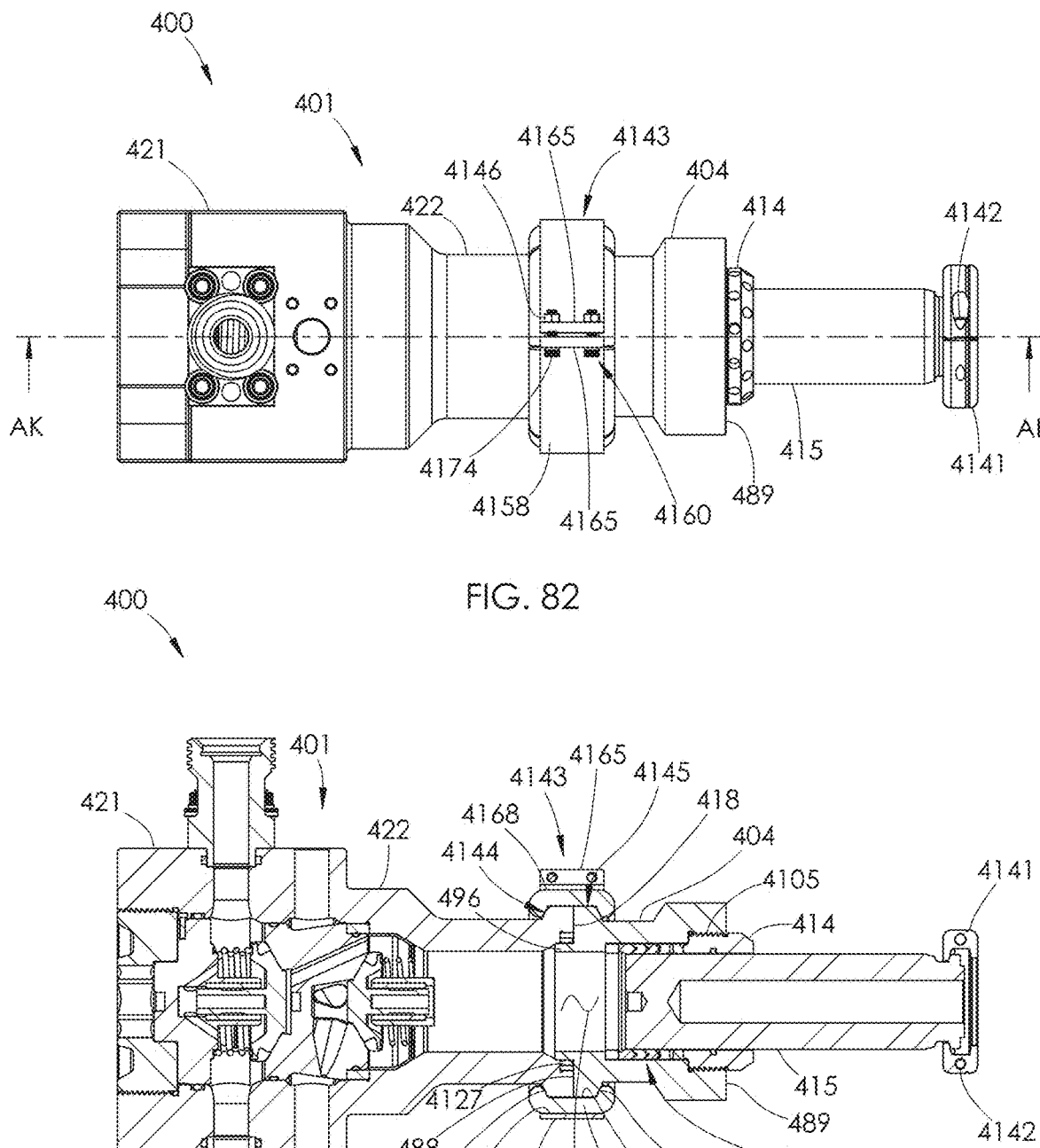
FIG. 82 is a top plan view of the fluid end section shown in FIG. 80.
FIG. 83 is a cross-section view of the fluid end section shown in FIG. 82, taken along line AK-AK.

Referring now to FIGS. 80-102, an improved fluid end section 400 is shown. This improved fluid end section 400 comprises a stuffing box 404 connected to a fluid end housing 401 by means of a clamp 4143. The clamp 4143 engages flanges 4144, 4145 of the fluid end housing 401 and stuffing box 404 to provide the required forces necessary for maintaining the fluid seal and structural integrity between the fluid end housing 401 and stuffing box 404 during operation of the high-pressure pump 4139, as shown in FIG. 83. The clamp 4143 may be removed by loosening only two nuts 4146 which are more easily accessible than the eight nuts 309 described in the prior art above. The fluid end section 400 further comprises packing 413, a packing nut 414, a plunger 415, and a stuffing box seal 4127. This improvement greatly simplifies the servicing of the packing 413 compared to a previous method of clamping on flanges, disclosed in U.S. Pat. No. 11,920,583, issued to Foster et al., issued on Mar. 5, 2024 and published on Sep. 8, 2022, the entire contents of which are incorporated herein by reference. The clamping system of the '583 patent requires the use of four threaded studs, unlike the clamping system disclosed herein.

Figure 86:
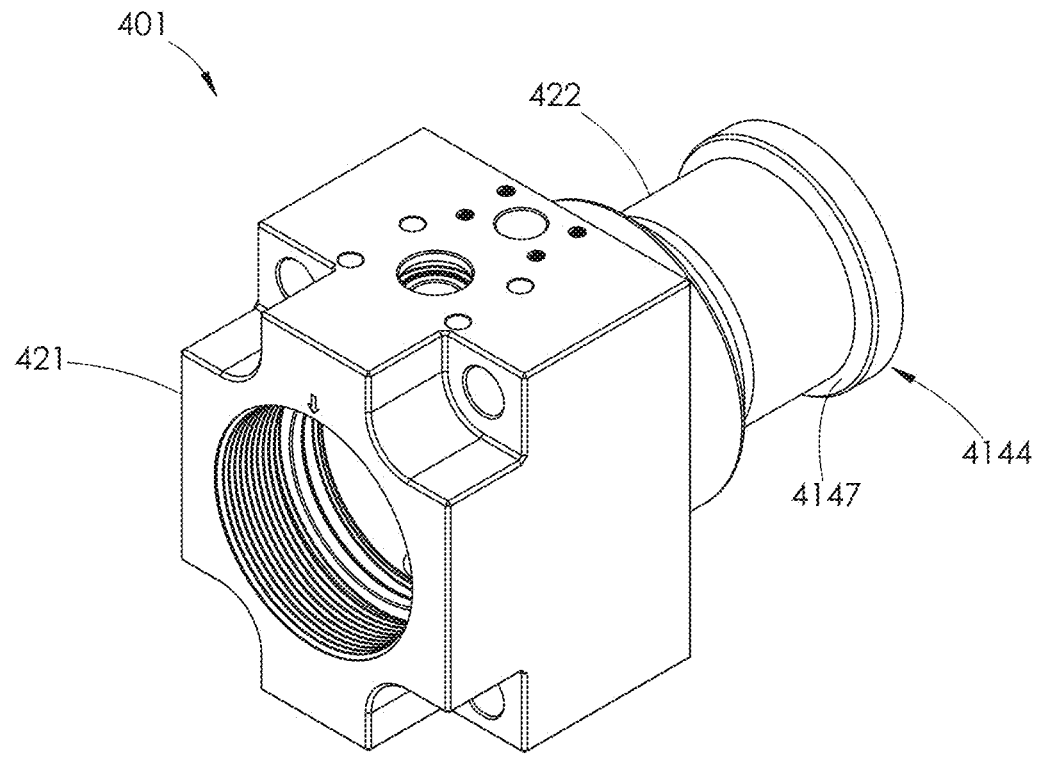
FIG. 86 is a right front perspective view of a housing of the fluid end section shown in FIG. 80.
Figure 87:
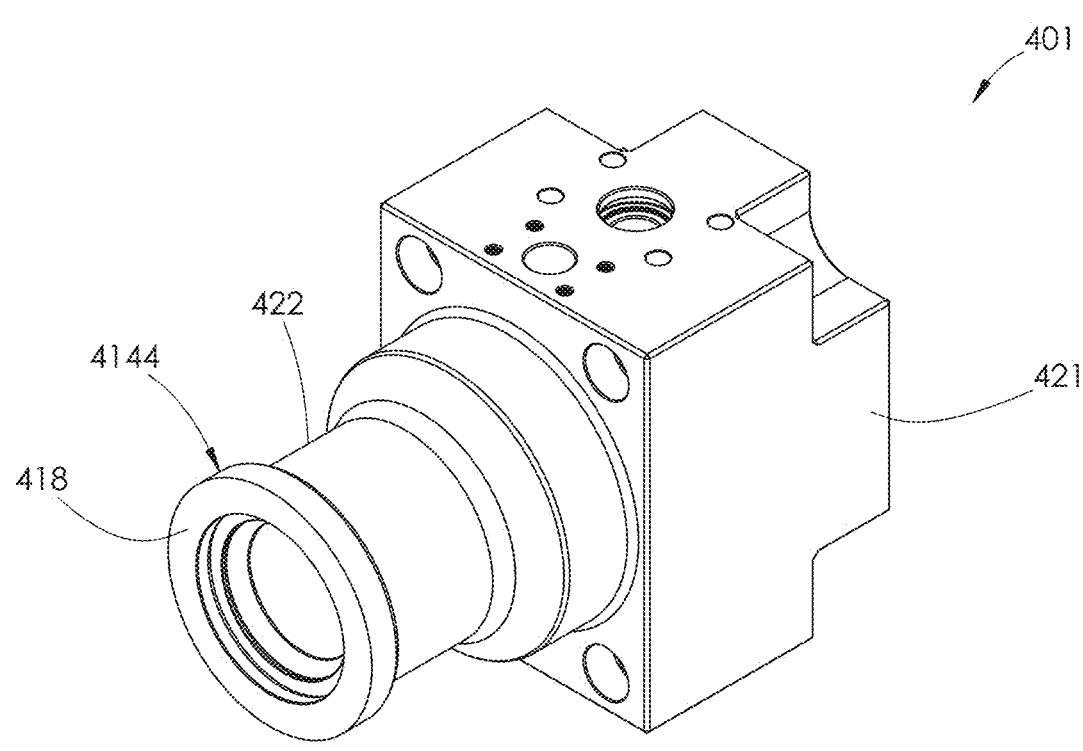
FIG. 87 is a left rear perspective view of the housing shown in FIG. 86.

Referring now to FIGS. 86-87, the fluid end housing 401 is shown. The fluid end housing 401 comprises a first section 421 integrally formed to a second section 422. The first section 421 is generally shaped like a rectangular prism while the second section 422 is generally shaped like a cylinder. The second section 422 comprises a flange 4144 adjacent to the rear surface 418 of the fluid end housing 401 which is also the rear surface 418 of the second section 422 and the flange 4144. The flange 4144 further comprises an angled front surface 4147.

Figures 88, 89:
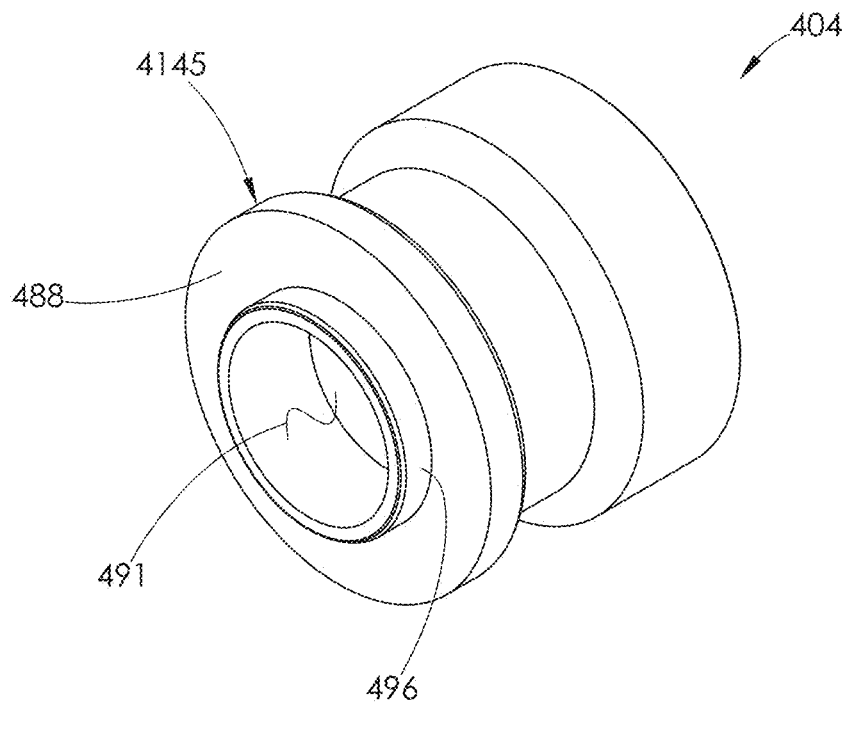
FIG. 88 is a right front perspective view of a stuffing box of the fluid end section shown in FIG. 80.
FIG. 89 is a left rear perspective view of the stuffing box shown in FIG. 88.

Referring now to FIGS. 88-89, the stuffing box 404 is shown. The stuffing box 404 shown in this embodiment combines the forms and functions of the stuffing box 304 and rear retainer 305 described in the prior art. The stuffing box 404 comprises a front surface 488, rear surface 489, central bore 491, and an annular extension 496 projecting from the front surface 488. The annular extension 496 engages the stuffing box seal 4127 when assembled preventing fluid leakage between the fluid end housing 401 and the stuffing box 404. The stuffing box 404 further comprises a flange 4145 adjacent to the front surface 488 of the stuffing box 404. The flange 4145 comprises a front surface 488, that is also the front surface 488 of the stuffing box 404, and an angled rear surface 4148. The central bore 491 comprises internal threads 4105 adjacent to the rear surface 489 of the stuffing box 404. The internal threads 4105 mate with the externally threaded section 4149 of the packing nut 414.

Figure 90:
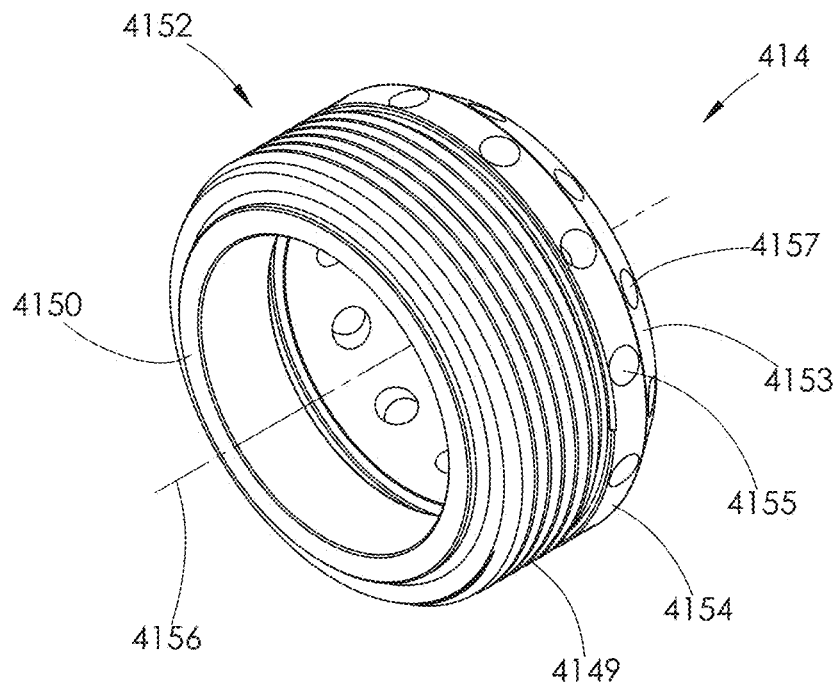
FIG. 90 is a right front perspective view of a packing nut of the fluid end section shown in FIG. 80.
Figure 91:
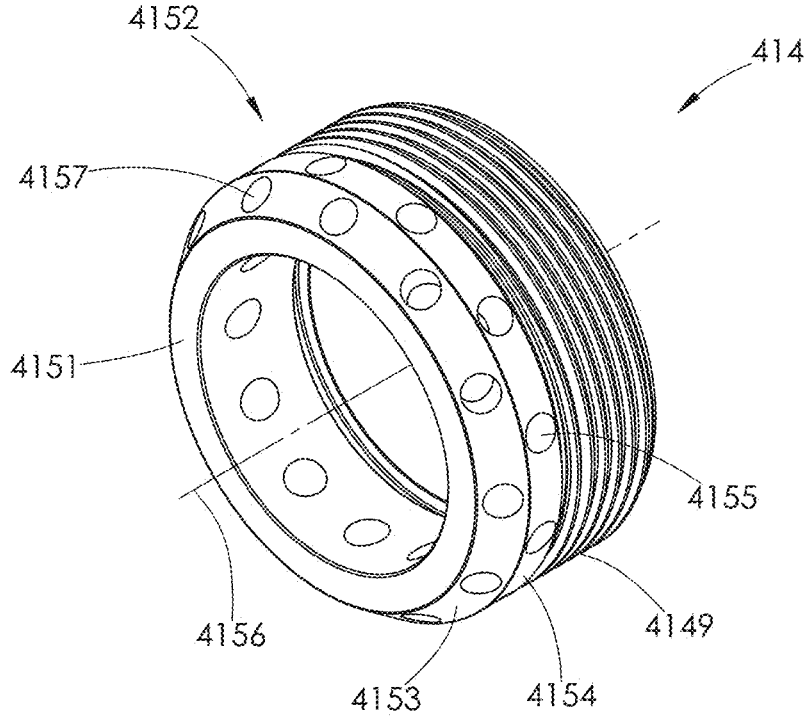
FIG. 91 is a left rear perspective view of the packing nut shown in FIG. 90.
Figure 92:
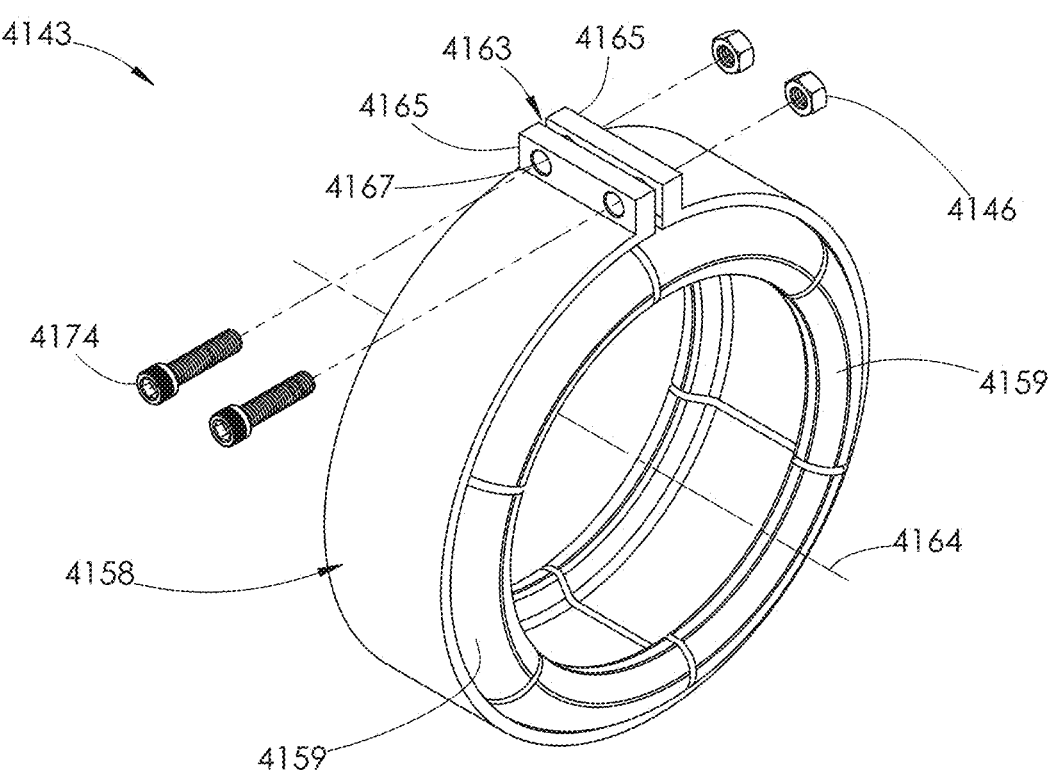
FIG. 92 is a partially exploded right rear perspective view of a clamp of the fluid end section shown in FIG. 80.
Figure 93:
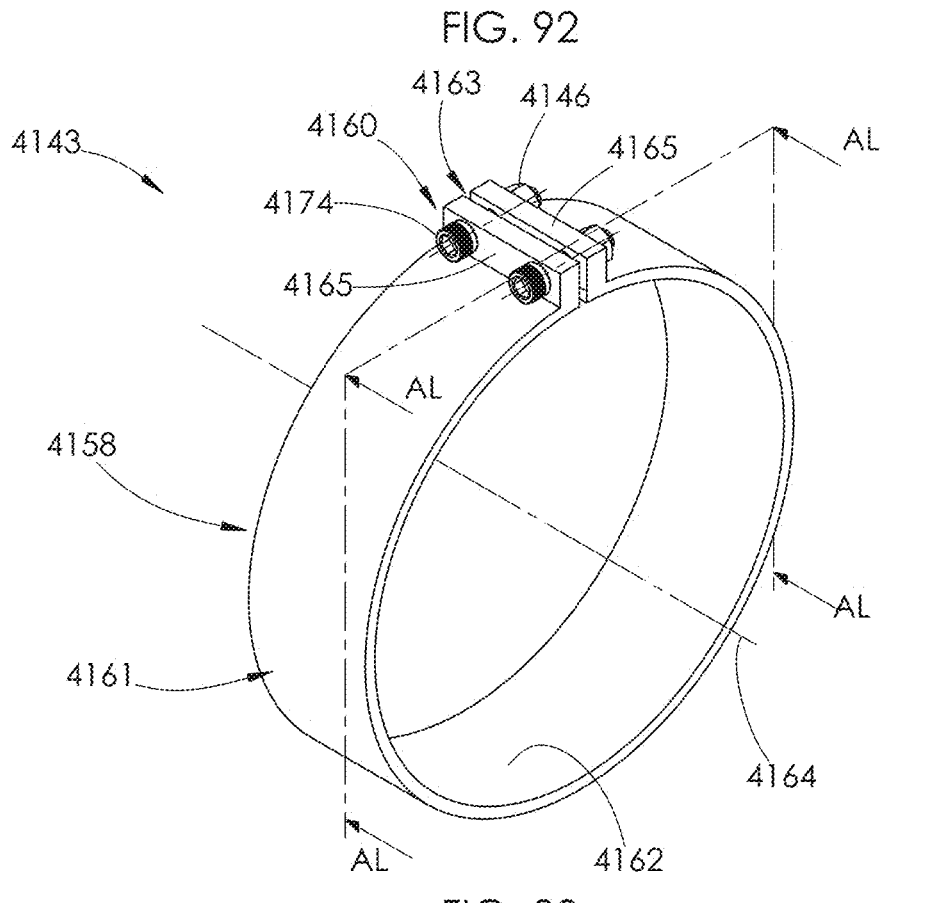
FIG. 93 is a right rear perspective view of the compression ring and compression ring fasteners of the clamp shown in FIG. 92.
Figure 94:
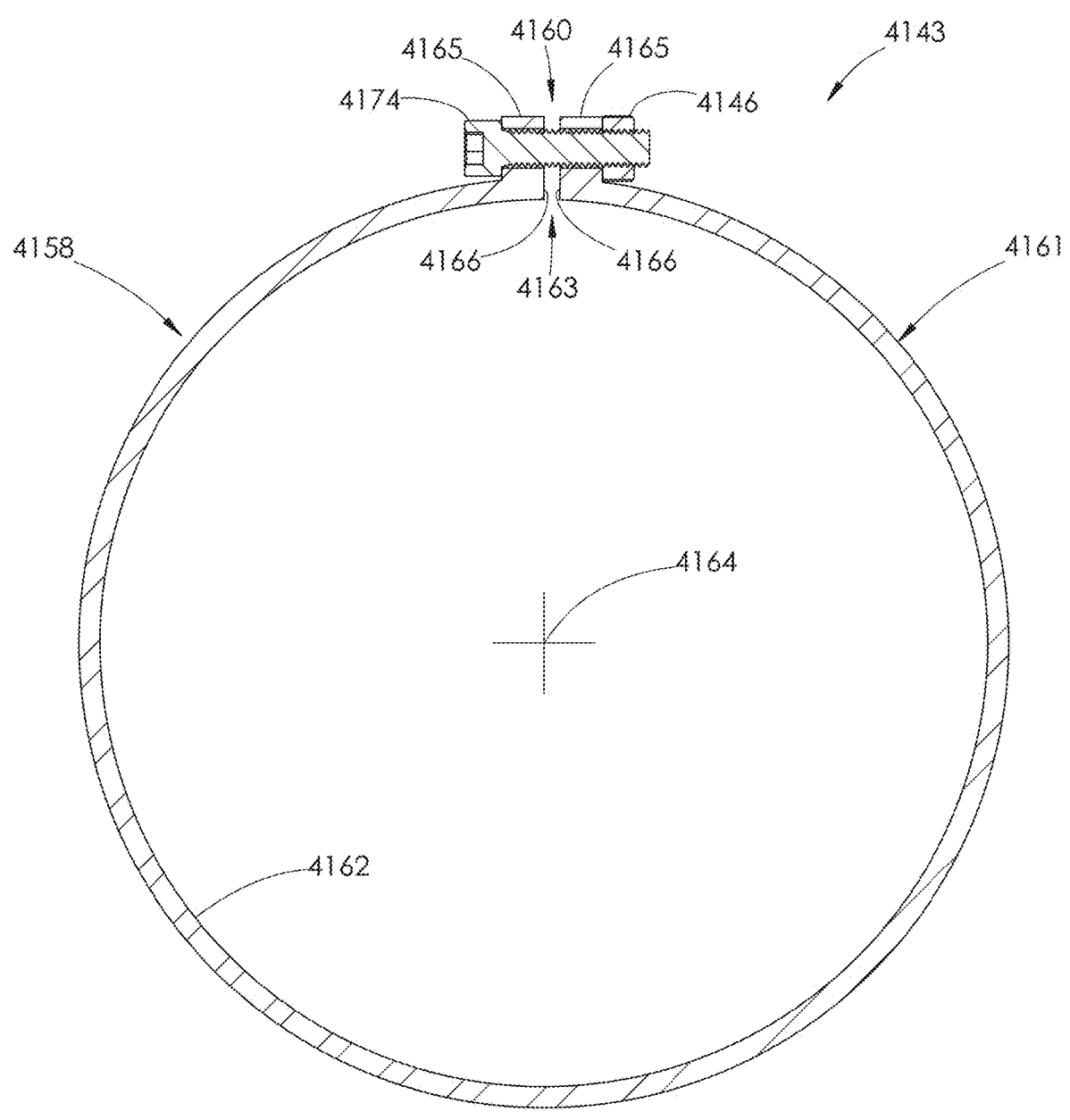
FIG. 94 is a cross-sectional view of the compression ring and compression ring fasteners shown in FIG. 93, taken along line AL-AL.
Figure 95:
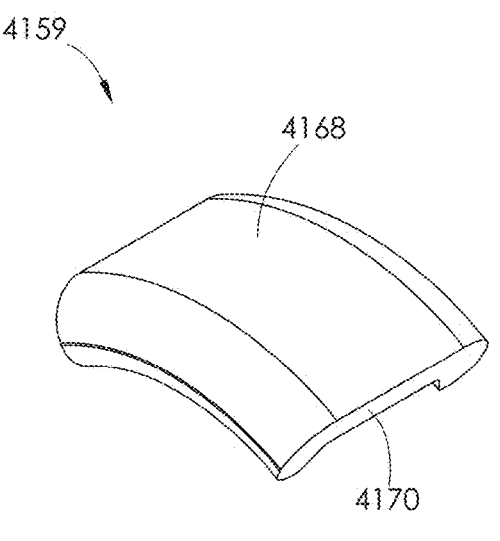
FIG. 95 is a top front right perspective view of a clamp section.
Figure 96:
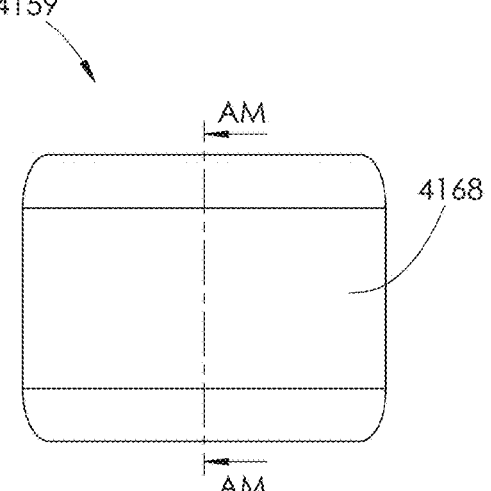
FIG. 96 is a bottom front right perspective view of the clamp section shown in FIG. 95.
Figure 97:
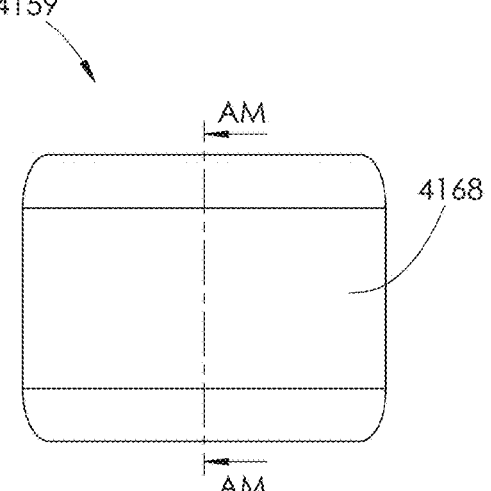
FIG. 97 is a top plan view of the clamp section shown in FIG. 95.
Figure 98:
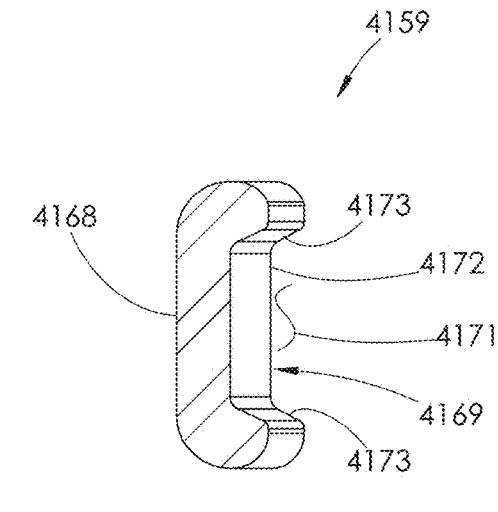
FIG. 98 is a cross-sectional view of the clamp section shown in FIG. 97, taken along line AM-AM.
Figure 99:
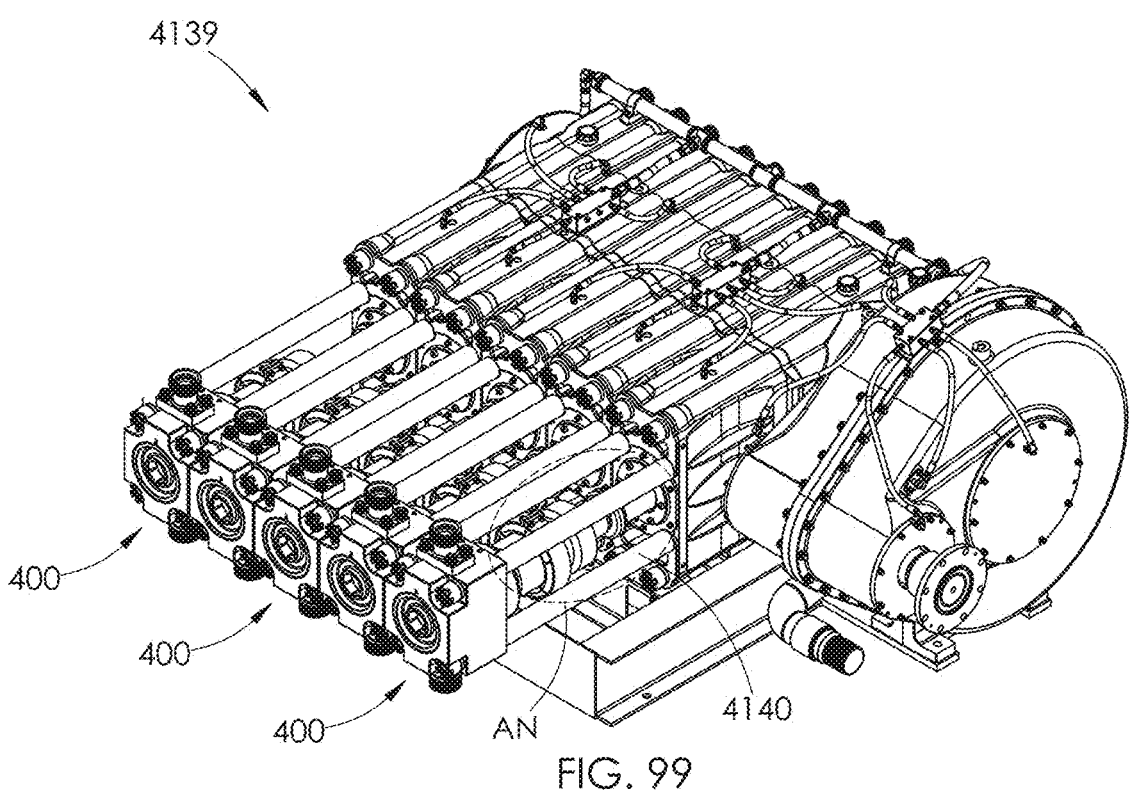
FIG. 99 is a right front perspective view of a high-pressure pump.

Referring now to FIGS. 90-91, the packing nut 414 is shown. The packing nut 414 comprises a front surface 4150, rear surface 4151, and an intermediate outer surface 4152. The intermediate outer surface 4152 comprises an externally threaded section 4149 adjacent to the front surface 4150, a tapered, or chamfered, section 4153 adjacent to the rear surface 4151, and a central section 4154 between the externally threaded section 4149 and the tapered section 4153. The central section 4154 comprises a plurality of spanner wrench blind holes 4155 bored perpendicular to the longitudinal axis 4156 of the packing nut 414. The spanner wrench blind holes 4155 are spaced evenly around the circumference of the packing nut 414. The tapered section 4153 comprises a plurality of spanner wrench through holes 4157. The bore axes of the spanner wrench through holes 4157 intersect the longitudinal axis 4156 of the packing nut 414 but are bored perpendicular to the surface of the tapered section 4153. In this embodiment there are the same number of spanner wrench blind holes 4155 as spanner wrench through holes 4157. The spanner wrench through holes 4157 are also spaced evenly around the circumference of the packing nut 414 but are positioned circumferentially between the spanner wrench blind holes 4155.

Referring now to FIGS. 92-98, the clamp 4143 and its components are shown. The clamp 4143 comprises a compression ring 4158, a primary clamp made up of a plurality of clamp sections 4159, and a plurality of compression ring fasteners 4160. The compression ring 4158 comprises a thin-walled cylindrical body 4161 with an inner surface 4162. The thin-walled cylindrical body 4161 has a cut 4163 that allows the compression ring 4158 to expand and contract radially. The cut 4163 is made parallel to the longitudinal axis 4164 of the clamp 4143. A tab 4165 extends radially from each cut end 4166 of the thin-walled cylindrical body 4161. A plurality of fastener holes 4167 are formed in each tab 4165. In this embodiment the compression ring fasteners 4160 comprise a nut 4146 and bolt 4174 but may be any type of reusable fasteners.

Referring now to FIGS. 95-98, a clamp section 4159 is shown. The clamp section 4159 is generally shaped like a circular sector of a thin-walled cylinder. The clamp section 4159 comprises an outer surface 4168, inner surface 4169, and two end surfaces 4170. The inner surface 4169 comprises a cutout, or groove, 4171, that comprises a constant radius surface 4172 bounded longitudinally by two angled surfaces 4173, which extend from the inner surface 4169 to form an edge wall or rim. Each of the angled surfaces 4173 is formed at the same angle as the angled front and rear surfaces 4147, 4148 of the fluid end housing 401 and stuffing box 404. The two end surfaces 4170 are formed parallel to radii of the circular sector.

Figure 100:
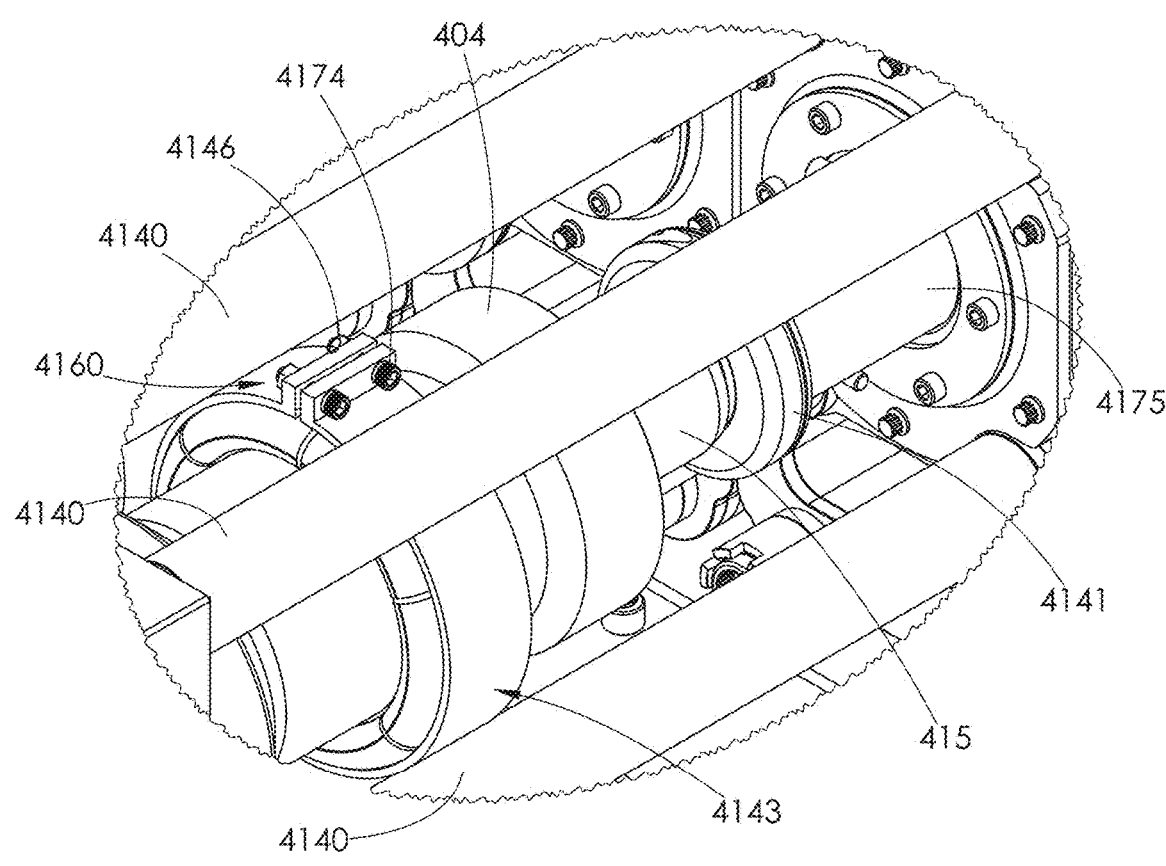
FIG. 100 is an enlarged view of area AN of FIG. 99.

Referring now to FIGS. 80-85, the stuffing box 404 is assembled to the fluid end housing 401 by first sliding the compression ring 4158 over the second section 422 of the fluid end housing 401. Second, the annular extension 496 of the stuffing box 404 is inserted into the stuffing box seal 4127 until the front surface 488 of the stuffing box 404 abuts the rear surface 418 of the fluid end housing 401. Third, the clamp sections 4159 are placed on the flanges 4144, 4145 such that the angled front and rear surfaces 4147, 4148 engage the angled surfaces 4173 of the groove 4171 of each clamp section 4159. The clamp sections 4159 are spaced circumferentially such that the end surfaces 4170 abut, or nearly abut, each other thus completely encircling the flanges 4144, 4145. Fourth, while holding the clamp sections 4159 in place, the compression ring 4158 is placed around the clamp sections 4159 such that the inner surface 4162 of the thin-walled cylindrical body 4161 of the compression ring 4158 contacts and envelops the outer surface 4168 of the clamp sections 4159. Fifth, the compression ring fasteners 4160 are inserted in the fastener holes 4167 of the tabs 4165 and tightened. Tightening the compression ring fasteners 4160 reduces the diameter of the compression ring 4158 and the clamp sections 4159 under the compression ring 4158. As the diameter of the clamp sections 4159 decreases the angled surfaces 4173 of the groove 4171 of the inner surface 4169 apply a cancelling radial force and a compressive longitudinal force to the flanges 4144, 4145 thus holding the stuffing box 404 to the fluid end housing 401. Sixth, the packing 413 is installed, the plunger 415 is inserted in the packing 413, and the packing nut 414 placed over the plunger 415 and threaded into the stuffing box 404. Seventh, the plunger 415 is then attached to the pony rod 4175 using the pony rod clamp 4141 and pony rod clamp fasteners 4142 as shown in FIG. 100. Finally, the packing nut 414 is torqued to apply the desired compression force to the packing 413.

With this improvement it is possible, even desirable, to preassemble the packing 413, plunger 415, and packing nut 414 in the stuffing box 404 prior to attaching the stuffing box 404 to the fluid end housing 401 with the clamp 4143. Once the packing nut 414 is torqued to apply the desired compression force to the packing 413 it is very difficult to slide the plunger 415 to the required position for connection to the pony rod 4175. For this reason, the packing nut 414 is not torqued completely until after the stuffing box 404 is installed and the plunger 415 is attached to the pony rod 4175.

Figure 84:
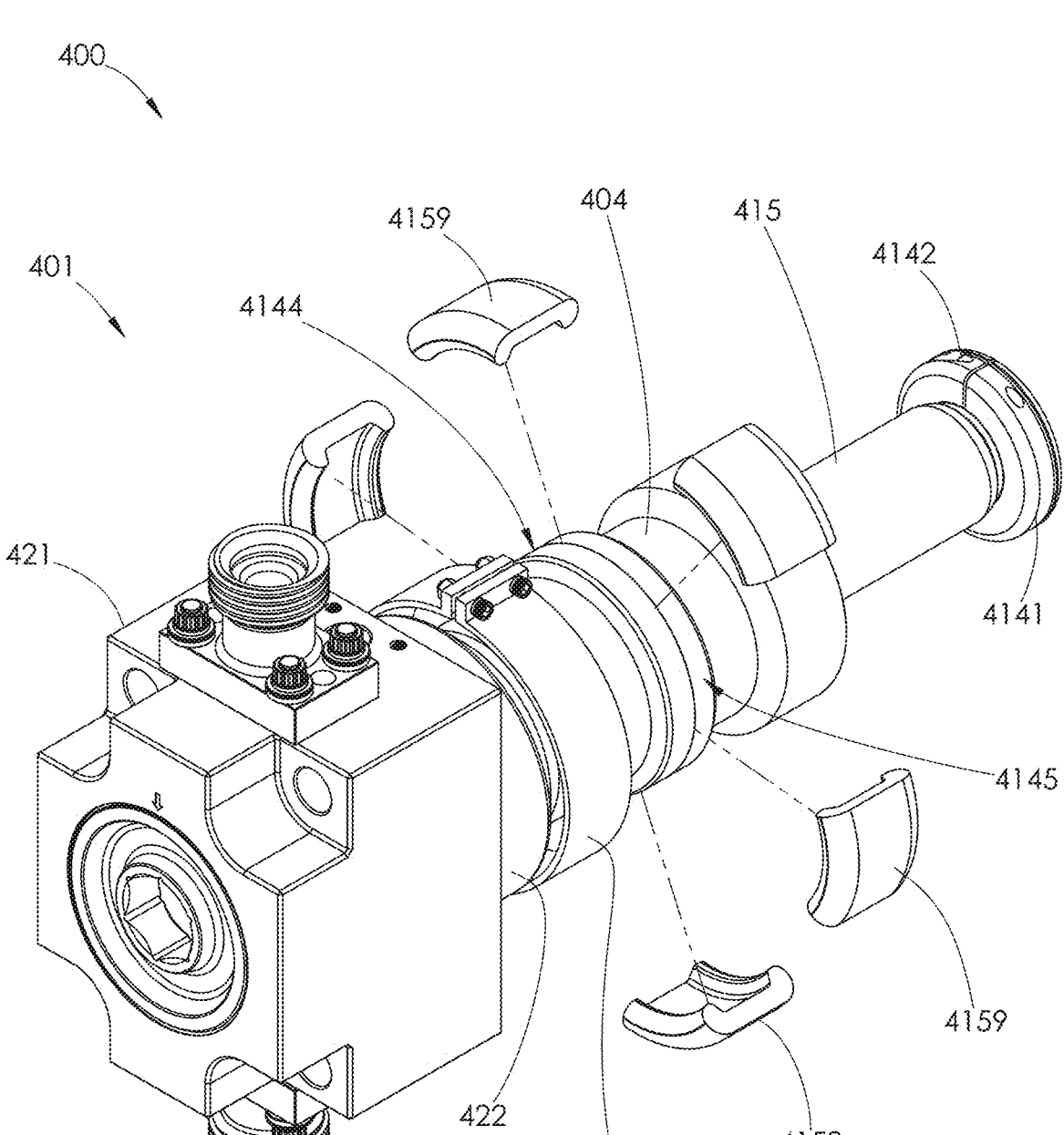
FIG. 84 is a partially exploded right front perspective view of the fluid end section shown in FIG. 80.
Figures 101, 102:
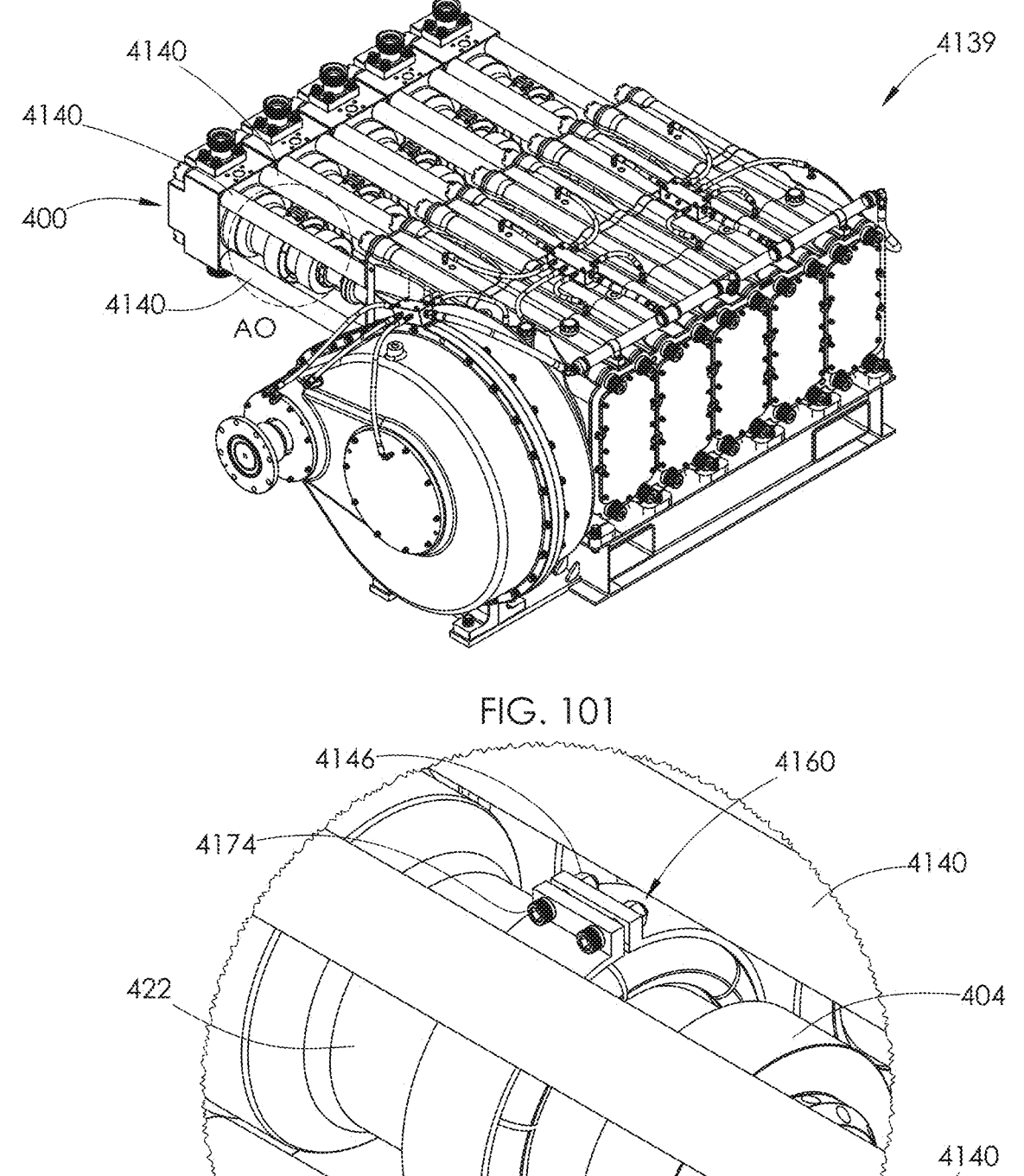
FIG. 101 is a right rear perspective view of the high-pressure pump shown in FIG. 99.
FIG. 102 is an enlarged view of area AO of FIG. 101.
Figure 103:
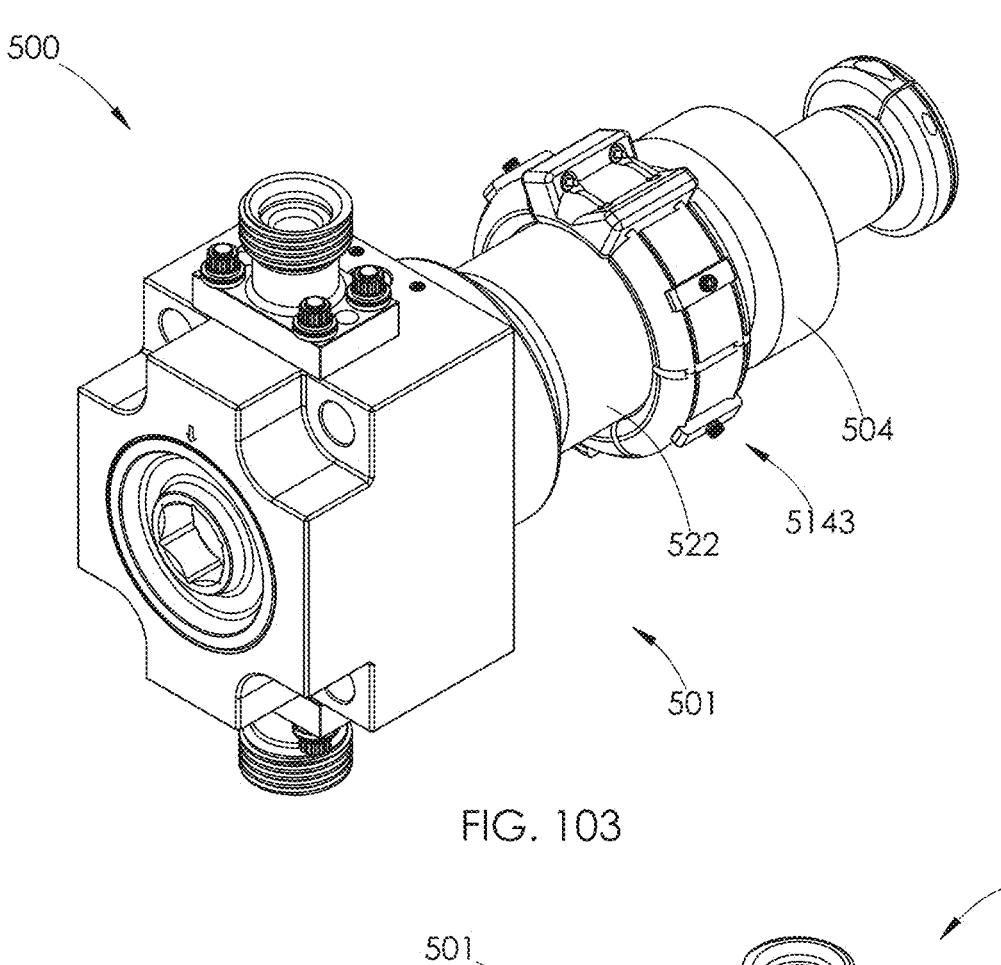
FIG. 103 is a right front perspective view of another embodiment of a fluid end section.
Figure 104:
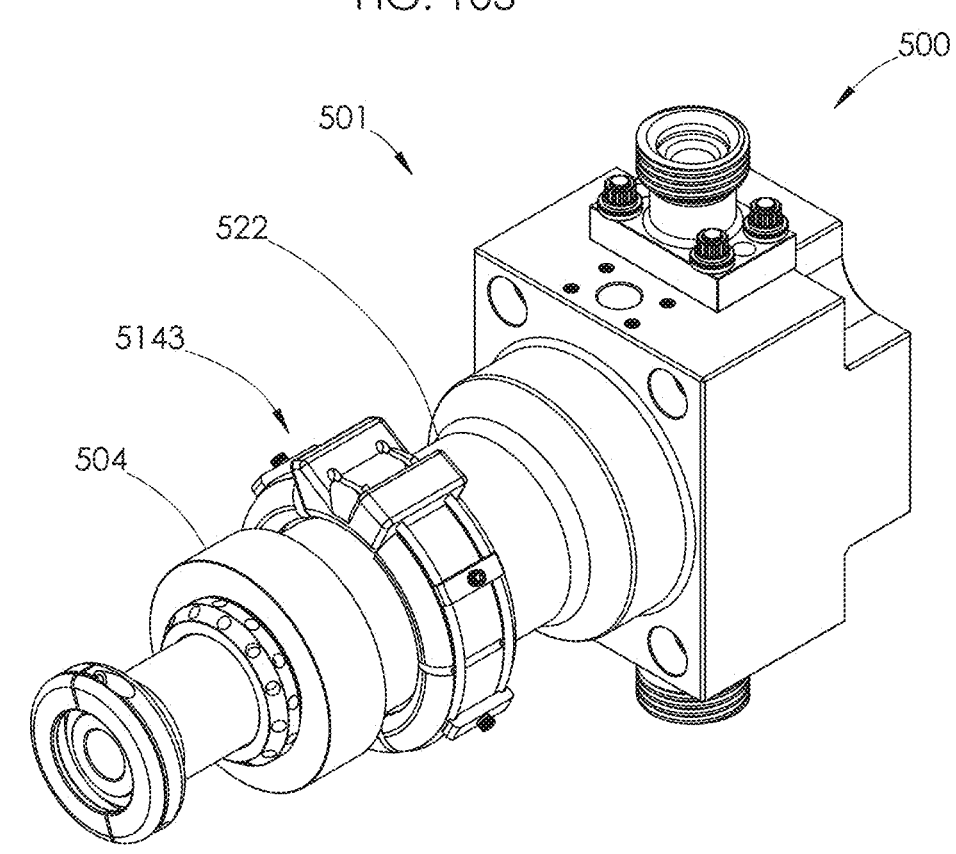
FIG. 104 is a left rear perspective view of the fluid end section shown in FIG. 103.
Figure 105:
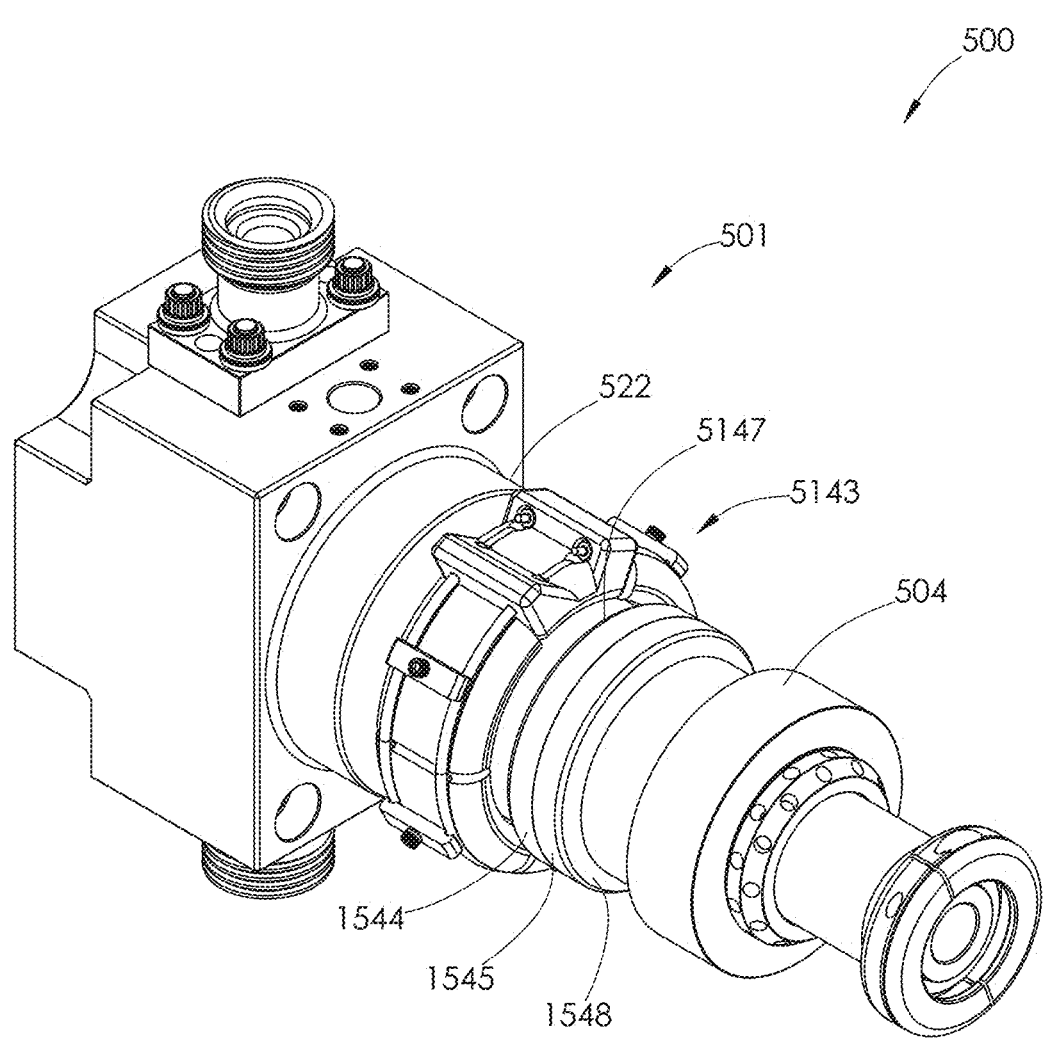
FIG. 105 is a partially exploded, right rear perspective view of the fluid end section shown in FIG. 103.
Figure 106:
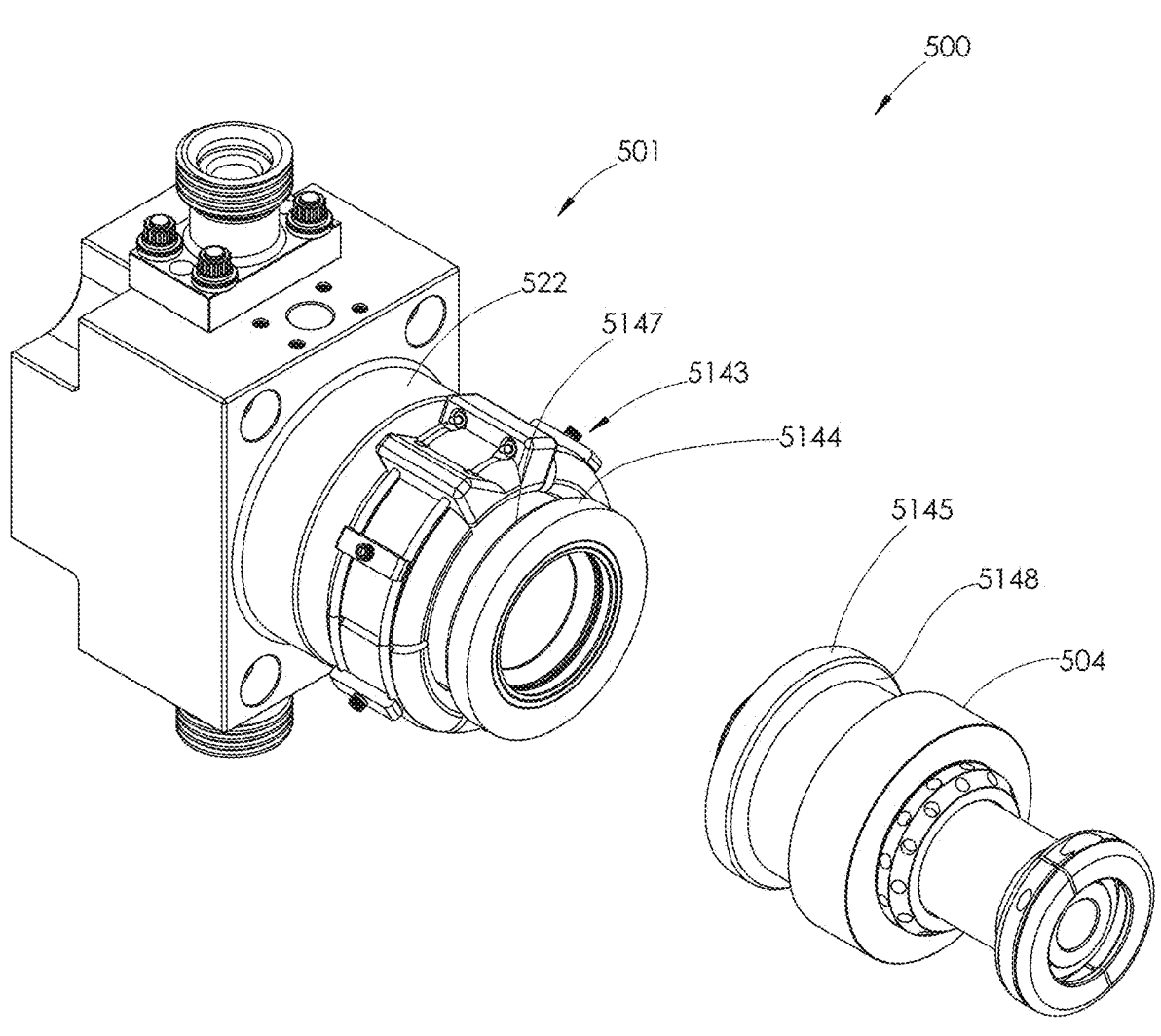
FIG. 106 is a partially exploded, right rear perspective view of the fluid end section shown in FIG. 103.

Referring now to FIGS. 84-85 and 99-102, to change the packing 413 in the field the two compression ring fasteners 4160 are removed, or loosened enough, to allow the compression ring 4158 to slide off the clamp sections 4159 toward the first section 421 of the fluid end housing 401, as shown in FIG. 84. Next, the clamp sections 4159 are removed, also shown in FIG. 84. Then the two pony rod fasteners 4142 and pony rod clamp 4141 are removed. This allows the entire stuffing box 404, packing 413, packing nut 414, and plunger 415 assembly to be removed to a more convenient area for maintenance. It is also possible to have a second stuffing box 404, packing 413, packing nut 414, plunger 415 assembly preassembled for replacement further reducing maintenance time. As seen in FIGS. 100 and 102 the location and orientation of the compression ring fasteners 4160 is such that they are easily removeable by a socket wrench with an extension as are the pony rod clamp fasteners 4142.

Continuing with FIGS. 100 and 102, the packing 413 may need to be further compressed during operation. To further compress the packing 413 the packing nut 414 must be torqued and as stated earlier, the location of the stay rods 4140 makes this difficult. The presence of the offset row of spanner wrench through holes 4157 makes it easier to gain access to the packing nut 414 in any rotational orientation always providing a place to engage the spanner wrench (not shown) used to torque the packing nut 414.

Referring now to FIGS. 103-125, another embodiment of a fluid end section 500 is shown. The fluid end section 500 comprises a fluid end housing 501, stuffing box 504, and clamp 5143. The fluid end housing 501 comprises a second section 522 and a flange 5144 with an angled front surface 5147. The stuffing box 504 comprises a flange 5145 with an angled rear surface 5148.

Referring now to FIGS. 107-121, the clamp 5143 comprises a plurality of compression rings 5158, a plurality of compression ring fasteners 5160, a primary clamp made up of a first clamp section 5176 and a plurality of clamp sections 5159, a plurality of ring clamps 5177, and a plurality of ring clamp fasteners 5178.

Figure 109:
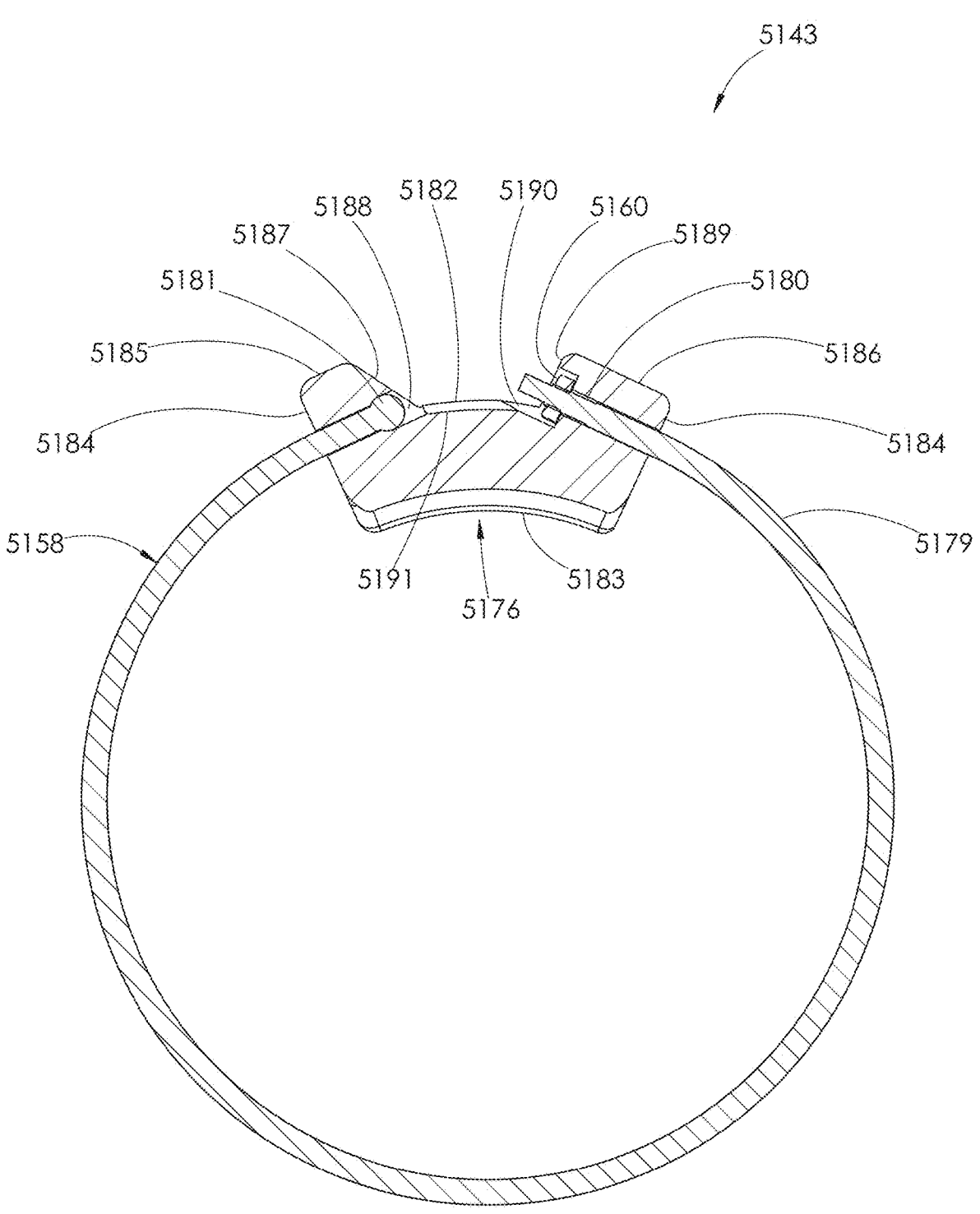
FIG. 109 is a cross-sectional view of the compression rings, first clamp section, and compression ring fasteners shown in FIG. 108, taken along line AP-AP.
Figures 110, 111:
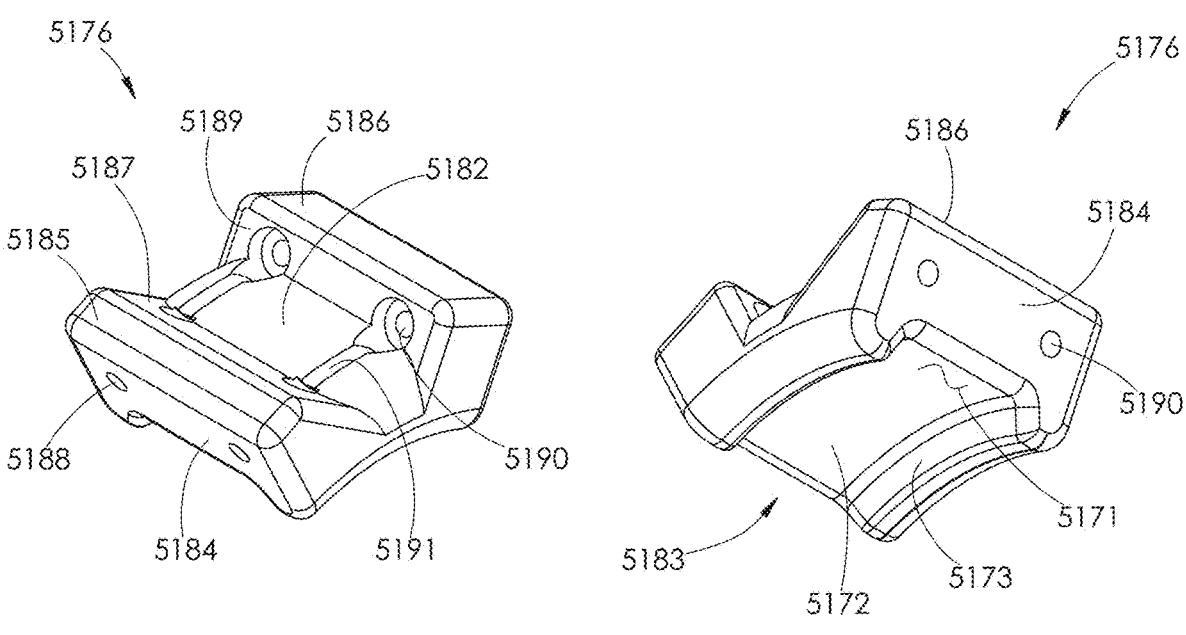
FIG. 110 is a top right front perspective view of a first clamp section.
FIG. 111 is a bottom right front perspective view of the first clamp section shown in FIG. 110.
Figures 112, 113:
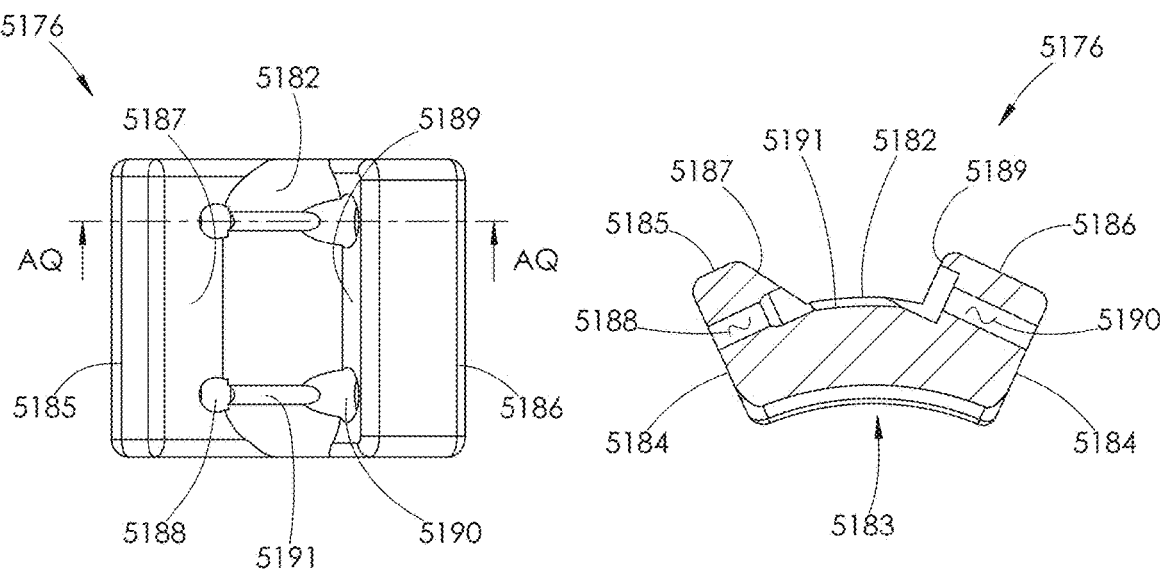
FIG. 112 is a top plan view of the first clamp section shown in FIG. 110.
FIG. 113 is a cross-sectional view of the first clamp section shown in FIG. 112, taken along line AQ-AQ.
Figure 118:
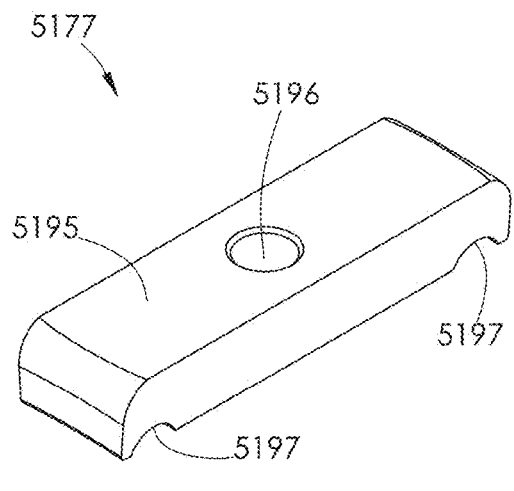
FIG. 118 is a top front right perspective view of a ring clamp.
Figure 119:
Figure 120:
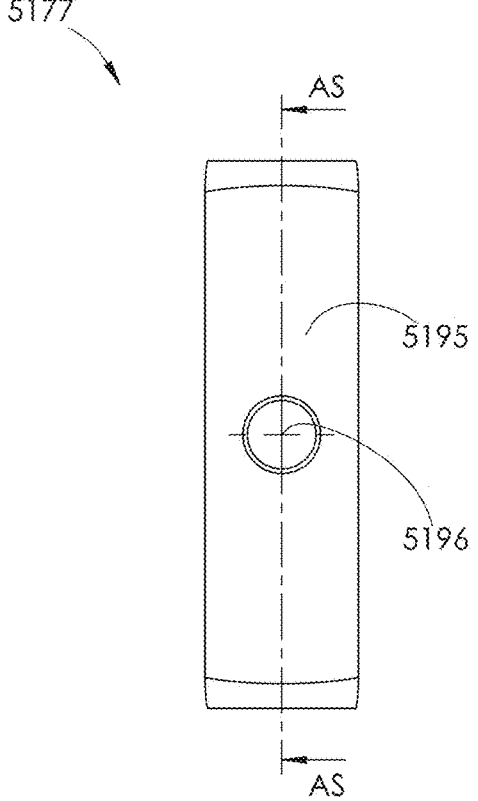
Figure 121:
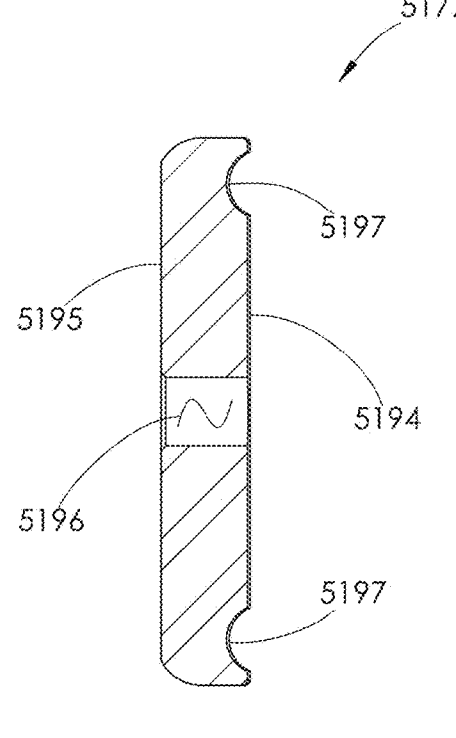
Figure 122:
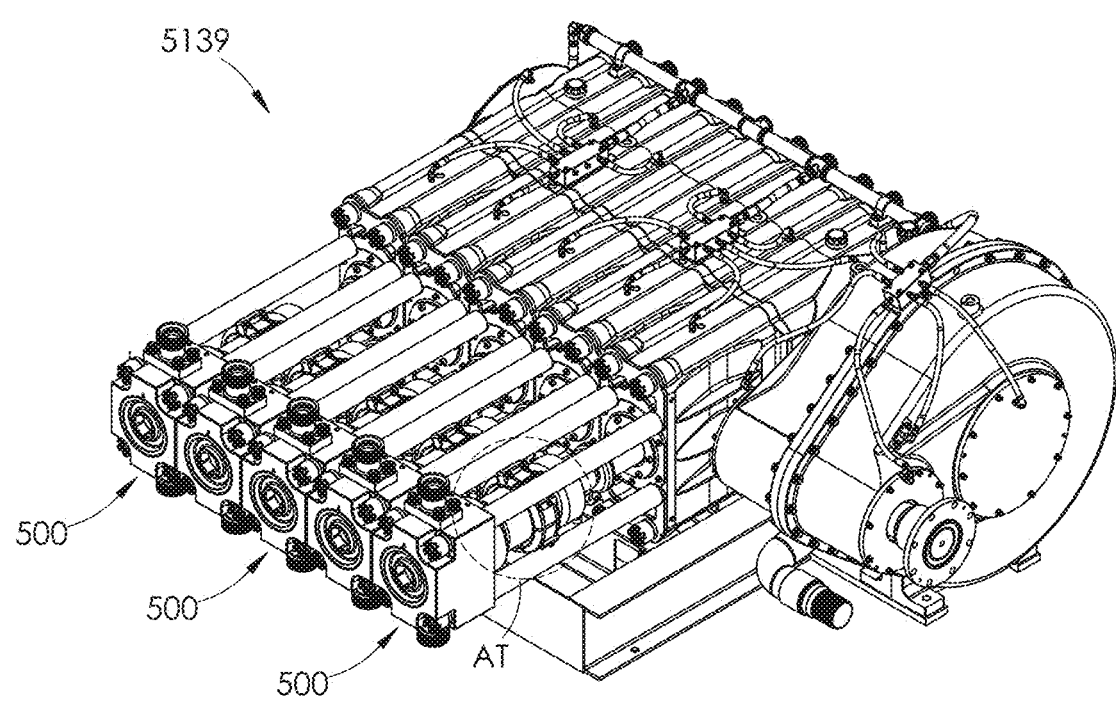
Figure 123:
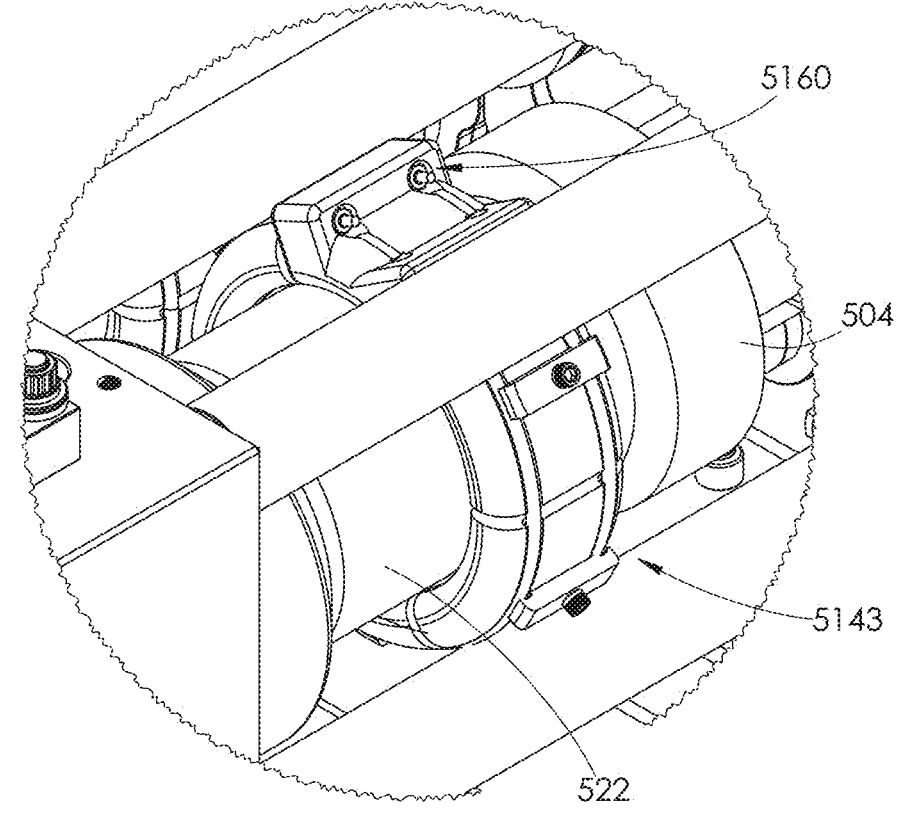
Figure 124:
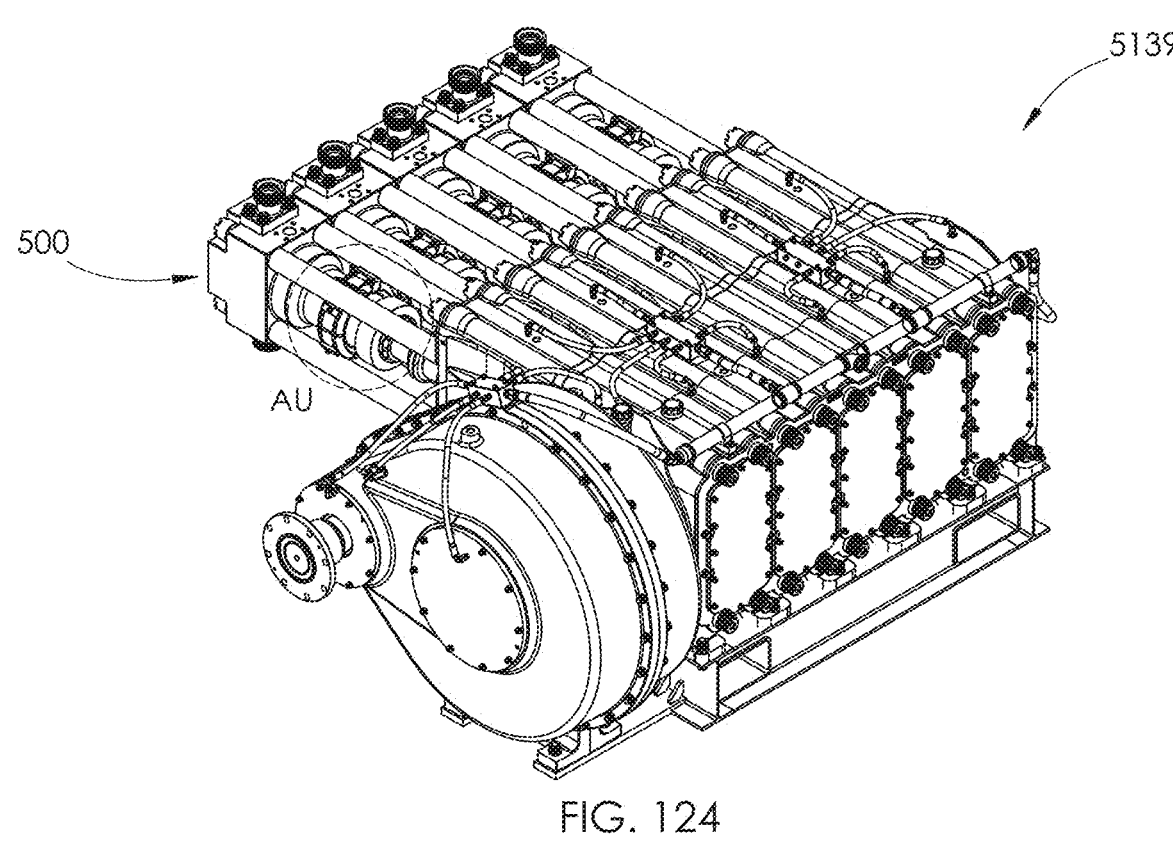
Figure 125:
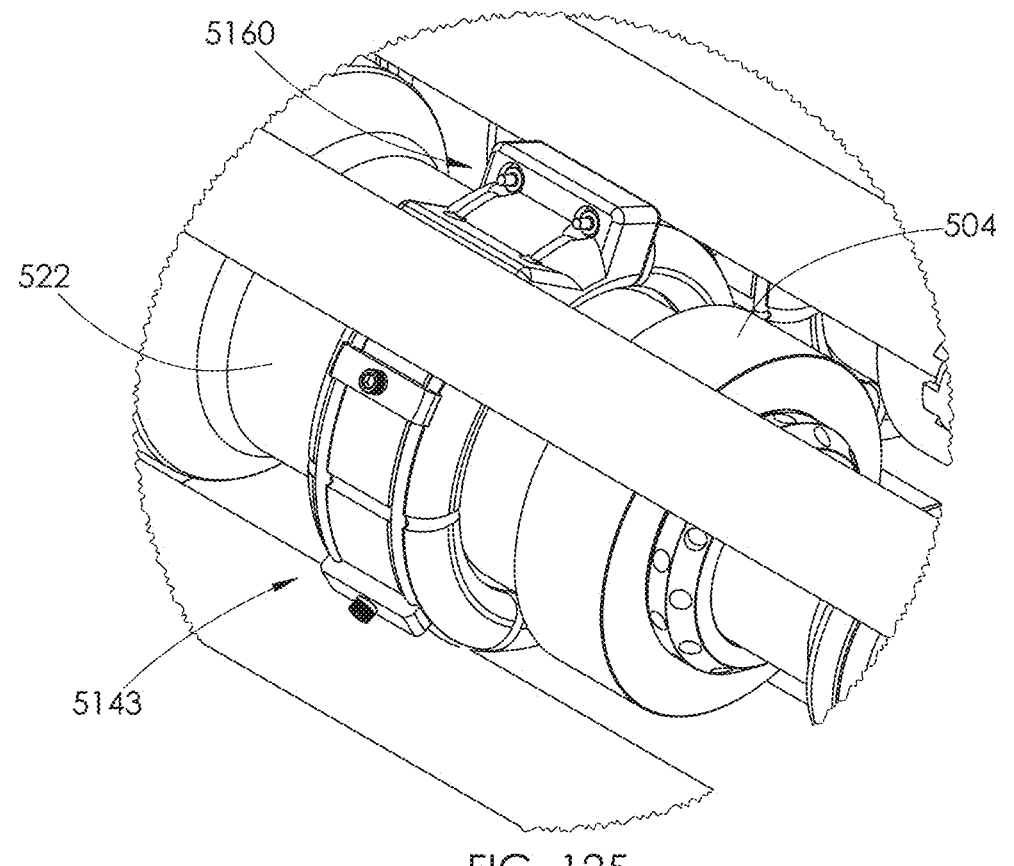

Referring now to FIG. 109, a compression ring 5158 is shown. The compression ring 5158 comprises a compression ring rod 5179 with one threaded end 5180 and one expanded end 5181. The compression ring rod 5179 is formed into a generally circular shape to fit around the fluid end section 500.

Referring now to FIGS. 109-113, the first clamp section 5176 is shown. The first clamp section 5176 is generally shaped like a circular sector of a thin-walled cylinder. The first clamp section 5176 comprises an outer surface 5182, inner surface 5183, and two end surfaces 5184. The inner surface 5183 comprises a cutout, or groove 5171, that comprises a constant radius surface 5172 bounded longitudinally by two angled surfaces 5173. Each of the angled surfaces 5173 is formed at the same angle as the angled front and rear surfaces 5147, 5148 of the fluid end housing 501 and stuffing box 504. The two end surfaces 5170 are formed parallel to radii of the circular sector. The outer surface 5182 comprises an expanded end tab 5185 extending radially from the outer surface 5182 and adjacent to one end surface 5184 and a threaded end tab 5186 extending radially from the outer surface 5182 and adjacent to the other end surface 5184. The expanded end tab 5185 comprises a shared end surface 5184 with the first clamp section 5176, and an opposite end surface 5187. The expanded end tab 5185 further comprises a pair of counterbored through holes 5188 connecting the two surfaces 5184, 5187. The counterbore is on the opposite end surface 5187. The counterbored through holes 5188 are spaced longitudinally and bored perpendicular to the shared end surface 5184. The threaded end tab 5186 also comprises a shared end surface 5184 with the first clamp section 5176. It is the end not shared with the expanded end tab 5185. The threaded end tab 5186 further comprises an opposite end surface 5189 and a pair of counterbored through holes 5190 connecting the two surfaces 5184, 5189. The counterbore is on the opposite end surface 5189. The counterbored through holes 5190 are also spaced longitudinally and are aligned with the counterbored through holes 5188 of the expanded end tab 5185. The counterbored through holes 5190 are bored perpendicular to the shared end surface 5184. The outer surface 5182 further comprises a pair of grooves 5191 extending circumferentially between the counterbored through holes 5188, 5190. The grooves 5191 have a semicircular cross-section.

Referring now to FIGS. 114-117, a clamp section 5159 is shown. The clamp section 5159 is generally shaped like a circular sector of a thin-walled cylinder. The clamp section 5159 comprises an outer surface 5168, inner surface 5169, and two end surfaces 5170. The inner surface 5169 comprises a cutout, or groove 5171, that comprises a constant radius surface 5172 bounded longitudinally by two angled surfaces 5173. Each of the angled surfaces 5173 is formed at the same angle as the angled front and rear surfaces 5147, 5148 of the fluid end housing 501 and stuffing box 504. The two end surfaces 5170 are formed parallel to radii of the circular sector. The outer surface 5168 comprises a threaded blind hole 5192 centered longitudinally and circumferentially, and a pair of semicircular grooves 5193 spaced longitudinally the same as the grooves 5191 in the first clamp section 5176.

Referring now to FIGS. 118-121, a ring clamp 5177 is shown. The ring clamp 5177 is generally shaped like a rectangular prism comprising an inner surface 5194, an outer surface 5195, and a through hole 5196 connecting the inner and outer surfaces 5194, 5195. The through hole 5196 is centered longitudinally and transversely. The inner surface 5194 comprises a pair of semicircular grooves 5197 spaced longitudinally the same as the grooves 5191, 5193 of the first clamp section 5176 and clamp sections 5159.

Figures 107, 108:
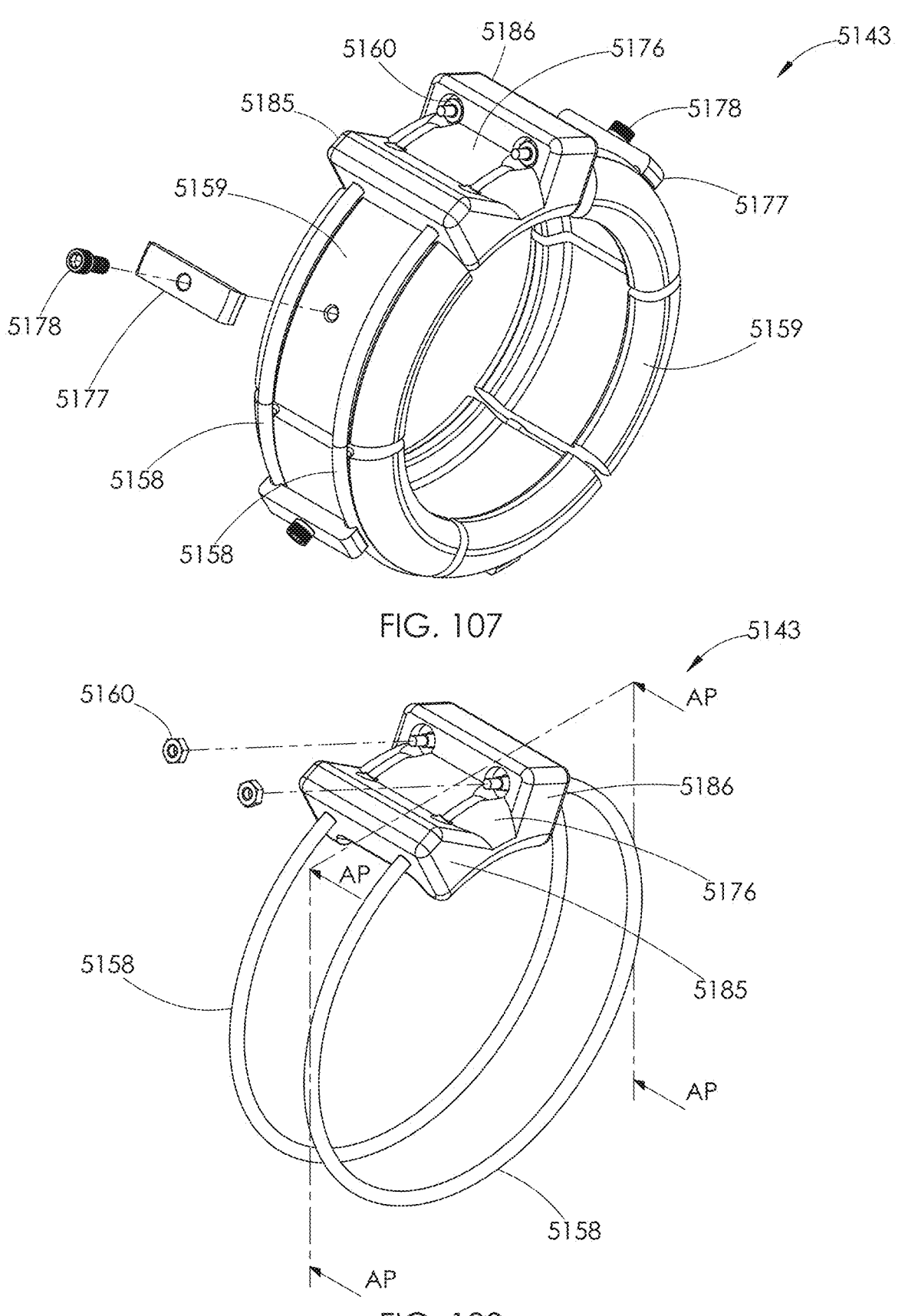
FIG. 107 is a partially exploded, right rear perspective view of another embodiment of a clamp.
FIG. 108 is a partially exploded, right rear perspective view of the compression rings, first clamp section, and compression ring fasteners of the clamp shown in FIG. 107.

Referring to FIGS. 107-109, the clamp 5143 is assembled by inserting the threaded end 5180 of the compression ring rod 5179 into the counterbored end of one of the counterbored through holes 5188 of the expanded end tab 5185 of the first clamp section 5176. The compression ring rod 5179 is inserted until the expanded end 5181 of the compression ring rod 5179 contacts the base of the counterbore as shown in FIG. 109. The threaded end 5180 of the compression ring rod 5179 is then inserted into the non-counterbored end of the counterbored through hole 5190 of the threaded end tab 5186. A compression ring fastener 5160, in this embodiment a nut, is then screwed on the threaded end 5180 of the compression ring rod 5179. The compression ring fastener 5160 is only screwed on enough to keep the threaded end 5180 of the compression ring rod 5179 in the threaded end tab 5186. It must stay loose to allow the completion of the assembly. The second compression ring 5158 is inserted in the first clamp section 5176 the same way. Next, a clamp section 5159 is placed such that the grooves 5193 in the outer surface 5168 mate with the compression rings 5158. Next, the through hole 5196 of a ring clamp 5177 is aligned with the threaded blind hole 5192 of the clamp section 5159 and the ring clamp 5177 is oriented so that the grooves 5197 on the inner surface 5194 mate with the compression rings 5158. Next, the ring clamp fastener 5178 is inserted through the through hole 5196 of the ring clamp 5177 and threaded into the threaded blind hole 5192 of the clamp section 5159. As with the compression ring fasteners 5160, the ring clamp fasteners 5178 are not yet tightened completely to allow the completion of assembly. The remaining clamp sections 5159 are attached to the compression rings 5158 in the same manner. As needed, the clamp sections 5159 that are already attached may be moved circumferentially on the compression rings 5158 to make room for the remaining clamp sections 5159. Once all the clamp sections 5159 are attached to the compression rings 5158 they may be spaced circumferentially such that there is approximately the same distance between each clamp section 5159 and the ring clamp fasteners 5178 may then be tightened such that the clamp sections 5159 are no longer able to be moved relative to the compression rings 5158.

Referring now to FIGS. 105-106 and 122-125, the fluid end section 500 is assembled in the same way as fluid end section 400 described above except the clamp 5143 is preassembled eliminating the need to place and hold the clamp sections 4159 in place while sliding the compression ring 4158 over them. The same advantages are realized during disassembly and reassembly during maintenance of the high-pressure pump 5139 as can be seen in FIGS. 122-125.

As with the fluid end section 400, tightening the compression ring fasteners 5160 reduces the diameter of the compression rings 5158 and the first clamp section 5176 and clamp sections 5159 under the compression rings 5158. As the diameter of the clamp sections 5159 decreases the angled surfaces 5173 of the groove 5171 of the inner surfaces 5169 apply a cancelling radial force and a compressive longitudinal force to the flanges 5144, 5145 thus holding the stuffing box 504 to the fluid end housing 501.

Referring now to FIGS. 126-150, another embodiment of a fluid end section 600 is shown. The fluid end section 600 comprises a fluid end housing 601, a stuffing box 604, a rear retainer 605, a plurality of studs 606, a plurality of blind nuts 607, a plurality of reaction washers 608, a plurality of nuts 609, a plurality of washers 610, a plurality of locating dowel pins 611, packing 613, a packing nut 614, a plunger 615, and a plurality of retention O-rings 6198.

Referring now to FIGS. 129-136, the fluid end housing 601 comprises a first section 621, a second section 622, a front spacer sleeve 6199, a plurality of studs 630, a plurality of nuts 631, a rear spacer sleeve 6128, a plurality of rear spacer sleeve locating dowel pins 632, and a plurality of rear spacer sleeve mounting screws 612.

Referring now to FIG. 134, the first section 621 of the fluid end housing 601 comprises a rear surface 633, a central horizontal bore 620, a plurality of threaded blind bores 635, and a plurality of stay rod through holes 6204. The threaded blind bores 635 open to the rear surface 633 and are formed around the central horizontal bore 620.

Referring now to FIG. 133 and 137-139, the second section 622 of the fluid end housing 601 comprises a body 6223, front wear ring 624, a front wear ring seal 625, a rear wear ring 628, a rear wear ring seal 629, and a stuffing box seal 6127. The body 6223 comprises a front surface 640 and a rear surface 618 connected by an outer intermediate surface 645. The outer intermediate surface 645 comprises a front protruding section 6202, a front mounting flange 648, a center section 649, a rear mounting flange 650, and a rear protruding section 6203. The front mounting flange 648 comprises a front surface 6205, a rear surface 6206, a plurality of stud through holes 652 spaced evenly around the central horizontal bore 620, and a plurality of stay rod cutouts 6207. The rear mounting flange 650 comprises a front surface 6221, a rear surface 6222, a plurality of stud through holes 654 spaced evenly around the central horizontal bore 620, a pair of diametrically opposed blind bores 660 for the rear spacer sleeve locating dowel pins 632, and a pair of diametrically opposed threaded blind bores 659 for the rear spacer sleeve mounting screws 612. The blind bores 660 and threaded blind bores 659 open to the rear surface 6222.

Referring now to FIG. 131, the front wear ring 624 comprises a front surface 664, an opposing rear surface 665, an inner intermediate surface 666, and an outer intermediate surface 6224. The outer intermediate surface 6224 is tapered from the front surface 664 to the rear surface 665.

Referring now to FIG. 132, the rear wear ring 628 comprises a front surface 670, an opposing rear surface 671, an inner intermediate surface 672, and an outer intermediate surface 6225. The outer intermediate surface 6225 is tapered from the rear surface 671 to the front surface 670. Continuing with FIG. 132, the stuffing box seal 6127 comprises a front surface 6226, an opposing rear surface 6227, an inner intermediate surface 6228, and an outer intermediate surface 6229.

Referring now to FIG. 139, the central horizontal bore 620 of the body 6223 of the second section 622 of the fluid end housing 601 comprises a front wear ring counterbore 634, a rear wear ring counterbore 658, and a stuffing box counterbore 6200. The front wear ring counterbore 634 comprises a base 637 and a tapered bore wall 638 with a seal groove 639 formed in the tapered bore wall 638 at approximately the longitudinal center of the tapered bore wall 638. The front wear ring counterbore 634 opens to, or originates from, the front surface 640 of the body 6223 of the second section 622. The rear wear ring counterbore 658 comprises a base 661 and a tapered bore wall 662 with a seal groove 663 formed in the tapered bore wall 662 at approximately the longitudinal center of the tapered bore wall 662. The rear wear ring counterbore 658 opens to, or originates from, the rear surface 618 of the body 6223 of the second section 622. The stuffing box counterbore 6200 comprises a base 6201 and a straight bore wall 6208. The stuffing box counterbore 6200 opens to, or originates from, the base 661 of the rear wear ring counterbore 658.

Referring now to FIGS. 140-141, the front spacer sleeve 6199 is shown. The front spacer sleeve 6199 comprises a front surface 6209, an opposing rear surface 6210, an outer intermediate surface 6211, a central bore 6212, and a plurality of stud through holes 6213 spaced evenly around, and proximate to, the wall of the central bore 6212. The outer intermediate surface 6211 comprises a plurality of stay rod cutouts 6214. When assembled, the central bore 6212 is concentric with the central horizontal bore 620 of the fluid end housing 601.

Referring now to FIGS. 142-147, the rear spacer sleeve 6128 is shown. The rear spacer sleeve 6128 comprises a front surface 6131, an opposing rear surface 6132, a central bore 6133, and a plurality of stud through holes 6134 spaced evenly around, and proximate to, the wall of the central bore 6133. When assembled, the central bore 6133 is concentric with the central horizontal bore 620 of the fluid end housing 601. The rear spacer sleeve 6128 further comprises a pair of diametrically opposed counterbored through holes 6215 for the rear spacer sleeve locating dowel pins 632. The counterbore 6216 of each counterbored through hole 6215 has a base 6217 and is open to, or originates from, the front surface 6131. The rear spacer sleeve 6128 further comprises a pair of diametrically opposed counterbored through holes 6218 for the rear spacer sleeve mounting screws 612. The counterbore 6219 of each counterbored through hole 6218 has a base 6220 and is open to, or originates from, the rear surface 6132.

Referring now to FIGS. 148-150, a blind nut 607 is shown. The blind nut 607 comprises a base 6114 and an outer intermediate surface 6112. The outer intermediate surface 6112 comprises a drive section 6116. The drive section 6116 comprises a retention O-ring groove 6230.

Referring now to FIGS. 130-133, the assembly of the fluid end section 600 first requires the assembly of the second section 622 of the fluid end housing 601. The steps for assembly of the second section 622 are: First, insert the front wear ring seal 625 into the seal groove 639 of the tapered bore wall 638 of the front wear ring counterbore 634 of the body 6223. Second, insert the front wear ring 624, rear surface 665 first, into the front wear ring counterbore 634 until the rear surface 665 abuts the base 637 of the front wear ring counterbore 634. The outer intermediate surface 6224 of the front wear ring 624 and the front wear ring counterbore 634 may be sized to provide a press fit once assembled. Third, insert the rear wear ring seal 629 into the seal groove 663 of the tapered bore wall 662 of the rear wear ring counterbore 658 of the body 6223. Fourth, insert the rear wear ring 628, front surface 670 first, into the rear wear ring counterbore 658 until the front surface 670 abuts the base 661 of the rear wear ring counterbore 658. The outer intermediate surface 6225 of the rear wear ring 628 and the rear wear ring counterbore 658 may be sized to provide a press fit once assembled. Fifth, insert the stuffing box seal 6127 into the rear wear ring counterbore 658 until the front surface 6226 abuts the base 661 of the rear wear ring counterbore 658. The stuffing box seal 6127 may be inserted either front surface 6226 or rear surface 6227 first. This example assumes the front surface 6226 is inserted first. Once the stuffing box seal 6127 is inserted, the outer intermediate surface 6229 will engage the inner intermediate surface 672 of the rear wear ring 628. This completes the assembly of the second section 622.

Figure 129:
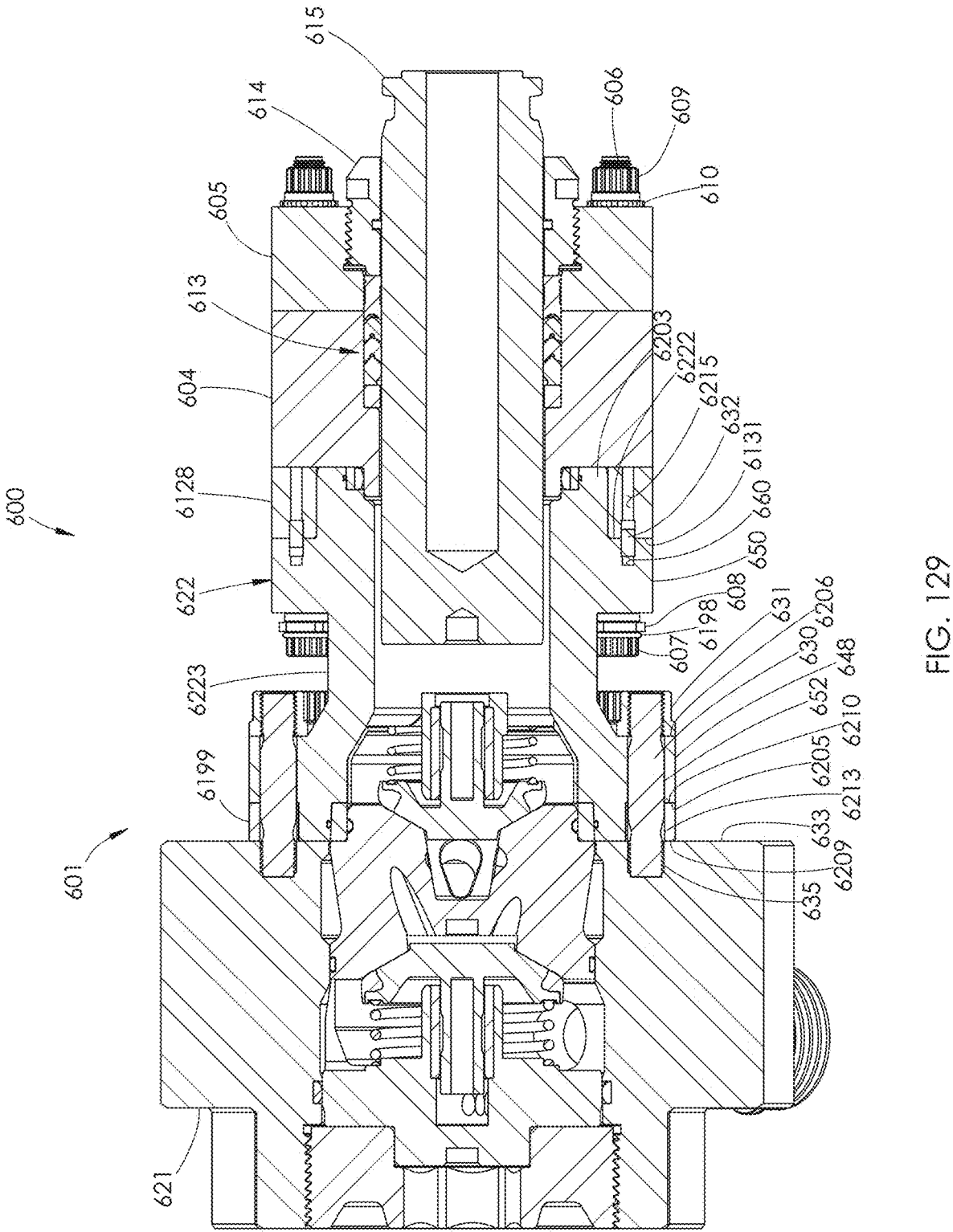
Figure 130:
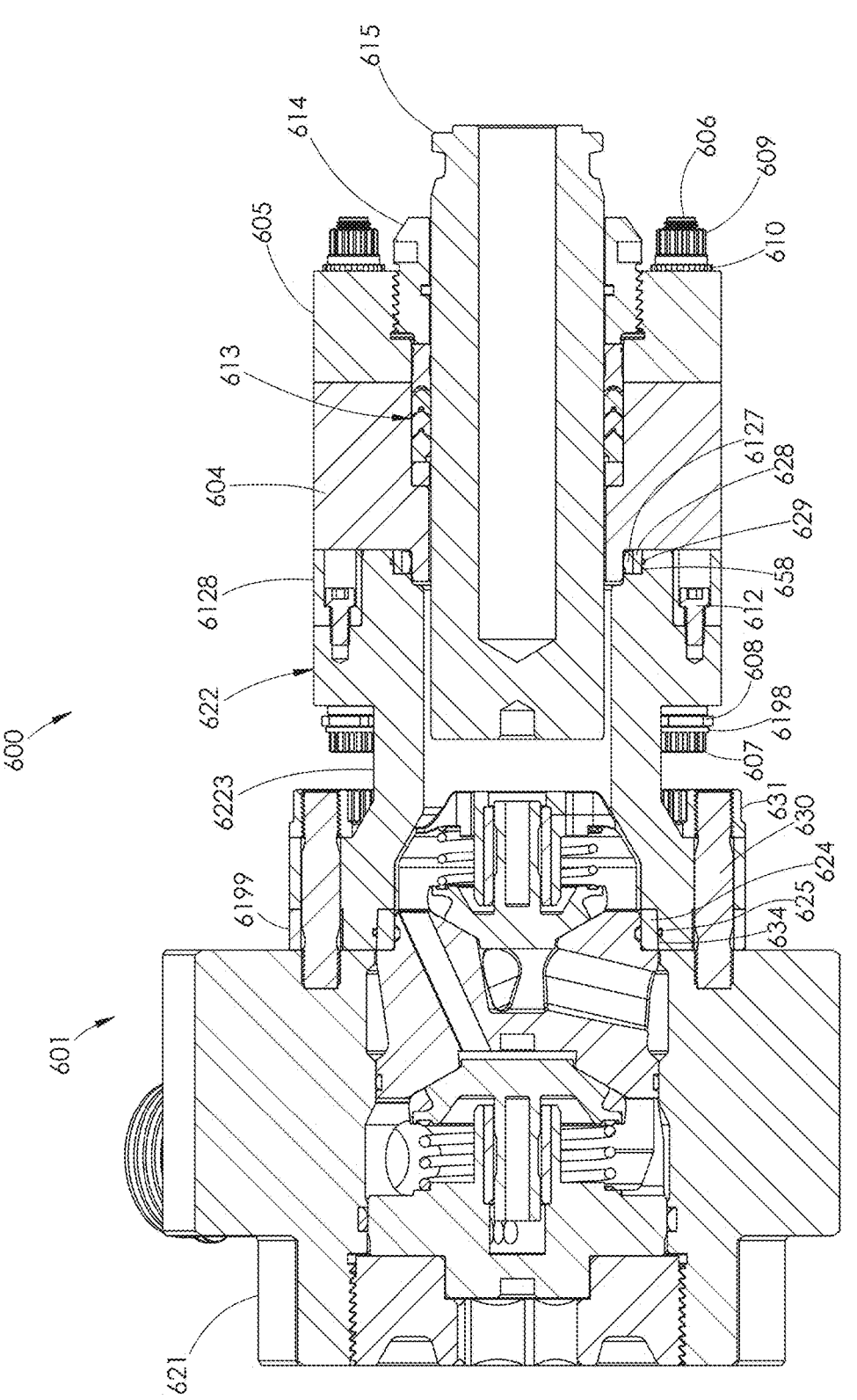

Referring now to FIGS. 129, 134, and 135, the fluid end housing 601 assembly steps are: First, thread each stud 630 in a threaded blind bore 635 of the first section 621 of the fluid end housing 601 and torque to specification. Second, slide the stud through holes 6213 of the front spacer sleeve 6199 over the ends of the studs 630 now protruding from the first section 621 until the front surface 6209 abuts the rear surface 633 of the first section 621. The front spacer sleeve 6199 should be oriented so the stay rod cutouts 6214 of the outer intermediate surface 6211 align with the stay rod through holes 6204 of the first section 621. Third, slide the stud through holes 652 of the front mounting flange 648 of the body 6223 of the second section 622 over the ends of the studs 630 now protruding from the rear surface 6210 of the front spacer sleeve 6199 until the front surface 6205 of the front mounting flange 648 abuts the rear surface 6210 of the front spacer sleeve 6199. The body 6223 should be oriented so the stay rod cutouts 6207 align with the stay rod cutouts 6214 of the front spacer sleeve 6199. Fourth, thread nuts 631 onto the studs 630 now protruding from the rear surface 6206 of the front mounting flange 648 and torque to specification. Fifth, insert the rear spacer sleeve locating dowel pins 632 into the blind bores 660 of the rear mounting flange 650. Sixth, slide the rear spacer sleeve 6128, front surface 6131 first, over the rear protruding section 6203 of the body 6223 of the second section 622 until the front surface 6131 of the rear spacer sleeve 6128 abuts the rear surface 6222 of the rear mounting flange 650 of the body 6223. As the rear spacer sleeve 6128 is moved toward the rear mounting flange 650 the counterbored through holes 6215 must be aligned with the rear spacer sleeve locating dowel pins 632. Seventh, insert the rear spacer sleeve mounting screws 612 into the counterbored through holes 6218 of the rear spacer sleeve 6128 and torque to specification. The fluid end housing 601 is now assembled.

Referring now to FIGS. 128 and 136, the steps required to complete the assembly of the fluid end section 600 are: First, insert a stud 606 into a stud through hole 6134 of the rear spacer sleeve 6128 and further through the aligned stud through hole 654 of the rear mounting flange 650 of the second section 622 of the fluid end housing 601 until the end of the stud 606 protrudes from the front surface 6221 of the rear mounting flange 650. Second, thread a blind nut 607 on the protruding end of the stud 606 and tighten the blind nut 607 until the end of the stud 606 abuts the base 6114 of the blind nut 607. Repeat this second step for the remaining studs 606. Third, slide the stud through holes 692 of the stuffing box 604, front surface 688 first, over the studs 606 now protruding from the rear surface 6132 of the rear spacer sleeve 6128 until the front surface 688 of the stuffing box 604 abuts the rear surface 6132 of the rear spacer sleeve 6128. As the stuffing box 604 is moved toward the rear spacer sleeve 6128 the annular extension 696 on the front surface 688 of the stuffing box 604 will be inserted into and engage the inner intermediate surface 6228 of the stuffing box seal 6127. Fourth, insert the locating dowel pins 611 into the blind bores 699 on the rear surface 689 of the stuffing box 604. Fifth, slide the stud through holes 6104 of the rear retainer 605, front surface first 6100, over the studs 606 now protruding from the rear surface 689 of the stuffing box 604 until the front surface 6100 of the rear retainer 605 abuts the rear surface 689 of the stuffing box 604. As the rear retainer 605 is moved towards the stuffing box 604 the locating dowel pin through holes 6103 must be aligned with the locating dowel pins 611 now protruding from the rear surface 689 of the stuffing box 604. Sixth, place the washers 610 over the studs 606 now protruding from the rear surface 6101 of the rear retainer 605. Seventh, thread the nuts 609 on the protruding studs 606 but do not apply full torque. Eighth, slide the reaction washers 608 over the blind nuts 607 as shown in FIG. 51. Ninth, stretch and slide the retention O-rings 6198 over the outer intermediate surface 6112 of the blind nuts 607 until the retention O-rings 6198 engage the retention O-ring groove 6230 in the drive section 6116 of the outer intermediate surface 6112 of the blind nut 607. Tenth, torque the nuts 609 to specification. Eleventh, insert the packing 613 in the stuffing box 604. Twelfth, insert the plunger 615 in the packing 613. Lastly, insert and tighten the packing nut 614.

During operation the front and rear spacer sleeves 6199 and 6128 provide the advantages described above, specifically, the spacer sleeves 6199 and 6128 do not constrain the expansion of the protruding sections 6202, 6203 of the second section 622 of the fluid end housing 601 when the wear rings 624, 628 are pressed into the wear ring counterbores 634, 658. Resulting in a uniform, or more uniform, deflection of the wear rings 624, 628 upon installation and during operation. The stress resulting from the deflection is therefore also more uniform. This eliminates, or drastically reduces, stress concentration areas within the wear rings 624, 628 increasing the life of the components and the maintenance intervals for the pump. The tapered wear rings 624, 628 are easier to assemble and replace, if necessary, since the tapered outer surfaces 6224, 6225 have a smaller length of engagement.

The retention O-rings 6198 prevent the reaction washers 608 from coming off the blind nuts 607. Thus, when maintenance of the packing 613 requires the removal of the stuffing box 604 and rear retainer 605 the reaction washers 608 are present to provide back-up while removing the nuts 609.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning.

The invention claimed is:

1. A fluid end section, comprising:
a housing, comprising:
   a first longitudinal bore formed therethrough; and
   a first flange portion;
a stuffing box, comprising:
   a second longitudinal bore formed therethrough; and
   a second flange portion abutting the first flange portion; and
a clamp surrounding both the first and second flange portions and securing the stuffing box to the housing, in which the clamp comprises:
   a plurality of clamp sections configured to engage the first and second flange portions;
   a compression ring surrounding the plurality of clamp sections; and
   a plurality of fasteners securing the compression ring around the plurality of clamp sections.

2. The fluid end section of claim 1, in which the first longitudinal bore and the second longitudinal bore are horizontal.

3. The fluid end section of claim 1, further comprising a plunger, in which the plunger is at least partially disposed within the second longitudinal bore.

4. A fluid end, comprising:
a plurality of fluid end sections;
in which each of the fluid end sections is the fluid end section of claim 1.

5. The fluid end section of claim 1, further comprising a stuffing box seal situated between at least a portion of the stuffing box and at least a portion of the housing.

6. The fluid end section of claim 1, further comprising:
a packing assembly situated within the stuffing box; and
a packing nut attached to the stuffing box, the packing nut engaging the packing assembly and securing the packing assembly within the stuffing box.

7. The fluid end section of claim 6, in which the packing nut is threaded into the second longitudinal bore.

8. The fluid end section of claim 1, in which the stuffing box further comprises an annular extension projecting from the second flange portion.

9. The fluid end section of claim 8, in which the annular extension is sized to be received within at least a portion of the housing.

10. The fluid end section of claim 9, further comprising an annular seal situated between the annular extension and the at least a portion of the housing.

11. The fluid end section of claim 10, further comprising a wear ring situated between the annular seal and the at least a portion of the housing.

12. The fluid end section of claim 1, in which the compression ring is a single integrally formed thin-walled cylindrical body.

13. The fluid end section of claim 12, in which the compression ring comprises a cut that passes through a portion of the compression ring.

14. The fluid end section of claim 1, in which the stuffing box is a single integrally formed piece.

15. The fluid end section of claim 1, in which the housing is a single integrally formed piece.

16. The fluid end section of claim 1, further comprising a packing nut threaded into the stuffing box, the packing nut comprising:
a first surface configured to engage a packing assembly;
an opposed second surface having a plurality of holes formed thereon; and
an intermediate outer surface having external threads formed thereon.

* * * * *